US009751759B2

(12) United States Patent
Foord et al.

(10) Patent No.: US 9,751,759 B2
(45) Date of Patent: Sep. 5, 2017

(54) COMPOSITION FOR HYDROGEN GENERATION

(71) Applicant: Oxford University Innovation Limited, Oxford (GB)

(72) Inventors: John Stuart Foord, Oxford (GB); Jingping Hu, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 0 days.

(21) Appl. No.: 14/432,323

(22) PCT Filed: Oct. 1, 2013

(86) PCT No.: PCT/GB2013/000415
§ 371 (c)(1),
(2) Date: Mar. 30, 2015

(87) PCT Pub. No.: WO2014/053799
PCT Pub. Date: Apr. 10, 2014

(65) Prior Publication Data
US 2015/0266729 A1 Sep. 24, 2015

(30) Foreign Application Priority Data
Oct. 1, 2012 (GB) .................................. 1217525.3

(51) Int. Cl.
*C01B 3/06* (2006.01)
*C09C 1/28* (2006.01)
(Continued)

(52) U.S. Cl.
CPC ................. *C01B 3/06* (2013.01); *B82Y 30/00* (2013.01); *C01B 33/02* (2013.01); *C09C 1/28* (2013.01);
(Continued)

(58) Field of Classification Search
CPC ........... C01B 3/06; C01B 33/02; B82Y 30/00; C09C 1/28
See application file for complete search history.

(56) References Cited

U.S. PATENT DOCUMENTS 3,689,389 A 9/1972 Waggener
3,895,102 A 7/1975 Gallagher
(Continued)

FOREIGN PATENT DOCUMENTS

DE 287 468 10/1983
DE 101 55171 6/2002
(Continued)

OTHER PUBLICATIONS

Alinejad, B and Mahmoodi, K., "A Novel Method for Generating Hydrogen by Hydrolysis of Highly Activated Aluminum Nanoparticles in Pure Water," *International Journal of Hydrogen Energy*, 34: 7934-7938 (2009).
(Continued)

*Primary Examiner* — Anthony J Zimmer
*Assistant Examiner* — Syed Iqbal
(74) *Attorney, Agent, or Firm* — Hamilton, Brook, Smith & Reynolds, P.C.

(57) ABSTRACT

The invention relates to the use of nonpassivated silicon to produce hydrogen, by hydrolysis of the nonpassivated silicon. In particular, the invention relates to a composition comprising nonpassivated silicon, a process for producing a composition comprising nonpassivated silicon, and a process for producing hydrogen by reacting the composition with water.

55 Claims, 11 Drawing Sheets

(51) Int. Cl.
*C01B 33/02* (2006.01)
*B82Y 30/00* (2011.01)

(52) U.S. Cl.
CPC ...... *C01P 2002/72* (2013.01); *C01P 2004/03* (2013.01); *C01P 2004/62* (2013.01); *C01P 2004/64* (2013.01); *Y02E 60/36* (2013.01); *Y02P 20/132* (2015.11); *Y10T 428/2982* (2015.01)

(56) References Cited

U.S. PATENT DOCUMENTS

| | | | |
|---|---|---|---|
| 3,957,483 | A | 5/1976 | Suzuki |
| 4,203,814 | A | 5/1980 | Grantham |
| 4,290,859 | A | 9/1981 | Oda et al. |
| 4,407,858 | A | 10/1983 | Hanke et al. |
| 4,439,302 | A | 3/1984 | Wrighton et al. |
| 4,781,804 | A | 11/1988 | Wolf |
| 5,048,930 | A | 9/1991 | Kuroda |
| 5,194,398 | A | 3/1993 | Miyachi et al. |
| 5,429,866 | A | 7/1995 | Dubrous |
| 5,436,814 | A | 7/1995 | Hanley |
| 5,728,464 | A | 3/1998 | Checketts |
| 6,132,801 | A | 10/2000 | Linford |
| 7,493,765 | B2 | 2/2009 | Akiyama et al. |
| 2001/0025670 | A1 | 10/2001 | Ovshinsky et al. |
| 2001/0034298 | A1 | 10/2001 | Isobe et al. |
| 2002/0048548 | A1 | 4/2002 | Chaklader |
| 2003/0038364 | A1 | 2/2003 | Eldridge et al. |
| 2003/0059361 | A1 | 3/2003 | Carberry |
| 2003/0089884 | A1 | 5/2003 | Nakazawa et al. |
| 2003/0091877 | A1 | 5/2003 | Chen et al. |
| 2003/0228727 | A1 | 12/2003 | Guerra |
| 2004/0151664 | A1 | 8/2004 | Auner |
| 2004/0217325 | A1 | 11/2004 | Usui et al. |
| 2005/0016840 | A1 | 1/2005 | Petillo |
| 2005/0042165 | A1 | 2/2005 | Akiyama et al. |
| 2005/0069487 | A1 | 3/2005 | Zhao et al. |
| 2005/0145163 | A1 | 7/2005 | Matsuki et al. |
| 2005/0175517 | A1 | 8/2005 | Kitada |
| 2005/0238573 | A1 | 10/2005 | Zhang et al. |
| 2006/0065302 | A1 | 3/2006 | Gibson et al. |
| 2006/0144700 | A1 | 7/2006 | Carson et al. |
| 2006/0246001 | A1 | 11/2006 | Auner |
| 2007/0031325 | A1 | 2/2007 | Carruthers et al. |
| 2007/0056465 | A1 | 3/2007 | Dutta |
| 2007/0059859 | A1 | 3/2007 | Lysenko et al. |
| 2007/0246370 | A1 | 10/2007 | Dimroth |
| 2007/0277870 | A1 | 12/2007 | Wechsler |
| 2008/0073205 | A1 | 3/2008 | Adiga et al. |
| 2008/0152971 | A1 | 6/2008 | Jang et al. |
| 2008/0236032 | A1 | 10/2008 | Kelly et al. |
| 2010/0150826 | A1 | 6/2010 | Troczynski |

FOREIGN PATENT DOCUMENTS

| | | | |
|---|---|---|---|
| EP | 0 915 128 | | 10/1998 |
| GB | 2 344 110 | | 5/2000 |
| GB | WO 2011058317 A1 * | | 5/2011 ............. B82Y 30/00 |
| JP | 10 22391 | | 1/1989 |
| JP | 11 240709 | | 9/1999 |
| JP | 2000 191303 | | 7/2000 |
| JP | 40 59601 | | 4/2001 |
| JP | 2001 213609 | | 8/2001 |
| JP | 40 59691 | | 9/2003 |
| JP | 2004 115348 | | 4/2004 |
| JP | 2004115349 | | 4/2004 |
| JP | 40 66189 | | 2/2005 |
| JP | 2005 029410 | | 2/2005 |
| JP | 2006 100255 | | 4/2006 |
| JP | 2006 104571 | | 4/2006 |
| JP | 2007 326731 | | 12/2007 |
| JP | 2007 326742 | | 12/2007 |
| JP | 2008 120901 | | 5/2008 |
| JP | 2011 236107 | | 11/2011 |
| RU | 2290363 C | | 12/2006 |
| RU | 2323045 C | | 4/2008 |
| RU | 2345829 C | | 2/2009 |
| WO | WO 02/29820 | | 4/2002 |
| WO | WO 02/48548 | | 6/2002 |
| WO | WO 03/025260 | | 3/2003 |
| WO | WO 03/059815 | | 7/2003 |
| WO | WO 2005/037421 | | 4/2005 |
| WO | WO 2005/097670 | | 10/2005 |
| WO | WO 2007/019172 | | 2/2007 |
| WO | WO 2007/054290 | | 5/2007 |
| WO | WO 2008/094840 | | 8/2008 |
| WO | WO 2008/121956 | | 10/2008 |
| WO | WO 2008/141439 | | 11/2008 |
| WO | WO 2011/017801 | | 2/2011 |
| WO | WO 2011/058317 | | 5/2011 |

OTHER PUBLICATIONS

Auner, N. and Holl, S., "Silicon as Energy Carrier-Facts and Perspectives," *Energy*, 31: 1395-1402 (2006).
Bahruji, H., et al., "Photoactivated reaction of water with silicon nanoparticles," *International Journal of Hydrogen Energy*, 34:8504-8510 (2009).
Bauen, A., "Future Energy Sources and Systems—Acting on Climate Change and Energy Security," *Journal of Power Sources*, 157: 893-901 (2006).
Benard, P., et al., "Comparison of hydrogen adsorption on nanoporous materials," *Journal of Alloys and Compounds*, 446/447: 380-384 (2007).
Calorimetry: Heat of Solution of Ammonium Nitrate, http://www.chm.davidson.edu/vce/calorimetry/heatofsolutionofammoniumnitrate.html.
Czech, E., and Troczynski, T., "Hydrogen Generation Through Massive Corrosion of Deformed Aluminum in Water," *International Journal of Hydrogen Energy*, 35:1029-1037 (2010).
Dye, J.L., et al., "Alkali Metals Plus Silica Gel: Powerful Reducing Agents and Convenient Hydrogen Sources," *Journal of American Chemical Society*,127:9338-9339 (2005).
Edwards, P.P., et al., "Hydrogen and Fuel Cells: Towards a Sustainable Energy Future," *Energy Policy*, 36: 4356-4362 (2008).
Edwards, P.P., et al., "Hydrogen Energy," *Philosophical Transactions of the Royal Society a—Mathematical Physical and Engineering Sciences*, 365: 1043-1056 (2007).
Fan, M.Q., at al., "Studies on Hydrogen Generation Characteristics of Hydrolysis of the Ball Milling A1-based Materials in Pure Water," *International Journal of Hydrogen Energy*, 32:2809-2815 (2007).
Goller, B., et al., "Nanosilicon in Water as a Source of Hydrogen: size and pH matter," *Nanotechnology*, 22:1-4 (2011).
Grosjean, M.H., et al., "Hydrogen Production From Highly Corroding Mg-Based Materials Elaborated by Ball Milling," *Journal of Alloys and Compounds*, 404/406: 712-715 (2005).
Grosjean, M.H., et al., "Hydrogen Production via Hydrolysis Reaction from Ball-milled Mg-based materials," *International Journal of Hydrogen Energy*, 31: 109-119 (2006).
Grosjean, M.H., et al., "Hydrolysis of Mg-salt and $MgH_2$-salt mixtures prepared by ball milling for hydrogen production," *Journal of Alloys and Compounds*, 416: 296-302 (2006).
Grunthaner, F.J., et al., "Local Atomic and Electronic Structure of Oxide/GaAs and SiO2/Si interfaces using high resolution XPS" *Journal of Vacuum Science & Technology*, 16:1443-1453 (1979).
Guidelines set out by the US Department of Energy (DOE) target hydrogen storage materials with a hydrogen yield of 9.0 wt% and a specific energy of 10.8 MJ kg.
Hu, H., et al., "Kinetics of Hydrogen Evolution in Alkali Leaching of Rapidly Quenched Ni—Al Alloy," *Applied Catalysis*, 252: 173-183 (2003).
Kikuchi, S., et al., "Mechanochemical Effect for some $Al_2O_3$ Powders by Wet Grinding," *Journal of Material Science Letters*, 11:471-474 (1992).
Kirchmann, H., et al., "Human urine—Chemical composition and fertilizer use efficiency," *Fertilizer Research*, 40: 149-154 (1995).

(56) References Cited

OTHER PUBLICATIONS

Koch, C.C., "Synthesis of Nanostructured Materials by Mechanical Milling: Problems and Opportunities" *Nanostructured Materials*, 9:13-22 (1997).
Kong, V.C.Y, et al,, "Development of Hydrogen Storage for Fuel Cell Generators. I: Hydrogen Generation Using Hydrolysis Hydrides," *International Journal of Hydrogen Energy*, 24(7): 665-675 (1999).
Kovalevskii, A.A., et al., "Nano-and Microstructured Silicon Powders for Hydrogen Generation," *Physics, Chemistry and Application of Nanostructres*,600-603 (2011).
Kravchenko, O.V., et al., "Activation of Aluminum Metal and Its Reaction with Water," *Journal of Alloys and Compounds*, 397: 58-62 (2005).
Lattin, W.C., et al., "Transition to Hydrogen Economy in the United States: A 2006 Status Report," *International Journal of Hydrogen Energy*,32: 3230-3237 (2007).
Lee, S.M. and Lee, Y.H., "Hydrogen Storage in Single-Walled Carbon Nanotubes," *Applied Physics Letters*, 76(20): 2877-2879 (2000).
Mahmoodi, K., and Alinejad, B "Enhancement of Hydrogen Generation Rate in Reaction of Aluminum with Water," *International Journal of Hydrogen Energy*, 35: 5227-5232 (2010).
Nakamura, M., et al., "Adsorption of urea on Au(100) and Au(111) electrode surfaces studied by in-situ Fourier-transform infra-red spectroscopy," *Surface Science*, 427/428: 167-172 (1999).
Ozanam, F. and Chazalviel, J. N., "In-Situ Infrared Vibrational Study of the Early Stages of Silicon Oxidation at the Interface with a Non-Aqueous Electrolyte," *Journal of Electroanalytical Chemistry*, 269(2): 251-266 (1989).
Pavlyak, F., et al., "AES and XPS Characterization of $SiN_x$ Layers," *Surface and Interface Analysis*, 20:221-227 (1993).
Peschka, W., "Hydrogen: The Future Cryofuel in Internal Combustion Engines," *International Journal of Hydrogen Energy*, 23(1): 27-43 (1998).
Rosso-Vasic, M., et al., "Amine-Terminated Silicon Nanoparticles: Synthesis, Optical Properties and Their Use in Bioimaging," Journal of Matter Chemical, 19:5926-5933 (2009).
Sakintuna, B., et al., "Metal Hydride Materials for Solid Hydrogen Storage: A review," *International Journal of Hydrogen Energy*, 32: 1121-1140 (2007).
Sartbeva, V.L., et al., "Hydrogen Nexus in a Sustainable Energy Future," Energy & Environmental Science, 1: 79-85(2008).
Shatnawi, M., et al., "Structures of Alkali Metals in Silica Gel Nanopores: New Materials for Chemical Reductions and Hydrogen Production," *Journal of American Chemical Society*, 129:1386-1392 (2007).
Sjöberg, S., "Silica in Aqueous Environments," *Journal of Non-Crystalline Solids*, 196:51-57 (1996).
Soler, L., et al., "Aluminum and Aluminum Alloys as Sources of Hydrogen for Fuel Cell Applications," International Journal of Hydrogen Energy, 169:144-149 (2007).
Soler, L., et al., "Synergistic Hydrogen Generation from Aluminum, Aluminum Alloys and Sodium Borohydride in Aqueous Solutions," International Journal of Hydrogen Energy, 32:4702-4710 (2007).
Stephen, R.G., and Riley, F.L., "Oxidation of Silicon by Water," *Journal of the European Ceramic Society*, 5: 219-222 (1989).
Stevens, Walter, J., U.S. Department of Energy, Office of Science, Basic Research Needs for the Hydrogen Economy, Presentation for Annual DOE Hydrogen Program Review (2003).
Straumanis, M.E., and Aka, E.Z., "Lattice Parameters, Coefficients of Thermal Expansion, and Atomic Weights of Purest Silicon and Germanium," Journal of Applied Physics, 23:330-334 (1952).
Suzuki, N., et al., "Hydrogen Formation during Wet Grinding of Alumina and Silicon Carbide," *Chemistry Letters*, 327-330 (1994).
Uan, J.Y., et al., "Generation of Hydrogen from Magnesium Alloy Scraps Catalyzed by Platinum-coated Titanium Net in NaCl Aqueous Solution," *International Journal of Hydrogen Energy*, 32: 2337-2343 (2007).
Vishnevetsky, I. and Epstein, M., "Production of Hydrogen from Solar Zinc in Steam Atmosphere," *International Journal of Hydrogen Energy*, 32: 2791-2802 (2007).
Vollath, D., "Plasma Synthesis of Nanoparticles," KONA, 25: 39-55 (2007).
Wang, H.Z., et al., "A Review on Hydrogen Production Using Aluminum and Aluminum Alloys," *Renewable and Sustainable Energy Reviews*, 13: 845-853 (2009).
Wegner, K., et al., "In Situ Formation and Hydrolysis of Zn nanoparticles for $H_2$ Production by the 2-step ZnO/Zn Water-Splitting Thermochemical Cycle," *International Journal of Hydrogen Energy*, 31:55-61 (2006).
Williams, K.A. and Eklund, P.C., "Monte Carlo Simulations of $H_2$ physisorption in finite-diameter carbon nanotube ropes," *Chemical Physics Letters* 320:352-358 (2000).
Yang, Z., et al., "On Nitrogen Sorption During High Energy Milling of Silicon Powders in Ammonia and Nitrogen," *Metallurgical and Materials Transactions*, 30A:1109-1117 (1999).
Zhuk, A. Z. et al., "Use of Low-Cost Aluminum in Electric Energy Production," *Journal of Power Sources*, 157: 921-926 (2006).
Notification Concerning Transmittal of International Preliminary Report on Patentability for International Application No. PCT/GB2013/000415 "Composition for Hydrogen Generation", date of mailing: Apr. 19, 2015.
Notification of Transmittal of the International Search Report and the Written Opinion of the International Searching Authority, or the Declaration for International Application No. PCT/GB2013/000415 "Composition for Hydrogen Generation", date of mailing: Jan. 28, 2014.

\* cited by examiner

COMPOSITION FOR HYDROGEN GENERATION

RELATED APPLICATIONS

This application is the U.S. National Stage of International Application No. PCT/GB2013/000415, filed Oct. 1, 2013, which designates the U.S., published in English, and claims priority under 35 U.S.C. §§119 or 365(c) to Great Britain Application No. 1217525.3, filed Oct. 1, 2012.

FIELD OF THE INVENTION

The invention relates to the use of nonpassivated silicon to produce hydrogen, by hydrolysis of the nonpassivated silicon. In particular, the invention relates to a composition comprising nonpassivated silicon, a process for producing a composition comprising nonpassivated silicon, and a process for producing hydrogen by reacting the composition with water.

BACKGROUND OF THE INVENTION

At present fossil fuels are a dominant source of energy. The Hydrogen Economy is a proposed replacement for the current fossil fuel economy, in which renewably produced $H_2$ is the primary energy carrier. Hydrogen has been shown to be a clean and renewable energy carrier with a high calorific value (H. Z. Wang et al, Renewal and Sustainable Energy Reviews, 2009, 13(4), p. 845-853). Although hydrogen is energy rich compared to petroleum on a per-weight basis, it is relatively poor on a volumetric basis (V. C. Y Kong et al, International Journal of Hydrogen Energy, 1999, 24(7) p. 665-6'75). Thus if portable hydrogen fuel cells are to be useful, then significant volumes of hydrogen will need to be carried "on-board", unless high pressure or cryogenic hydrogen storage is used, both of which have significant energy penalties. To address this problem, the physical or chemical confinement of hydrogen, for example within carbon nanotubes (P. Bénard et al, Journal of Alloys and Compounds, 2007, 446-447, p. 380-384) or in metal hydrides (V. C. Y Kong et al, International Journal of Hydrogen Energy, 1999, 24(7) p. 665-675), has been the subject of a considerable body of research in materials chemistry. Guidelines set out by the US Department of Energy (DOE) target hydrogen storage materials with a hydrogen yield of 9.0 wt % and a specific energy of 10.8 MJ $kg^{-1}$. However, the requirements that need to be met by the hydrogen storage material are very demanding; it must both readily absorb and release gas and be stable over many absorption-discharge cycles.

Some interest is thus now emerging in an alternative approach, which utilises the spontaneous reaction of a material (an "energy carrier") with a liquid phase, typically an aqueous medium, to generate hydrogen at point of use. To produce a maximum yield on a weight-to-weight basis, light reactive elements are the most suitable. The theoretical yield of typical light and reactive metal and metal hydrides are compared in Table 1.

TABLE 1

Theoretical hydrogen generation yield from reaction of light elements and hydrides with water, calculated with the mass of hydrogen produced normalised to the mass of material consumed.

| Element | Li | Na | Mg | Al | Si | $MgH_2$ | $NaAlH_4$ |
|---|---|---|---|---|---|---|---|
| wt % $H_2$ | 14.5 | 4.4 | 8.3 | 11.2 | 14.35 | 14.32 | 14.93 |
| Specific energy (MJ $Kg^{-1}$) | 20.7 | 6.29 | 11.87 | 16.02 | 20.52 | 20.48 | 21.35 |

In theory, Si is perhaps the element which could best meet the various criteria (Auner, N. & Holl, S., 16th International Conference on Efficiency, Costs, Optimization, and Environmental Impact of Energy Systems 1395-1402, Pergamon-Elsevier Science Ltd, Copenhagen, DENMARK; 2003). The theoretical $H_2$ yield from its reaction with water, as can be seen in Table 1, is higher than other rival elements. Indeed, silicon has a greater specific energy density than lighter elements such as Al, Mg, Na and Li, as the stoichiometry of the hydrolysis reaction is more favourable. Furthermore, it is an abundant element, comprising (as quartz sand) around 26% of the accessible earth's crust.

The feasibility of hydrogen generated from the reaction of pH neutral water and non-passivated silicon nano powder prepared by ball milling has been demonstrated in WO 2011/058317. Silicon can be prepared in a reactive form, using a simple process which reduces particle size and increases the reactive surface area of silicon without surface passivation. The resulting "nonpassivated silicon" can be reacted directly with water at low temperatures (<100° C.) to generate hydrogen in accordance with the following reaction:

$$Si(s)+2H_2O(l) \rightarrow SiO_2(s)+2H_2(g) \qquad (1)$$

The initial rate of hydrogen production observed in this reaction is typically from 20.4 to 55.8 $cm^3$/min/g and conversion yield is typically from 36 to 67%.

Although this performance is superior compared to passivated silicon and non-passivated silicon from "dry" milling, there is still room to enhance both the kinetics of the hydrolysis reaction and the yield of hydrogen produced further to meet the requirement in practical applications.

There is, therefore, an ongoing need to provide improved materials and reaction systems which address these and other problems, and which can generate hydrogen at point of use towards a target of 9.0 wt % hydrogen in accordance with the DOE guidelines.

SUMMARY OF THE INVENTION

The present inventors have found that the addition of a dispersing agent, a dispersant or a colloidal stabilizer to silicon can lead to surprising increases in both the initial hydrogen generation rate and the conversion yield of hydrogen in the hydrolysis reaction of silicon with water.

It has been found that the yield of hydrogen from the hydrolysis of silicon is limited by the aggregation of the silicon particles and the aggregation of silica with silicon particles in solution. Increasing the colloidal stability of the silicon in solution and reducing (or preventing) the aggregation of silicon with silicon particles will increase the rate of hydrogen produced in hydrolysis and increase the overall yield of hydrogen. The yield of hydrogen and the rate of hydrogen produced from the hydrolysis of silicon can be further enhanced by the addition of a dispersant that exhibits exothermic dissolution when added to water. The local heating produced by the dissolution of the dispersant drives the hydrolysis reaction forward and thus facilitates the production of $H_2$.

The addition of dispersing agents which are water-soluble molecular solids, such as sucrose or glucose, to the silicon increases the dispersion of silicon particles when the silicon sample is added to water. As the dispersing agent is water soluble, it dissolves away, providing a high surface area of silicon available to react with the water. This results in significant increases in the initial rate of hydrogen production and the conversion yields observed for the hydrolysis reaction, when compared to the hydrolysis of additive-free silicon in water. If the dispersing agent did not dissolve away, reactive silicon would be effectively passivated by the additive, reducing the reaction rate and overall yield. In one reaction, the initial rate of hydrogen production has been increased to 185.3 ml/min/g and the conversion yield has been increase to 85.9% by the addition of a dispersing agent to silicon.

The addition of a colloidal stabilizer which is a water-soluble polymer electrolyte, for example, polyacrylic acid (PAA) or sodium polyacrylic acid, to the silicon has been found to increase the colloidal stability of the silicon particles. In addition, the polymer electrolyte additive increases the dispersion of the silica and silicon in the solution, further increasing the surface area of silicon available. An initial rate of hydrogen production as high as 199.3 ml/min/g has been observed when a colloidal stabilizer is added to silicon.

An important feature of the silicon hydrolysis reaction is the environmentally benign nature of the chemicals involved, namely silicon and water. The addition of dispersing agents such as sucrose and glucose, dispersants such as potassium hydroxide and colloidal stabilizers such as PAA preserves the environmental benign merit of silicon.

A further, surprising, synergistic effect has been observed when both a dispersing agent and a colloidal stabilizer are added to silicon. With both additives present in the hydrolysis reaction, the initial rate of hydrogen production can be increased to over 850 ml/min/g and conversion yields as high as 97% have been observed. In addition, the inventors have found silicon co-milled with both a dispersing agent and a colloidal stabilizer exhibit surprising stability when stored in nitrogen.

The addition of a dispersant which is a water-soluble ionic compound having a heat of solution in water more negative than $-40$ kJmol$^{-1}$ has been found to further enhance the yield of hydrogen and the rate of hydrogen produced from the hydrolysis of silicon. The dissolution of the dispersant in water results in local heating that helps to drive the hydrolysis reaction. Furthermore, the dispersant acts to increase the dispersion of the oxidised silicon from the reacting silicon particles, which helps to preserve the high reactivity of the silicon. The inventors have found, for example, that the maximum rate of $H_2$ generation can be as high as 1730 ml/min/g when a dispersant which is a water-soluble ionic compound having a heat of solution in water more negative than $-40$ kJmol$^{-1}$ is present.

Accordingly, the invention provides a composition which comprises: (a) nonpassivated silicon; and (b) a dispersing agent which is a water-soluble molecular compound, a dispersant which is a water-soluble ionic compound having a heat of solution in water more negative than $-40$ kJmol$^{-1}$ or a colloidal stabilizer which is a water-soluble polyelectrolyte.

The invention also provides a composition which comprises: (a) nonpassivated silicon; and (b) a dispersing agent which is a water-soluble molecular compound or a colloidal stabilizer which is a water-soluble polyelectrolyte.

The invention further provides a pellet for generating hydrogen, the pellet comprising a composition of the invention as defined above encapsulated within an organic coating.

The compositions of the inventions are advantageously produced by reducing the particle size of a sample comprising silicon and the dispersing agent, or silicon and the colloidal stabilizer, by applying a mechanical force to the sample under inert conditions.

Accordingly, in another aspect, the invention provides a process for producing a composition, which composition comprises:
  (a) nonpassivated silicon; and
  (b) a dispersing agent which is a water-soluble molecular compound, a dispersant which is a water-soluble ionic compound having a heat of solution in water more negative than $-40$ kJmol$^{-1}$ or a colloidal stabilizer which is a water-soluble polyelectrolyte;
  which process comprises providing a sample comprising:
  (a) silicon; and
  (b) a dispersing agent which is a water-soluble molecular compound, a dispersant which is a water-soluble ionic compound having a heat of solution in water more negative than $-40$ kJmol$^{-1}$ or a colloidal stabilizer which is a water-soluble polyelectrolyte;
  and, under inert conditions, reducing the mean particle size of said sample by applying a mechanical force to the sample.

The invention also provides a process for producing a composition, which composition comprises: (a) nonpassivated silicon; and (b) a dispersing agent which is a water-soluble molecular compound or a colloidal stabilizer which is a water-soluble polyelectrolyte; which process comprises providing a sample comprising: (a) silicon; and (b) a dispersing agent which is a water-soluble molecular compound or a colloidal stabilizer which is a water-soluble polyelectrolyte; and, under inert conditions, reducing the mean particle size of said sample by applying a mechanical force to the sample.

In one embodiment, the process of the invention further comprises recovering the composition thus produced, under inert conditions.

The invention further provides a composition which is obtainable by the process of the invention as defined above for producing a composition.

In another aspect, the invention provides the use of the composition of the invention as defined above to produce hydrogen, by hydrolysis of the nonpassivated silicon in the composition.

The invention further provides a process for producing hydrogen, which process comprises contacting water with a composition of the invention as defined above and thereby producing hydrogen by hydrolysis of the nonpassivated silicon.

and (iii) 150 mg silicon co-milled with NaCl in a 1:1 weight ratio; with 60 ml water at 90° C.

Figure 1:
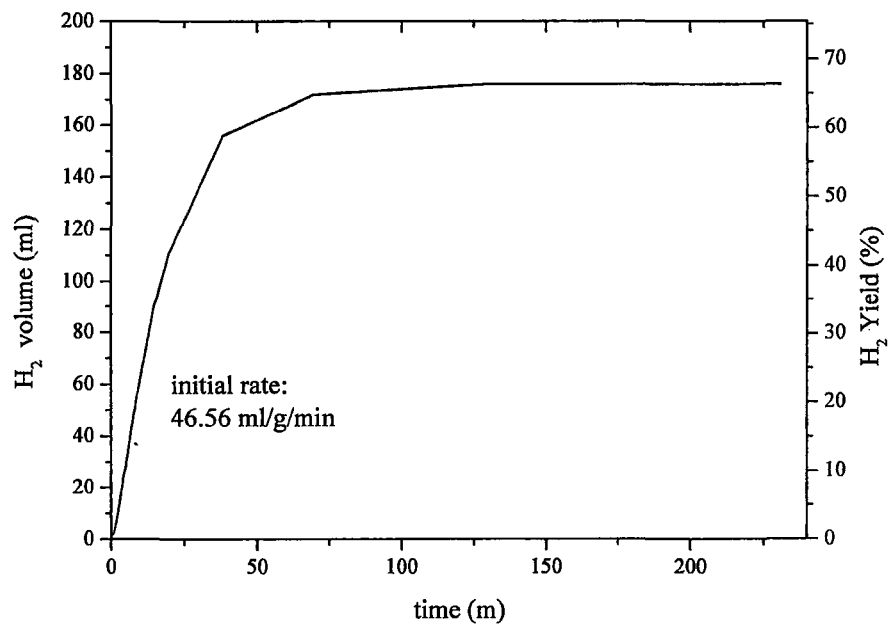
FIG. 1 is a graph of $H_2$ volume in units of ml (left hand y axis), and % yield of $H_2$ (right hand y axis), versus time in units of minutes (x axis) for the reaction of 154 mg silicon with 60 ml water at 90° C.
Figure 2A:
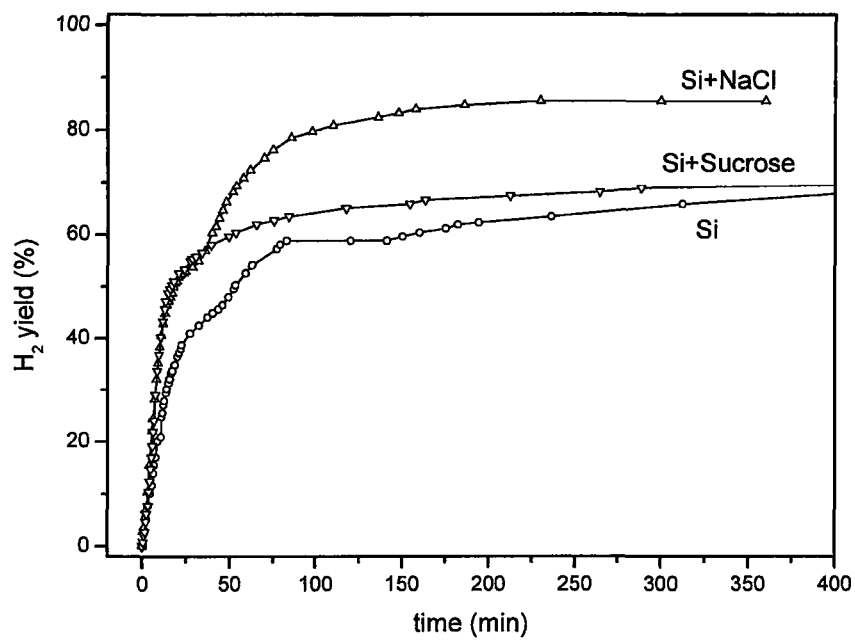
FIG. 2(*a*) is a graph of % yield of $H_2$ vents time in units of minutes for the reaction of: (i) 150 mg milled silicon; (ii) 150 mg silicon co-milled with sucrose in a 1:1 weight ratio.
Figure 2B:
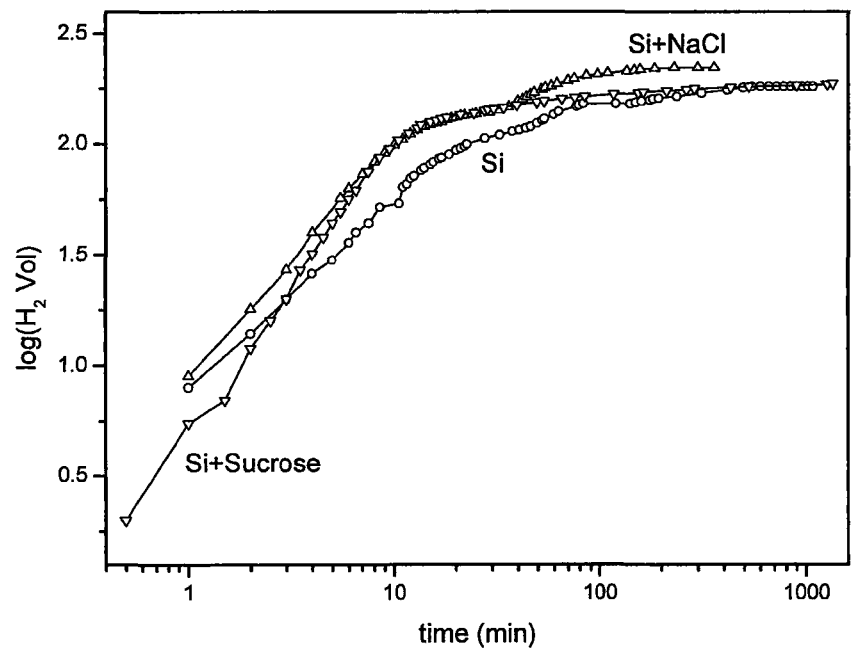

FIG. 2(b) is a graph of the rate of hydrogen production (in logarithmic scale) for the reaction of: (i) 150 mg milled silicon; (ii) 150 mg silicon co-milled with sucrose in a 1:1 weight ratio; and (iii) 150 mg silicon co-milled with NaCl in a 1:1 weight ratio; with 60 ml water at 90° C.

Figure 2C:
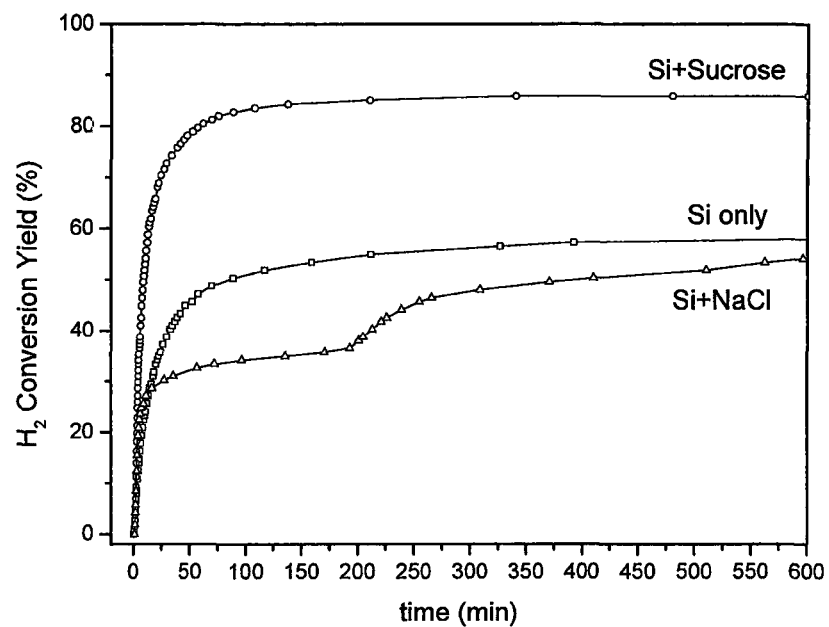

FIG. 2(c) is a graph of % yield of $H_2$ verus time in units of minutes for the reaction of: (i) 150 mg milled silicon; (ii) 150 mg silicon co-milled with sucrose in a 1:1 weight ratio; and (iii) 150 mg silicon co-milled with NaCl in a 1:1 weight ratio; with 5 ml water at 90° C.

Figure 2D:
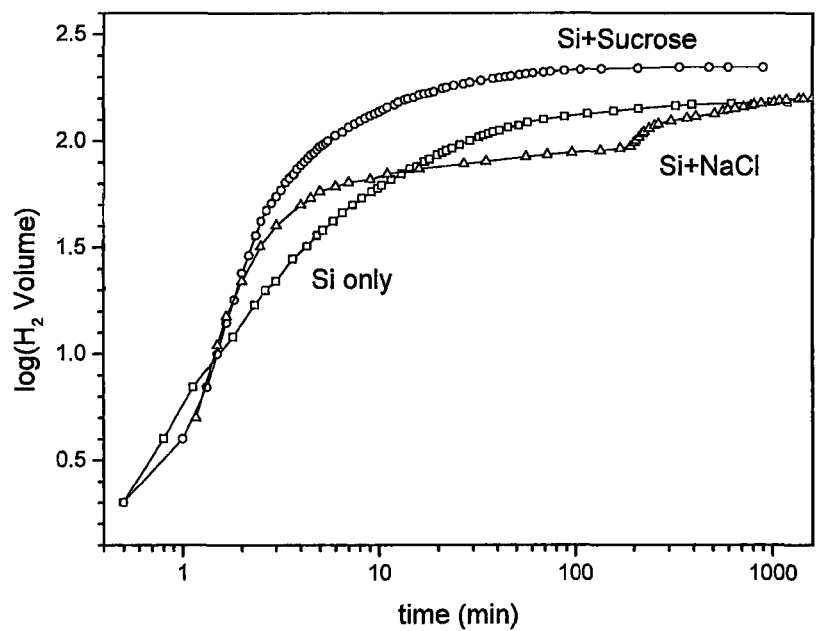

FIG. 2(d) is a graph of the rate of hydrogen production (in logarithmic scale) for the reaction of: (i) 150 mg milled silicon; (ii) 150 mg silicon co-milled with sucrose in a 1:1 weight ratio; and (iii) 150 mg silicon co-milled with NaCl in a 1:1 weight ratio; with 5 ml water at 90° C.

Figure 3:
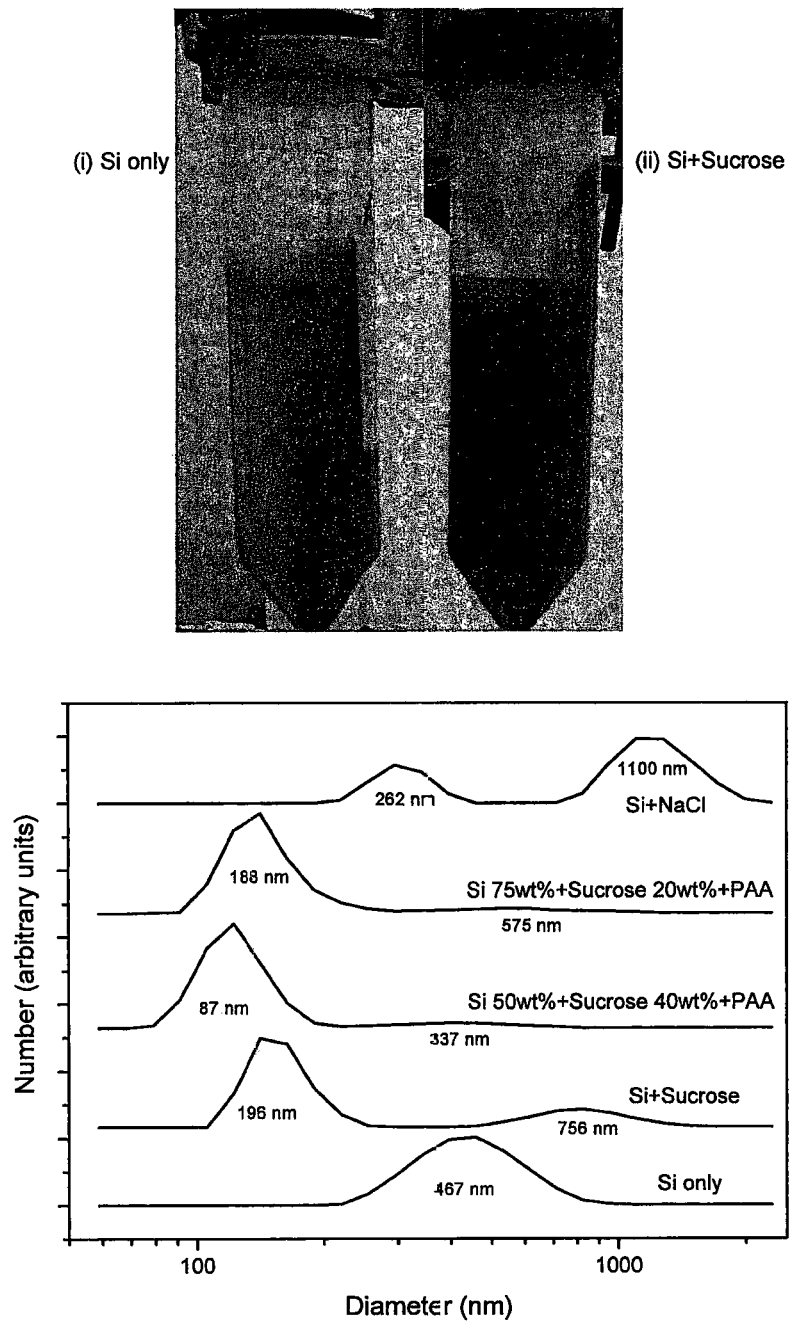

FIG. 3 is a picture of two silicon suspensions after centrifuged at 6000 rpm for 3 minutes (top): (i) is an additive-free precipitation of Si powder and (ii) is a stable suspension prepared using co-milled powder of silicon and sucrose in a 1:1 weight ratio. Further, FIG. 3 shows a graph of the particle size distribution of a number of silicon samples in aqueous solution, measure using dynamic light scattering (bottom). The samples are: (i) additive-free silicon; (ii) silicon with sucrose in a 1:1 weight ratio; (iii) silicon with sucrose and PAA, where the ratio of silicon to sucrose to PAA is 5:4:1; (iv) silicon with sucrose and PAA, where the ratio of silicon to sucrose to PAA is 15:4:1; and (v) silicon with NaCl in a 1:1 weight ratio.

Figure 4:
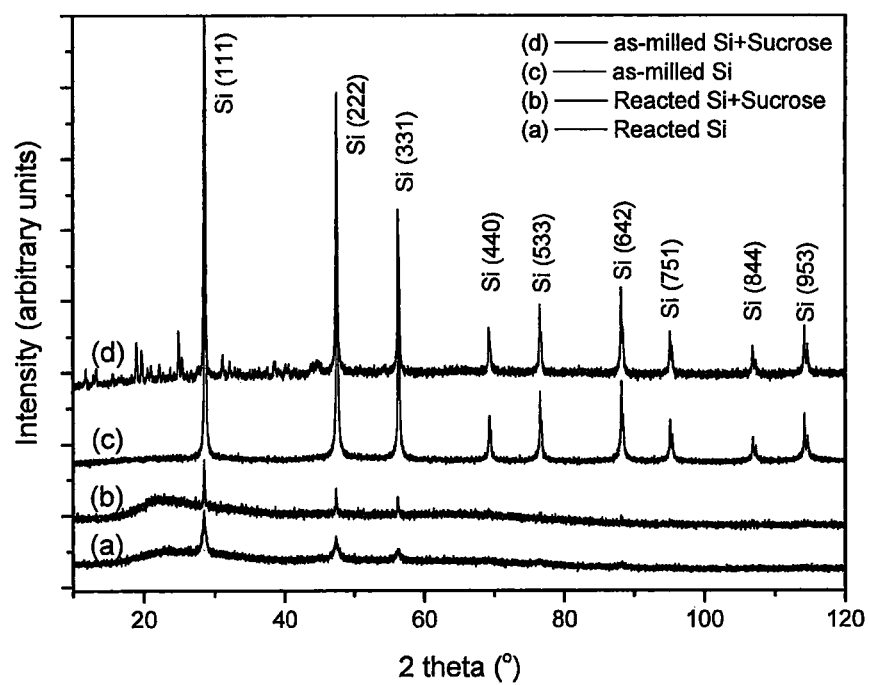

FIG. 4 is an X-Ray Diffraction pattern of samples of: (a) reacted silicon; (b) reacted silicon with sucrose in a 1:1 weight ratio; (c) as-milled silicon; and (d) as milled silicon and sucrose in a 1:1 weight ratio.

Figure 5:
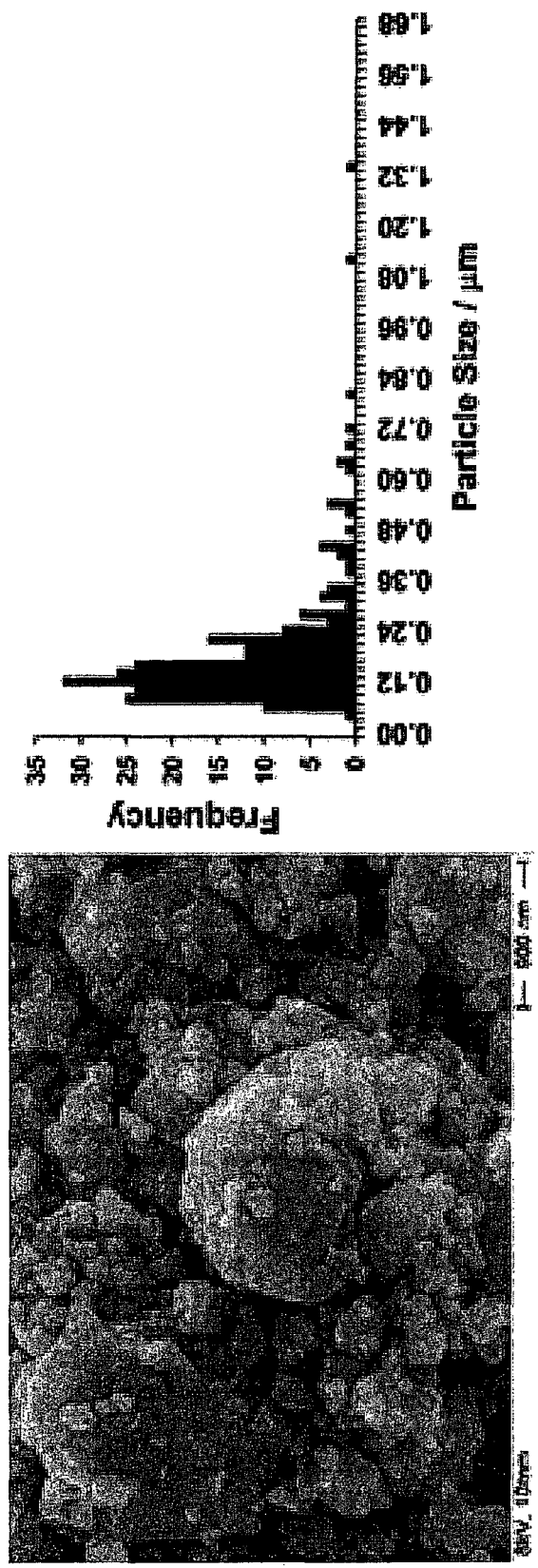
Figure 6A:
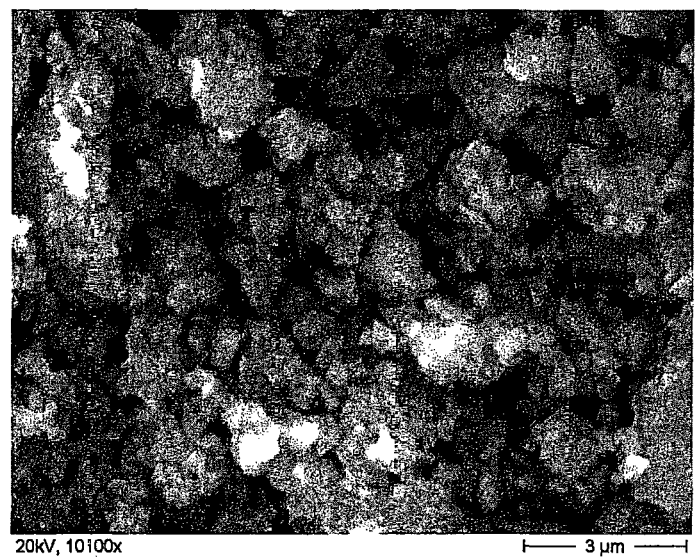
Figure 6B:
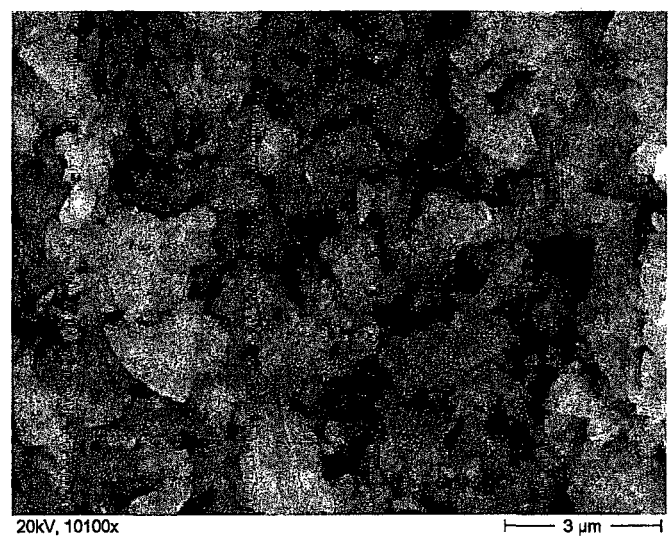
Figure 6C:
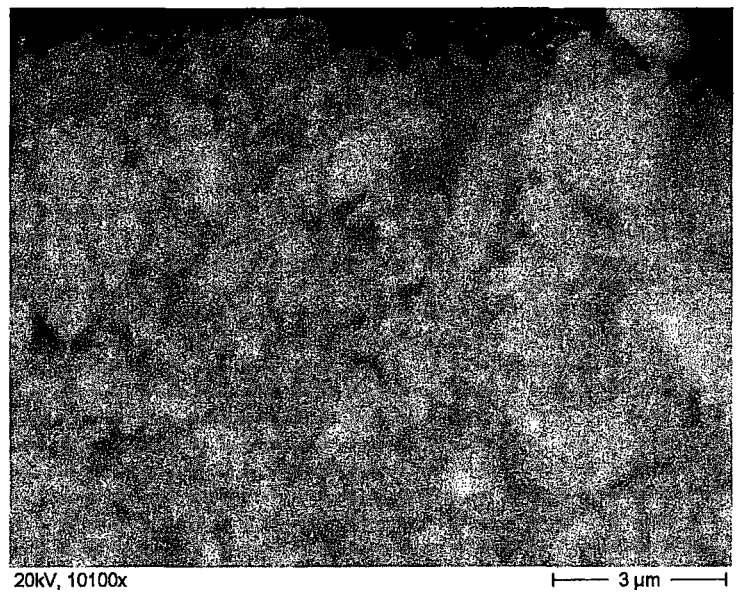
Figure 6D:
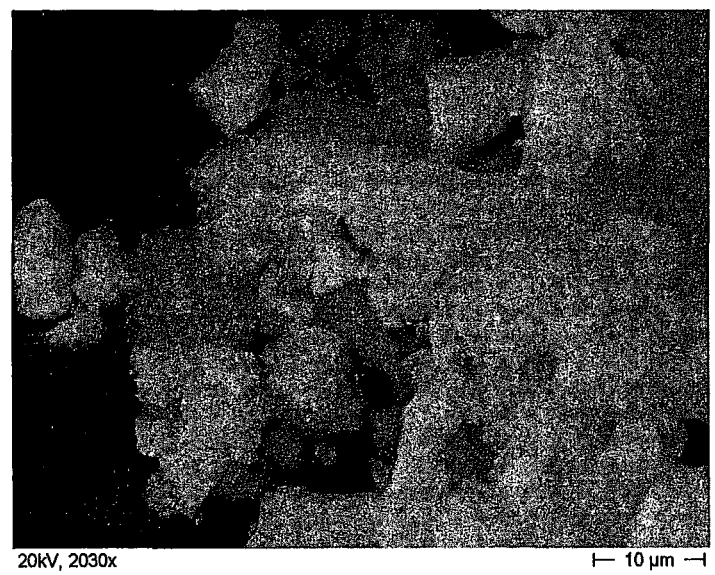

FIG. 5 is SEM image of as milled silicon powder (left) and the deduced particle size distribution (right).). The silicon powder was milled at 800 rpm for 15 minutes, exhibiting aggregation of particles of around 150 nm diameter FIG. 6 presents SEM images of as milled (a) silicon powder, (b) silicon mixed with sucrose powder in a 1:1 weight ratio, (c) a silicon powder sample after the hydrolysis reaction, (d) sample of silicon and sucrose powder initially in a 1:1 weight ratio after the hydrolysis reaction.

Figure 7A:
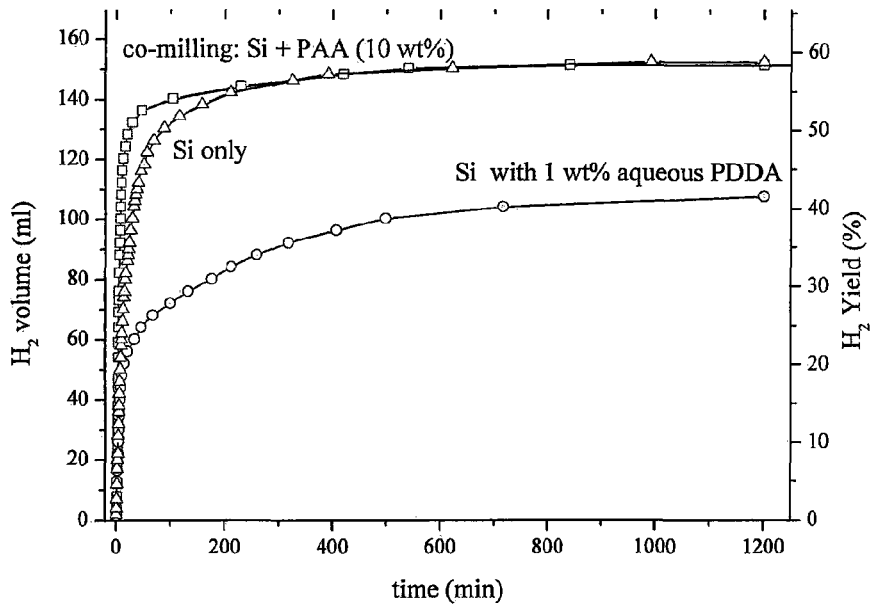

FIG. 7(a) is a graph of $H_2$ volume in units of ml (left hand y axis), and % yield of $H_2$ (right hand y axis), versus time in units of minutes (x axis) for the reaction of (i) silicon only with 5 ml water; (ii) silicon only with 5 nil aqueous 1 wt % PDDA solution; (iii) silicon co-milled with PAA in a 9:1 ratio and reaction with 5 ml water. Each sample comprises 150 mg of silicon.

Figure 7B:
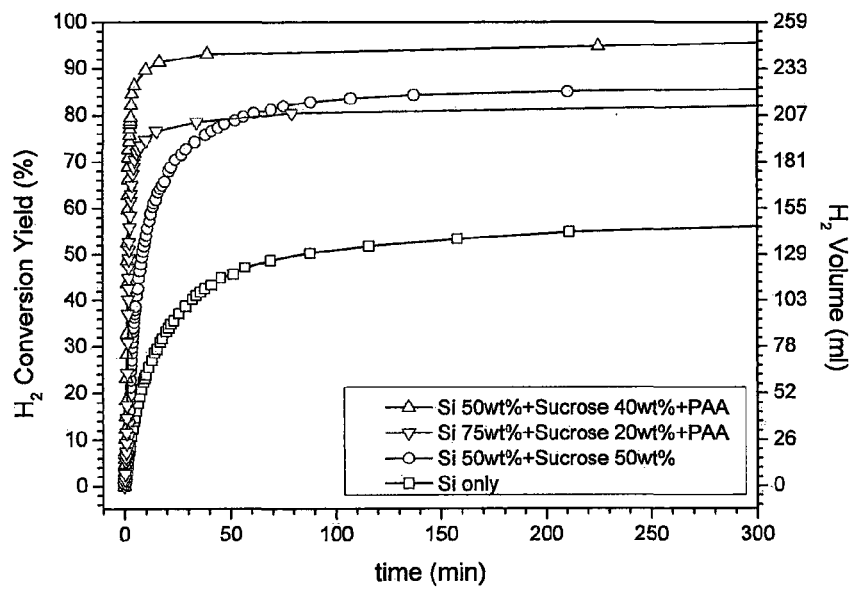

FIG. 7(b) is a graph yield of $H_2$ (left handy axis) and $H_2$ volume in units of ml (right hand y axis), versus time in units of minutes (x axis) for the reaction of silicon samples with water. Each sample comprises 150 mg of silicon. The samples are: (i) silicon only; (ii) silicon with sucrose in a 1:1 ratio; (iii) silicon with sucrose and PAA, wherein the ratio of silicon to sucrose to PAA is 15:4:1; and (iv) silicon with sucrose and PAA, wherein the ratio of silicon to sucrose to PAA is 5:4:1.

Figure 8:
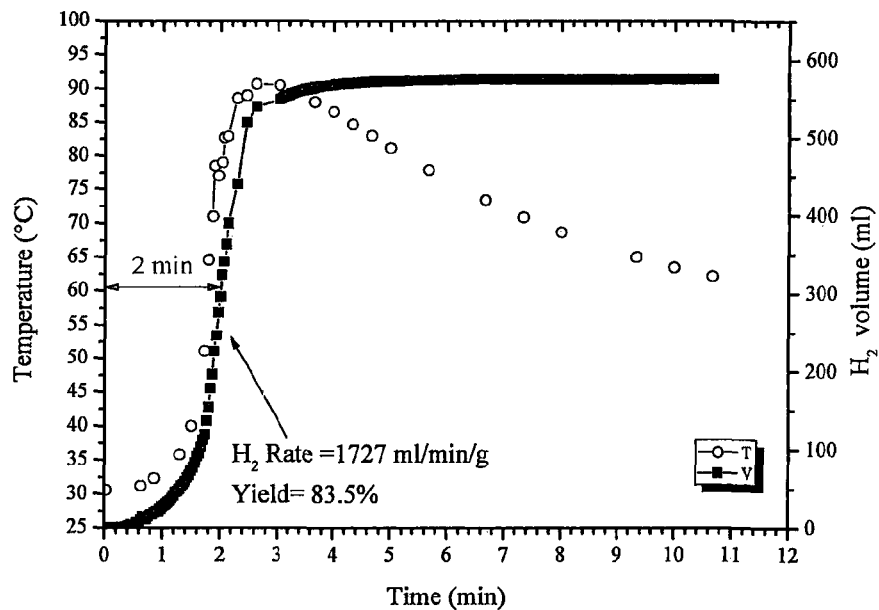

FIG. 8 is a graph of the rise in temperature in units of ° C. (left hand y axis) and $H_2$ volume in units of ml (right hand y axis), versus time in units of minutes (x axis) for the reaction of a silicon sample with water. The sample comprises 0.4 g silicon, and further comprises KOH, sucrose and PAA. The ratio of silicon to KOH to sucrose to PAA is 1:0.5:0.8:0.2.

Figure 9:
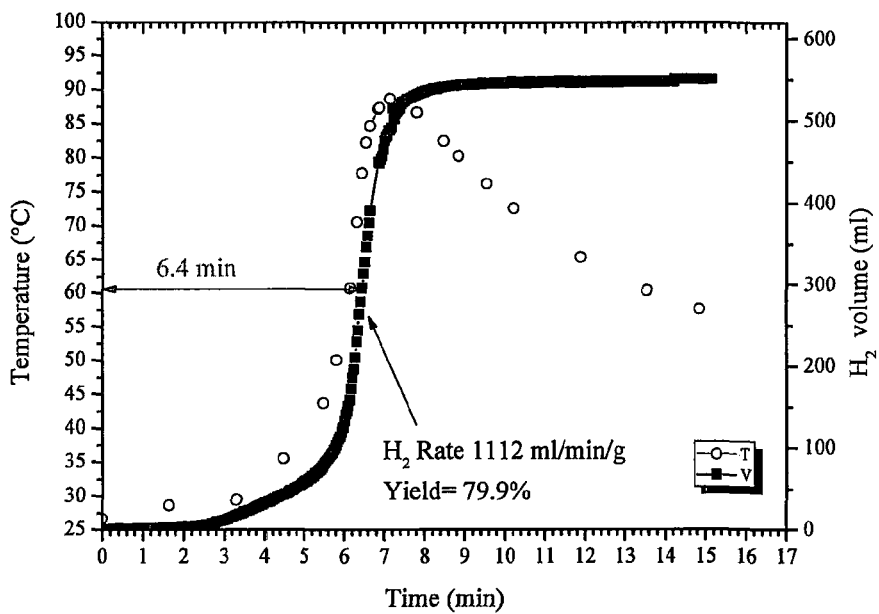

FIG. 9 is a graph of the rise in temperature in units of ° C. (left hand y axis) and $H_2$ volume in units of ml (right hand y axis), versus time in units of minutes (x axis) for the reaction of a silicon sample with water. The sample comprises 0.4 g silicon, and further comprises KOH, sucrose and PAA. The ratio of silicon to KOH to sucrose to PAA is 1:0.1:0.7:0.2.

Figure 10:
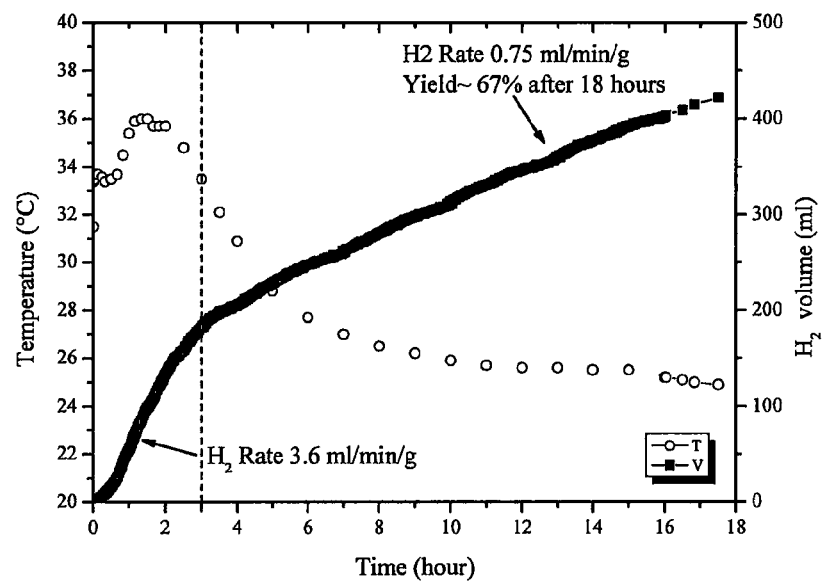

FIG. 10 is a graph of the rise in temperature in units of ° C. (left hand y axis) and $H_2$ volume in units of ml (right hand y axis), versus time in units of hours (x axis) for the reaction of a silicon sample with water. The sample comprises 0.5 g silicon, and further comprises sucrose and PAA. The ratio of silicon to sucrose to PAA is 1:0.8:0.2.

Figure 11:
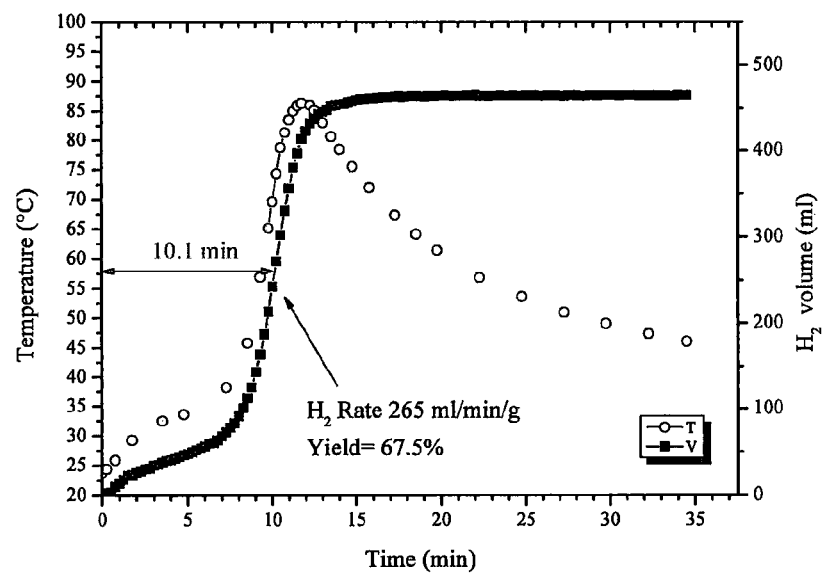

FIG. 11 is a graph of the rise in temperature in units of ° C. (left hand y axis) and $H_2$ volume in units of ml (right hand y axis), versus time in units of minutes (x axis) for the reaction of a silicon sample with water. The sample comprises 0.4 g silicon, and further comprises KOH. The ratio of silicon to KOH is 1:0.1.

DETAILED DESCRIPTION OF THE INVENTION

The invention provides a composition which comprises: (a) nonpassivated silicon; and (b) a dispersing agent which is a water-soluble molecular compound, a dispersant which is a water-soluble ionic compound having a heat of solution in water more negative than −40 kJmol$^{-1}$, or a colloidal stabilizer which is a water-soluble polyelectrolyte.

The composition may, for example, comprise: (a) nonpassivated silicon; and (b) a dispersing agent which is a water-soluble molecular compound, or a colloidal stabilizer which is a water-soluble polyelectrolyte.

The term "passivate", as used herein, refers to the process of a material, in this case elemental silicon, becoming passive or unreactive in relation to another material, in this case water, prior to using the materials together. Passivation is typically achieved by the formation of a non-reactive film or layer on the surface of the material, which inhibits the reaction in question, and it may occur spontaneously under ambient conditions. Silicon, for instance, is normally unreactive towards water due to highly efficient passivation of the silicon surface by $SiO_2$ upon exposure to air or moisture; the $SiO_2$ layer formed can have a thickness of well below 1 nm. Such passivated silicon is not capable of reacting with water to produce hydrogen in accordance with the following reaction:

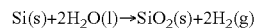

$Si(s)+2H_2O(l) \rightarrow SiO_2(s)+2H_2(g)$

Accordingly, the term "passivated silicon", as used herein, refers to silicon that is not capable of reacting with water, at any pH in the range of from 5.5 to 8.5, and at any temperature equal to or less than 100° C., to produce hydrogen.

The invention however relates to a composition comprising nonpassivated silicon, in accordance with the composition of the invention as defined herein.

The term "nonpassivated silicon", as used herein, refers to silicon that is capable of reacting with water, at a pH of from 5.5 to 8.5, and at a temperature which is equal to or less than 100° C., to produce hydrogen.

The term "dispersing agent", as used herein, refers to an agent which is capable of improving the separation of particles in a suspension and which reduces or prevents the particles settling or clumping together.

A molecular compound is a chemical compound which comprises elements that share electrons via covalent bonds.

Thus, the term "molecular compound" excludes compounds such as sodium chloride, in which all elements are present as ions which are held together in a lattice structure by ionic bonds.

The term "dispersant", as used herein, refers to an agent which is capable of improving the separation of particles in a suspension and which reduces or prevents the particles settling or clumping together.

The composition of the invention may comprise a dispersant which is a water-soluble ionic compound having a heat of solution in water more negative than −40 kJmol$^{-1}$. The heat of solution in water is equal to the heat absorbed when 1 mole of substance dissolves completely in a large volume of water at a fixed temperature of 298 K. The heat of solution in water can readily be measured by the skilled person using well known experimental techniques.

The heat of solution can be determined by adding a measured amount of the substance to a large excess volume of the solvent (e.g. water) in an insulated calorimeter of known heat capacity. The temperature rise or fall of this system is then measured as a result of the dissolution reaction. The heat of solution can then be calculated by multiplying the temperature change by the heat capacity of the insulated calorimeter and the included solvent, scaling the result to molar quantity (for example as described in http://www.chm.davidson.edu/vce/calorimetry/heatofsolutionofammoniumnitrate.html, or in Coops, J., Balk, A. N. and Tolk, M. W. (1956), Recl. Tray. Chim. Pays-Bas, 75: 75-81).

The inventors have found that the addition of a dispersant which is a water-soluble ionic compound having a heat of solution in water more negative than −40 kJmol$^{-1}$ to a composition of the invention is advantageous. A dispersant having a negative heat of solution in water dissolves exothermically in water. The heat generated during dissolution of the dispersant produces localised heating. When dissolved in the presence of nonpassivated silicon, this localised heating increases the rate of the reaction between the nonpassivated silicon and water, thus increasing the rate of H$_2$ generation. An example of a dispersant having a heat of solution in water more negative than −40 kJmol$^{-1}$ is potassium hydroxide (KOH). Sodium chloride, in contrast, has a heat of solution in water less negative than −40 kJmol$^{-1}$.

The term "colloidal stabilizer", as used herein, is a compound which is capable of stabilizing a colloid by reducing or preventing aggregation of the dispersed phase of the colloid. The colloidal stabilizers described herein are capable of enhancing the stability of the colloidal suspension formed when the composition of the invention are brought into contact with water. The enhanced stability of the colloidal suspension may, for instance, be obtain via electrostatic stabilisation or steric stabilisation.

A "polyelectrolyte" is a polymer which comprises repeat units that comprise an electrolyte group. A polyelectrolyte is also referred to herein as a "polymer electrolyte". The terms "polyelectrolyte" and "polymer electrolyte" are used herein interchangeably.

An "electrolyte group" is a group which dissociates in water. Thus, when a polyelectrolyte is exposed to water or to an aqueous solution, the electrolyte groups of the polymer dissociate, resulting in a charged polymer. The electrolyte group is typically an ionic group. The electrolyte group may, for instance, be a group which dissociates in water to produce a negatively charged polymer, such as, for instance, a carboxylic acid group or a salt of a carboxylic acid group. Alternatively, the electrolyte group may be a group which dissociates in water to produce a positively charged polymer, such as, for instance, a salt of any group which comprises a cationic quaternary nitrogen, e.g. a salt of a cationic trialkylamino group of formula —N$^+$(R)$_3$, wherein R is C$_1$-C$_{20}$ alkyl.

The electrolyte group may, for instance, be a carboxylic acid group, a salt of a carboxylic acid group, a sulfonic acid group, a salt of a sulfonic acid group, a hydroxyl group or a salt of a hydroxyl group. Alternatively, for instance, the electrolyte group may be a group which comprises a bidentate dimethylimino group of formula —N$^+$(Me)(Me)-, a monodentate allyl dimethylamino group of formula —N$^+$(allyl)(Me)$_2$, or a monodentate trimethylamino group of formula —N$^+$(Me)$_3$.

As used herein, an alkyl group can be a substituted or unsubstituted, linear or branched chain saturated radical, it is often a substituted or an unsubstituted linear chain saturated radical, more often an unsubstituted linear chain saturated radical. A C$_1$-C$_{20}$ alkyl group is an unsubstituted or substituted, straight or branched chain saturated hydrocarbon radical. Typically it is C$_1$-C$_{10}$ alkyl, for example methyl, ethyl, propyl, butyl, pentyl, hexyl, heptyl, octyl, nonyl or decyl, or C$_1$-C$_6$ alkyl, for example methyl, ethyl, propyl, butyl, pentyl or hexyl, or C$_1$-C$_4$ alkyl, for example methyl, ethyl, i-propyl, n-propyl, t-butyl, s-butyl or n-butyl. A C$_5$-C$_{30}$ alkyl group it is a substituted or unsubstituted, linear or branched chain saturated radical having from 5 to 30 carbon atoms. For instance a "C$_5$-C$_{30}$ alkyl group" is a substituted or unsubstituted linear chain saturated radical, often an unsubstituted linear chain saturated radical. Preferably a substituted or unsubstituted C$_5$-C$_{30}$ alkyl group is a substituted or unsubstituted C$_8$-C$_{18}$ alkyl group. Suitable alkyl groups include octyl, nonyl, decyl, dodecyl, hexadecyl, heptadecyl and octadecyl. A C$_1$-C$_6$ alkyl radical has from 1 to 6 carbon atoms, suitable alkyl groups include methyl, ethyl, n-propyl, propyl, n-butyl, sec-butyl and tert-butyl, as well as pentyl, e.g. CH$_2$C(CH$_3$)$_3$, and hexyl, preferably it is C$_1$-C$_4$ alkyl, for example methyl, ethyl, propyl, i-propyl, n-propyl, butyl, t-butyl, s-butyl or n-butyl.

When an alkyl group is substituted it typically bears one or more substituents selected from substituted or unsubstituted C$_1$-C$_{20}$ alkyl, substituted or unsubstituted aryl (as defined herein), cyano, amino, C$_1$-C$_{10}$ alkylamino, di(C$_1$-C$_{10}$)alkylamino, arylamino, diarylamino, arylalkylamino, amido, acylamido, hydroxy, oxo, halo, carboxy, ester, acyl, acyloxy, C$_1$-C$_{20}$ alkoxy, aryloxy, haloalkyl, sulfonic acid, sulfhydryl (i.e. thiol, —SH), C$_1$-C$_{10}$ alkylthio, arylthio, sulfonyl, phosphoric acid, phosphate ester, phosphonic acid and phosphonate ester. Examples of substituted alkyl groups include halo alkyl, hydroxyalkyl, aminoalkyl, alkoxyalkyl and alkaryl groups. The term alkaryl, as used herein, pertains to a C$_1$-C$_{20}$ alkyl group in which at least one hydrogen atom has been replaced with an aryl group. Examples of such groups include, but are not limited to, benzyl (phenylmethyl, PhCH$_2$—), benzhydryl (Ph$_2$CH—), trityl (triphenylmethyl, Ph$_3$C—), phenethyl (phenylethyl, Ph-CH$_2$CH$_2$—), styryl (Ph-CH=CH—), cinnamyl (Ph-CH=CH—CH$_2$—).

Typically a substituted alkyl group carries 1, 2 or 3 substituents, for instance 1 or 2 substituents.

As used herein, a C$_2$-C$_6$ alkenyl group can be a substituted or unsubstituted, linear or branched, preferably linear group. It contains one or more carbon-carbon double bonds. Such alkenyl groups include vinyl, allyl, propenyl, butenyl, e.g. CH$_2$C(Me)=CH$_2$, pentenyl, hexenyl. It is preferably a C$_2$-C$_4$ alkenyl group.

When an alkenyl group is substituted it typically bears one or more substituents selected from substituted or unsubstituted C$_1$-C$_{20}$ alkyl, substituted or unsubstituted aryl (as defined herein), cyano, amino, $C_1$-$C_{10}$ alkylamino, di($C_{1-10}$) alkylamino, arylamino, diarylamino, arylalkylamino, amido, acylamido, hydroxy, oxo, halo, carboxy, ester, acyl, acyloxy, $C_1$-$C_{20}$ alkoxy, aryloxy, haloalkyl, sulfonic acid, sulfhydryl (i.e. thiol, —SH), $C_1$-$C_{10}$ alkylthio, arylthio, sulfonyl, phosphoric acid, phosphate ester, phosphonic acid and phosphonate ester. Examples of substituted alkyl groups include haloalkyl, hydroxyalkyl, aminoalkyl, alkoxyalkyl and alkaryl groups. The term alkaryl, as used herein, pertains to a $C_1$-$C_{20}$ alkyl group in which at least one hydrogen atom has been replaced with an aryl group. Examples of such groups include, but are not limited to, benzyl (phenylmethyl, PhCH$_2$—), benzhydryl (Ph$_2$CH—), trityl (triphenylmethyl, Ph$_3$C—), phenethyl (phenylethyl, Ph-CH$_2$CH$_2$—), styryl (Ph-CH═CH—), cinnamyl (Ph-CH═CH—CH$_2$—).

An aryl group is a substituted or unsubstituted, monocyclic or bicyclic aromatic group which typically contains from 6 to 14 carbon atoms, preferably from 6 to 10 carbon atoms in the ring portion. Examples include phenyl, naphthyl, indenyl and indanyl groups. An aryl group is unsubstituted or substituted. When an aryl group as defined above is substituted it typically bears one or more substituents selected from $C_1$-$C_6$ alkyl which is unsubstituted (to form an aralkyl group), aryl which is unsubstituted, cyano, amino, $C_1$-$C_{10}$ alkylamino, di($C_1$-$C_{10}$)alkylamino, arylamino, diarylamino, arylalkylamino, amido, acylamido, hydroxy, halo, carboxy, ester, acyl, acyloxy, $C_1$-$C_{20}$ alkoxy, aryloxy, haloalkyl, sulfhydryl (i.e. thiol, —SH), $C_{1-10}$ alkylthio, arylthio, sulfonic acid, phosphoric acid, phosphate ester, phosphonic acid and phosphonate ester and sulfonyl. Typically it carries 0, 1, 2 or 3 substituents. A substituted aryl group may be substituted in two positions with a single $C_1$-$C_6$ alkylene group, or with a bidentate group represented by the formula —X—($C_1$-$C_6$)alkylene, or —X—($C_1$-$C_6$)alkylene-X—, wherein X is selected from O, S and NR, and wherein R is H, aryl or $C_1$-$C_6$ alkyl. Thus a substituted aryl group may be an aryl group fused with a cycloalkyl group or with a heterocyclyl group. The ring atoms of an aryl group may include one or more heteroatoms (as in a heteroaryl group). Such an aryl group (a heteroaryl group) is a substituted or unsubstituted mono- or bicyclic heteroaromatic group which typically contains from 6 to 10 atoms in the ring portion including one or more heteroatoms. It is generally a 5- or 6-membered ring, containing at least one heteroatom selected from O, S, N, P, Se and Si. It may contain, for example, 1, 2 or 3 heteroatoms. Examples of heteroaryl groups include pyridyl, pyrazinyl, pyrimidinyl, pyridazinyl, furanyl, thienyl, pyrazolidinyl, pyrrolyl, oxazolyl, oxadiazolyl, isoxazolyl, thiadiazolyl, thiazolyl, isothiazolyl, imidazolyl, pyrazolyl, quinolyl and isoquinolyl. A heteroaryl group may be unsubstituted or substituted, for instance, as specified above for aryl. Typically it carries 0, 1, 2 or 3 substituents.

Polymers which comprise repeat units that comprise an electrolyte group include, but are not limited to, polystyrene sulfonate (PSS), poly(acrylic acid) (PAA), polyacrylamide (PAM), polydiallyldimethylammonium chloride (PDDA), ploy(methyl methacrylate) (PMMA), poly(L-lysine), polyethylenimine, and salts thereof.

Usually, the composition of the invention comprises an intimate mixture of (a) said nonpassivated silicon and (b) said dispersing agent, dispersant or colloidal stabilizer.

The composition of the invention may, for example, comprise an intimate mixture of (a) said nonpassivated silicon and (b) said dispersing agent or colloidal stabilizer.

The term "intimate mixture", as used herein, refers to a physical mixture of at least two components which are in direct physical contact with each other, wherein at least a portion of each component is present in particulate form and the particles are in physical contact with one another in a substantially homogeneous mixture. Such intimate mixtures are usually obtainable by milling the components together. The milling may be as further defined herein.

The intimate mixture is typically obtained by milling the nonpassivated silicon with the dispersing agent, dispersant or colloidal stabilizer. The milling is as further defined herein for the process of the invention.

The intimate mixture may, for example, be obtained by milling the nonpassivated silicon with the dispersing agent or colloidal stabilizer. The milling is as further defined herein for the process of the invention.

Typically, the composition of the invention comprises (a) said nonpassivated silicon and (b) said dispersing agent which is a water-soluble molecular compound. The dispersing agent is typically a solid.

As the skilled person will appreciate, when the composition of the invention comprises (a) said nonpassivated silicon and (b) said dispersing agent which is a water-soluble molecular compound, the composition may comprise at least one additional dispersing agent, i.e., said composition may comprise a mixture of two or more dispersing agents, wherein at least one dispersing agent is a water-soluble molecular compound. For instance, the composition may comprise said nonpassivated silicon and two or three dispersing agents, wherein at least one dispersing agent is a water-soluble molecular compound.

The at least one additional dispersing agent may, for example, be a dispersing agent such as a metal hydroxide. The at least one additional dispersing agent may, for instance, be an alkali metal hydroxide such as lithium hydroxide, sodium hydroxide, potassium hydroxide, rubidium hydroxide, caesium hydroxide or francium hydroxide. The at least one additional dispersing agent may, for instance, be sodium hydroxide, potassium hydroxide, rubidium hydroxide or caesium hydroxide, for instance sodium hydroxide, potassium hydroxide or rubidium hydroxide. In one embodiment, the at least one additional dispersing agent is potassium hydroxide.

The composition may alternatively comprise (a) said nonpassivated silicon and (b) said dispersant which is a water-soluble ionic compound having a heat of solution in water more negative than −40 kJmol$^{-1}$.

The composition may, for example, comprise said nonpassivated silicon, a dispersant which is a water-soluble ionic compound having a heat of solution in water more negative than −40 kJmol$^{-1}$ and one or more further dispersants, i.e. said composition may comprise a mixture of two or more dispersants, wherein at least one dispersant is a water-soluble ionic compound having a heat of solution in water more negative than −40 kJmol$^{-1}$. For instance, the composition may comprise said nonpassivated silicon and two or three dispersants, wherein at least one dispersant is a water-soluble ionic compound having a heat of solution in water more negative than −40 kJmol$^{-1}$.

Further, the composition may, for example, comprise (a) said nonpassivated silicon and (b) said dispersing agent which is a water-soluble molecular compound and said dispersant which is a water-soluble ionic compound having a heat of solution in water more negative than −40 kJmol$^{-1}$ and one or more further dispersing agents and/or one of more further dispersants. For instance, the composition may comprise (a) said nonpassivated silicon and (b) a dispersing agent which is a water-soluble molecular compound and optionally one or two further dispersing agents and a dispersant which is a water-soluble ionic compound having a heat of solution in water more negative than −40 kJmol$^{-1}$ and optionally one or two further dispersants.

Alternatively, the composition of the invention may comprise (a) said nonpassivated silicon and (b) said colloidal stabilizer which is a water-soluble polyelectrolyte.

When the composition of the invention comprises (a) said nonpassivated silicon and (b) said colloidal stabilizer which is a water-soluble polyelectrolyte, said composition may comprise at least one additional colloidal stabilizer, i.e., said composition may comprise a mixture of two or more colloidal stabilizing agents, wherein at least one colloidal stabilizer is a water-soluble polyelectrolyte. For instance, said composition may comprise said nonpassivated silicon and two or three colloidal stabilizers, wherein at least one colloidal stabilizer is a water-soluble polyelectrolyte.

When the composition of the invention comprises (a) said nonpassivated silicon and (b) said dispersing agent which is a water-soluble molecular compound, the composition may further comprise (c) a colloidal stabilizer.

Usually, the colloidal stabilizer is a surfactant, a water-soluble polyelectrolyte, or a water-soluble non-ionic polymer.

When the composition of the invention comprises (a) said nonpassivated silicon and (b) said dispersant which is a water-soluble ionic compound having a heat of solution in water more negative than −40 kJmol$^{-1}$, the composition may further comprise (c) a colloidal stabilizer. The colloidal stabilizer may, for example, be a surfactant, a water-soluble polyelectrolyte, or a water-soluble non-ionic polymer.

When the composition of the invention comprises (a) said nonpassivated silicon, (b) said dispersing agent which is a water-soluble molecular compound and (c) said dispersant which is a water-soluble ionic compound having a heat of solution in water more negative than −40 kJmol$^{-1}$, the composition may further comprise (d) a colloidal stabilizer. The colloidal stabilizer may, for example, be a surfactant, a water-soluble polyelectrolyte, or a water-soluble non-ionic polymer.

The term "surfactant" refers to a compound that is amphiphilic, usually an organic compound. Amphiphilic compounds are compounds comprising both a hydrophobic group and a hydrophilic group. A surfactant is thus a compound which comprises both a water soluble component and a water insoluble component. The hydrophilic groups may be anionic, cationic or non-ionic in nature. The surfactant may be an ionic surfactant, a cationic surfactant or a non-ionic surfactant. Examples of surfactants include sodium dodecyl sulphate (SDS), cetrimonium bromide (CTAB), polyethylene glycol (PEG or PEO) and Triton X100 ($C_{14}H_{22}O(C_2H_4O)_n$). When present in the composition of the invention, surfactants typically provide steric stabilisation to the composition.

The term "non-ionic", as used herein, defines a molecular compound which consists of elements that share electrons via covalent bonds. There are no ionic bonds in a non-ionic compound. The covalent bonds may be polar or non-polar. A polar covalent bond is a bond in which the sharing of the electron pair is unequal, and the electrons do not spend an equal amount of time around each element in the bond. When added to a solution, a non-ionic compound will not dissociate to form ions in that solution.

When present in the composition of the invention, a water-soluble non-ionic polymer typically provides steric stabilisation to the composition. Examples of suitable water-soluble non-ionic polymers include, but are not limited to, polyvinyl alcohol (PVA) and polyvinylpyrrolidone (PVP).

Typically, when the composition of the invention comprises (a) said nonpassivated silicon, (b) said dispersing agent which is a water-soluble molecular compound and (c) a colloidal stabilizer, the colloidal stabilizer is a surfactant, a water-soluble polyelectrolyte or a water-soluble non-ionic polymer. When the colloidal stabilizer is a surfactant, said colloidal stabilizer may comprise hydrophilic groups that are anionic, cationic or non-ionic in nature. For instance, the colloidal stabilizer may comprise (a) a substituted or unsubstituted $C_5$-$C_{30}$ alkyl group and (b) a sulphate group, a group comprising a quaternary nitrogen atom, a carboxylate group, a sulphate group or a phosphate group. For instance, the colloidal stabilizer may comprise (a) an unsubstituted $C_5$-$C_{30}$ alkyl group and (b) a sulphate group or a group comprising a quaternary nitrogen atom. For example, the colloidal stabilizer may be sodium dodecyl sulphate (SDS) or cetrimonium bromide (CTAB). Alternatively, the colloidal stabilizer may comprise a poly(alkylene oxide), for instance a poly(oxyethylene) or a poly(oxypropylene). For instance, the colloidal stabilizer may be polyethylene glycol (PEG or PEO). In a further alternative, the colloidal stabilizer may comprise a tetramethylbutyl group or a phenyl group, for instance, the colloidal stabilizer may be Triton X-100. Alternatively, the colloidal stabilizer may be a water-soluble non-ionic polymer such as poly vinyl alcohol or poly vinyl pyrrolidone.

When, for example, the composition of the invention comprises (a) said nonpassivated silicon, (b) said dispersing agent which is a water-soluble molecular compound and/or said dispersant which is a water-soluble ionic compound having a heat of solution in water more negative than −40 kJmol$^{-1}$ and (c) a colloidal stabilizer, the colloidal stabilizer is a surfactant, a water-soluble polyelectrolyte or a water-soluble non-ionic polymer. When the colloidal stabilizer is a surfactant, said colloidal stabilizer may comprise hydrophilic groups that are anionic, cationic or non-ionic in nature. For instance, the colloidal stabilizer may comprise (a) a substituted or unsubstituted $C_5$-$C_{30}$ alkyl group and (b) a sulphate group, a group comprising a quaternary nitrogen atom, a carboxylate group, a sulphate group or a phosphate group. For instance, the colloidal stabilizer may comprise (a) an unsubstituted $C_5$-$C_{30}$ alkyl group and (b) a sulphate group or a group comprising a quaternary nitrogen atom. For example, the colloidal stabilizer may be sodium dodecyl sulphate (SDS) or cetrimonium bromide (CTAB). Alternatively, the colloidal stabilizer may comprise a poly(alkylene oxide), for instance a poly(oxyethylene) or a poly(oxypropylene). For instance, the colloidal stabilizer may be polyethylene glycol (PEG or PEO). In a further alternative, the colloidal stabilizer may comprise a tetramethylbutyl group or a phenyl group, for instance, the colloidal stabilizer may be Triton X-100. Alternatively, the colloidal stabilizer may be a water-soluble non-ionic polymer such as poly vinyl alcohol or poly vinyl pyrrolidone.

When the composition of the invention comprises (a) said nonpassivated silicon, (b) said dispersing agent which is a water-soluble molecular compound and (c) a colloidal stabilizer, the composition may comprise at least one further dispersing agent or at least one further colloidal stabilizer. Thus the composition may comprise said nonpassivated silicon, two or more dispersing agents, wherein at least one dispersing agent is a water-soluble molecular compound, and a colloidal stabilizer. For example, the composition may comprise said nonpassivated silicon, and two or three dispersing agents, wherein at least one dispersing agent is a water-soluble molecular compound, and a colloidal stabilizer. Alternatively, the composition may comprise said nonpassivated silicon, said dispersing agent which is a water-soluble molecular compound and two or more colloidal stabilizers. For example, the composition may comprise said nonpassivated silicon, said dispersing agent which is a water-soluble molecular compound and two or three colloidal stabilizers. As a further alternative, the composition may comprise said nonpassivated silicon, and two or more dispersing agents, wherein at least one dispersing agent is a water-soluble molecular compound, and two or more colloidal stabilizers. For example the composition may comprise said nonpassivated silicon, and two or three dispersing agents, wherein at least one dispersing agent is a water-soluble molecular compound, and two or three colloidal stabilizers.

Usually, when the composition of the invention comprises a colloidal stabilizer, the colloidal stabilizer is a water-soluble polyelectrolyte.

When the composition of the invention comprises (a) said nonpassivated silicon, (b) said dispersing agent which is a water-soluble molecular compound and (c) a colloidal stabilizer which is a water-soluble polyelectrolyte, the composition may comprise at least one further dispersing agent or at least one further colloidal stabilizer. Thus the composition may comprise said nonpassivated silicon, two or more dispersing agents, wherein at least one dispersing agent is a water-soluble molecular compound, and a colloidal stabilizer which is a water-soluble polyelectrolyte. For example, the composition may comprise said nonpassivated silicon, two or three dispersing agents, wherein at least one dispersing agent is a water-soluble molecular compound, and a colloidal stabilizer is a water-soluble polyelectrolyte. Alternatively, the composition may comprise said nonpassivated silicon, said dispersing agent which is a water-soluble molecular compound and two or more colloidal stabilizers, wherein at least one colloidal stabilizer is a water-soluble polyelectrolyte. For example, the composition may comprise said nonpassivated silicon, said dispersing agent which is a water-soluble molecular compound and two or three colloidal stabilizers, wherein at least one colloidal stabilizer is a water-soluble polyelectrolyte. As a further alternative, the composition may comprise said nonpassivated silicon, two or more dispersing agents, wherein at least one dispersing agent is a water-soluble molecular compound, and two or more colloidal stabilizers, wherein at least one of which is a water-soluble polyelectrolyte. For example the composition may comprise said nonpassivated silicon, two or three dispersing agents, wherein at least one dispersing agent is a water-soluble molecular compound, and two or three colloidal stabilizers, wherein at least one colloidal stabilizer is a water-soluble polyelectrolyte.

Typically, when the composition of the invention comprises (a) said nonpassivated silicon, (b) said dispersing agent which is a water-soluble molecular compound and (c) a colloidal stabilizer which is a water-soluble polyelectrolyte, the composition comprises an intimate mixture of said nonpassivated silicon, said dispersing agent, and said colloidal stabilizer.

Usually, said intimate mixture is obtainable by milling the nonpassivated silicon with the dispersing agent and the colloidal stabilizer. The milling may be as further defined herein for the process of the invention for producing a composition.

The composition may comprise (a) said nonpassivated silicon with (b) said dispersing agent which is a water-soluble molecular compound, and/or (c) said dispersant which is a water-soluble ionic compound having a heat of solution in water more negative than $-40$ kJmol$^{-1}$ and (d) a colloidal stabilizer. The composition may alternatively comprise any combination of (a) said nonpassivated silicon with (b) said dispersing agent which is a water-soluble molecular compound, and/or (c) said dispersant which is a water-soluble ionic compound having a heat of solution in water more negative than $-40$ kJmol$^{-1}$ and/or (d) a colloidal stabilizer which is a water-soluble polyelectrolyte. For instance, the composition may comprise (a) said nonpassivated silicon, (b) said dispersing agent which is a water-soluble molecular compound, (c) said dispersant which is a water-soluble ionic compound having a heat of solution in water more negative than $-40$ kJmol$^{-1}$ and (d) a colloidal stabilizer which is a water-soluble polyelectrolyte.

The composition may further comprise at least one further dispersing agent and/or at least one further dispersant and/or at least one further colloidal stabilizer. The at least one further colloidal stabilizer may, for instance, be a water-soluble polyelectrolyte.

Thus, the composition may comprise said nonpassivated silicon, two or more dispersants, wherein at least one dispersant is a water-soluble ionic compound having a heat of solution in water more negative than $-40$ kJmol$^{-1}$ and a colloidal stabilizer. For example, the composition may comprise said nonpassivated silicon, and two or three dispersants, wherein at least one dispersant is a water-soluble ionic compound having a heat of solution in water more negative than $-40$ kJmol$^{-1}$ and a colloidal stabilizer. The composition may, for instance, comprise said nonpassivated silicon, said dispersant which is a water-soluble ionic compound having a heat of solution in water more negative than $-40$ kJmol$^{-1}$ and two or more colloidal stabilizers. For example, the composition may comprise said nonpassivated silicon, said dispersant which is a water-soluble ionic compound having a heat of solution in water more negative than $-40$ kJmol$^{-1}$ and two or three colloidal stabilizers. As a further alternative, the composition may comprise said nonpassivated silicon, two or more dispersants, wherein at least one dispersant is a water-soluble ionic compound having a heat of solution in water more negative than $-40$ kJmol$^{-1}$ and two or more colloidal stabilizers. For example the composition may comprise said nonpassivated silicon, two or three dispersants, wherein at least one dispersant is a water-soluble ionic compound having a heat of solution in water more negative than $-40$ kJmol$^{-1}$ and two or three colloidal stabilizers.

The composition may alternatively comprise said nonpassivated silicon, two or more dispersing agents, wherein at least one dispersing agent is a water-soluble molecular compound, two or more dispersants, wherein at least one dispersant is a water-soluble ionic compound having a heat of solution in water more negative than $-40$ kJmol$^{-1}$ and a colloidal stabilizer. For example, the composition may comprise said nonpassivated silicon, and two or three dispersing agents, wherein at least one dispersing agent is a water-soluble molecular compound, and two or three dispersants, wherein at least one dispersant is a water-soluble ionic compound having a heat of solution in water more negative than $-40$ kJmol$^{-1}$ and a colloidal stabilizer. The composition may, for instance, comprise said nonpassivated silicon, said dispersing agent which is a water-soluble molecular compound, said dispersant which is a water-soluble ionic compound having a heat of solution in water more negative than $-40$ kJmol$^{-1}$ and two or more colloidal stabilizers. For example, the composition may comprise said nonpassivated silicon, said dispersing agent which is a water-soluble molecular compound, said dispersant which is a water-soluble ionic compound having a heat of solution in water more negative than −40 kJmol$^{-1}$ and two or three colloidal stabilizers. As a further alternative, the composition may comprise said nonpassivated silicon, two or more dispersing agents, wherein at least one dispersing agent is a water-soluble molecular compound, two or more dispersants, wherein at least one dispersant is a water-soluble ionic compound having a heat of solution in water more negative than −40 kJmol$^{-1}$ and two or more colloidal stabilizers. For example, the composition may comprise said nonpassivated silicon, two or three dispersing agents, wherein at least one dispersing agent is a water-soluble molecular compound, two or three dispersants, wherein at least one dispersant is a water-soluble ionic compound having a heat of solution in water more negative than −40 kJmol$^{-1}$ and two or three colloidal stabilizers.

When, for instance, the composition of the invention comprises (a) said nonpassivated silicon, (b) said dispersing agent which is a water-soluble molecular compound, (c) said dispersant which is a water-soluble ionic compound having a heat of solution in water more negative than −40 kJmol$^{-1}$ and (d) a colloidal stabilizer which is a water-soluble polyelectrolyte, the composition may comprise an intimate mixture of said nonpassivated silicon, said dispersing agent, said dispersant and said colloidal stabilizer.

Usually, said intimate mixture is obtainable by milling the nonpassivated silicon with the dispersing agent, the dispersant and the colloidal stabilizer. The milling may be as further defined herein for the process of the invention for producing a composition.

Typically, when the composition of the invention comprises a dispersing agent which is a water-soluble molecular compound, the dispersing agent is one which gives rise to a low ionic strength solution. Thus, typically, the ionic strength of a 1.0 M aqueous solution of said dispersing agent, which solution consists of water and said dispersing agent, is less than or equal to 0.1 mol/dm$^3$.

The addition of high ionic strength compounds, such as NaCl, has been found to cause aggregation of silicon particles in solution. This occurs because the high ionic strength shields the negative charge of silicon. Aggregation of the silicon particles reduces the combined surface area of the silicon in solution and thus reduces the silicon available to react with the water molecules. The addition of low ionic strength dispersing agents has been found to be advantageous as they do not significantly shield the negative charge of silicon and thus do not cause the colloidal stability to decrease significantly.

The ionic strength of a solution is the concentration of ionic charge in that solution. As such, the ionic strength is a measure of the concentration of all ions in that solution. Ionic strength may be readily calculated by the skilled person, for a given solution, using the formula:

$$I = \frac{1}{2}\sum_{i=1}^{n} c_i z_i^2$$

wherein I is the ionic strength, $c_i$ is the molar concentration of ion i (mol dm$^{-3}$), $z_i$ is the charge number of that ion, and the sum is taken over all ions in the solution.

In some embodiments, the ionic strength of a 1.0 M aqueous solution of said dispersing agent, which solution consists of water and said dispersing agent, is less than or equal to 0.5 mol/dm$^3$. For instance the ionic strength of a 1.0 M aqueous solution of said dispersing agent, which solution consists of water and said dispersing agent, may be less than or equal to 0.01 mol/dm$^3$. Typically, for instance, the ionic strength of a 1.0 M aqueous solution of said dispersing agent, which solution consists of water and said dispersing agent, is less than or equal to 0.005 mol/dm$^3$, or for instance less than or equal to 0.001 mol/dm$^3$.

Usually, when the composition of the invention comprises a dispersing agent which is a water-soluble molecular compound, said dispersing agent is non-ionic.

Typically, the dispersing agent is a charge-neutral, covalent compound.

When the composition of the invention comprises a dispersing agent which is a water-soluble molecular compound, the solubility of said dispersing agent in water at 90° C. and at 1 atmosphere of pressure is typically equal to or greater than 0.1 g/ml, for instance from 0.1 g/ml to 5.0 g/ml. The solubility of said dispersing agent in water at 90° C. and at 1 atmosphere of pressure is preferably equal to or greater than 0.5 g/ml, for instance from 0.5 g/ml to 5.0 g/ml.

The solubility of a compound indicates the ability of that compound (the solute) to dissolve in a solvent to form a homogeneous solution with a solvent. The solubility of a given solute will typically depend on temperature, pressure and the solvent used. Solubility may be measured by routine methods, that are well known to the skilled person.

Typically, the solubility of said dispersing agent in water at 90° C. and at 1 atmosphere of pressure is equal to or greater than 1.0 g/ml, for instance from 1.0 g/ml to 5.0 g/ml. More typically, the solubility of said dispersing agent in water at 90° C. and at 1 atmosphere of pressure is equal to or greater than 2.0 g/ml. Even more typically, the solubility of said dispersing agent in water at 90° C. and at 1 atmosphere of pressure is equal to or greater than 3.0 g/ml, for instance from 3.0 g/ml to 5.0 g/ml.

When the composition of the invention comprises (a) nonpassivated silicon; and (b) a dispersing agent which is a water-soluble molecular compound, the weight ratio of said nonpassivated silicon to said dispersing agent is typically from 100:1 to 1:5, for instance, from 10:1 to 1:2. Preferably it is from 10:1 to 1:1. The weight ratio of said nonpassivated silicon to said dispersing agent may for instance be from 5:1 to 1:2, preferably from 5:1 to 1:1, for instance from 2:1 to 1:1. The weight ratio of said nonpassivated silicon to said dispersing agent may, for instance, be 1:1.

Typically, when the composition of the invention comprises a dispersing agent which is a water-soluble molecular compound, said dispersing agent is a carbohydrate.

The term "carbohydrate" refers to an organic compound consisting of carbon, oxygen and hydrogen. It is to be understood that the term carbohydrate encompasses monosaccharides, disaccharides, oligosaccharides and polysaccharides. In these compounds, the hydrogen to oxygen atom ratio is usually 2:1. The term, as used herein, also extends to hydrogenated forms of carbohydrates.

Thus the dispersing agent may, for instance, be a sugar or a sugar alcohol.

The term "oligosaccharides", as used herein, refers to a carbohydrate with a small number of monosaccharides, typically from 2 to 10 monosaccharides. Thus, the term oligosaccharides encompasses disaccharides.

The term "sugar alcohol" refers to a hydrogenated form of an alcohol. The carbonyl group of the alcohol has been reduced to primary or secondary hydroxyl group to form the sugar alcohol. As used herein, the term "sugar alcohol" refers to compounds comprising three or more carbon atoms.

Suitable monosaccharides include, but are not limited to, trioses, tetroses, pentoses, hexoses and heptoses, for example glucose, fructose, galactose, xylose, lyxose, mannose and ribose. Suitable disaccharides include, but are not limited to, sucrose, lactose, maltose, lactulose, trehalose and cellobiose. Suitable oligosaccharides include, but are not limited to, sucrose, lactose, maltose, lactulose, trehalose, cellobiose, isomaltotriose, nigerotriose, maltotriose, melezitose, maltotriulose, raffinose and kestose. Suitable polysaccharides include, but are not limited to, amylase, amylopectin, starch (which comprises amylase and amylopectin molecules), glycogen and cellulose.

Suitable sugar alcohols include, but are not limited to, glycerol, erythritol, threitol, arabitol, xylitol, ribitol, mannitol, sorbitol, galactitol, fucitol, iditol, inositol, volemitol, isomalt, lactitol and polyglycitol.

When the dispersing agent is a carbohydrate, typically the carbohydrate is a monosaccharide, a disaccharide, an oligosaccharide or a sugar alcohol, more typically a monosaccharide, a disaccharide or a sugar alcohol. For instance, the carbohydrate may be a monosaccharide or a disaccharide.

Usually, the carbohydrate is a carbohydrate of the formula (A) or (B):

$$C_xH_{2m}O_m \quad (A);$$

$$C_yH_{2y+2}O_y \quad (B)$$

wherein x 3, 4, 5, 6, 7, 8, 9, 10, 11 or 12;
m is x or x−1; and
y is 3, 4, 5, 6, 7, 8, 9, 10, 11 or 12.

In some embodiments, when m is x−1, x is 6 or 12.

Often, when m is x, x is 5 or 6. Usually, when m is x−1, x is 12.

Typically, y is 5, 6, 7, 8, 9, 10, 11 or 12. More typically, y is 5, 6, or 7, for instance, 5.

In some embodiments, the carbohydrate is a carbohydrate of the formula (A).

Typically, said dispersing agent is sucrose, glucose, lactose, fructose, galactose, xylose, ribose, maltose, or arabitol. More typically, said dispersing agent is sucrose or glucose. Even more typically, said dispersing agent is sucrose. In some embodiments, the dispersing agent is arabitol.

The dispersant which is a water-soluble ionic compound having a heat of solution in water more negative than −40 kJmol$^{-1}$, when present in the composition of the invention, is typically a metal hydroxide, such as an alkali metal hydroxide. The dispersant may, for instance, be lithium hydroxide, sodium hydroxide, potassium hydroxide, rubidium hydroxide, caesium hydroxide or francium hydroxide. The dispersant may, for instance, be sodium hydroxide, potassium hydroxide, rubidium hydroxide or caesium hydroxide, for instance sodium hydroxide, potassium hydroxide or rubidium hydroxide. Typically, the dispersant is potassium hydroxide.

Typically, the weight ratio of said nonpassivated silicon to said dispersant is from 1000:1 to 1:50, for instance from 500:1 to 1:25. Preferably, the weight ratio of said nonpassivated silicon to said dispersant is from 100:1 to 1:5, for instance from 10:1 to 1:1.

Usually, in the composition of the invention, the weight ratio of said nonpassivated silicon to said water-soluble polyelectrolyte is from 1000:1 to 1:25, for instance, from 100:1 to 1:5. The weight ratio of said nonpassivated silicon to said water-soluble polyelectrolyte may be instance be from 50:1 to 1:2, for example from 15:1 to 5:1. Preferably it is from 10:1 to 1:1. Typically, in the composition of the invention that does not also comprise said dispersing agent, the weight ratio of said nonpassivated silicon to said water-soluble polyelectrolyte is about 9:1.

In one embodiment, when the composition of the invention comprises the colloidal stabilizer which is a water-soluble polyelectrolyte, said water-soluble polyelectrolyte is negatively charged when in aqueous solution. For example, said water-soluble polyelectrolyte may be an organic polymer comprising a carboxyl group, a sulfonate group. Usually, said water-soluble polyelectrolyte is an organic polymer comprising a carboxyl group.

As used herein, the term "carboxyl group" represents a group of the formula: —C(═O)O$^-$, or —COO$^-$. As would be understood by the skilled person, a carboxyl group (for instance, when employed in the present invention in a polyelectrolyte) can exist in protonated and deprotonated forms (for example, —C(═O)OH and —C(═O)O$^-$), and in salt forms (for example, —C(═O)O$^-$X$^+$, wherein X$^+$ is a monovalent cation). X$^+$ may for instance be an alkali metal cation or a cationic alkaline earth metal monohydroxide. Thus, X$^+$ may be Na$^+$, K$^+$, [CaOH]$^+$ or [MgOH]$^+$, for instance. Typically, when the polymer is an organic polymer comprising carboxyl groups, the carboxyl groups are carboxylic acid groups.

Examples of organic polymers comprising carboxyl groups which can be employed as the polymer electrolyte in the present invention include, but are not limited to, polyolefins substituted with carboxyl groups, polyesters substituted with carboxyl groups and polysulfides substituted with carboxyl groups. Suitable organic polymers comprising carboxyl groups include polyacrylic acid, poly(alkyl)acrylic acids, such as poly(meth)acrylic acid, and poly(alkyl)acrylic (alkyl)acids, such as poly(methyl methactylate), and salts thereof.

As used herein, the term "sulfonate group" represents a group of formula: —S(═O)$_2$O$^-$. As would be understood by the skilled person, a sulfonate group (for instance, when employed in the present invention in a polyelectrolyte) can exist in protonated and deprotonated forms (for example, —S(O)$_2$OH, or —S(O)$_2$O$^-$), and in salt forms (for example, —S(O)$_2$O$^-$X$^+$, wherein X$^+$ is a monovalent cation). X$^+$ may for instance be an alkali metal cation or a cationic alkaline earth metal monohydroxide. Thus, X$^+$ may be Na$^+$, K$^+$, [CaOH]$^+$ or [MgOH]$^+$, for instance. Typically, when the polymer is an organic polymer comprising sulfonic acid groups, the sulfonate groups are sulfonic acid groups. An example of an organic polymer comprising sulfonate groups, which can be employed as the polymer electrolyte in the present invention, is poly(sodium styrene sulfonate).

Examples of organic polymers comprising sulfonate groups which can be employed as the polymer electrolyte in the present invention include, but are not limited to, polyolefins substituted with sulfonate groups, polyesters substituted with sulfonate groups and polysulfides substituted with sulfonate groups. An example of an organic polymer comprising sulfonate groups, which can be employed as the polymer electrolyte in the present invention, is poly(sodium styrene sulfonate).

Typically, when said water-soluble polyelectrolyte is negatively charged when in aqueous solution, the water-soluble polyelectrolyte is a polymer which comprises monomer units of formula (I):

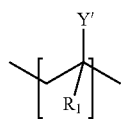

(I)

wherein:

R₁ is hydrogen or a substituted or unsubstituted $C_1$-$C_6$ alkyl;

Y' is COOX', CONR'R" or 4-phenyl-SO₃X';

X' is H or a monovalent cation; and

R' and R" are independently hydrogen or a substituted or unsubstituted $C_1$-$C_6$ alkyl.

The monovalent cation X⁺ may for instance be an alkali metal cation or a cationic alkaline earth metal monohydroxide. Thus, X⁺ may be Na⁺, K⁺, [CaOH]⁺ or [MgOH]⁺, for instance.

R₁ is usually hydrogen or unsubstituted $C_1$-$C_6$ alkyl, more usually hydrogen or methyl, typically hydrogen.

R' and R" are usually hydrogen or unsubstituted $C_1$-$C_6$ alkyl, more usually hydrogen or methyl, typically hydrogen.

The polymer which comprises monomer units of formula (I) may be a homopolymer or copolymer. When it is a copolymer, it may comprise two or more different kinds of monomer units falling within formula (I). Additionally or alternatively, the copolymer may comprise monomer units of formula (I) and additional monomer units which are other than formula (I).

In some embodiments the polymer which comprises monomer units of formula (I) consists of said monomer units of formula (I).

Usually, Y is COOX' and thus the polymer may, for instance, be polyacrylic acid or polymethacrylic acid, or salts thereof. Typically, said water-soluble polyelectrolyte is polyacrylic acid, or salts thereof. For instance, polymer may be polyacrylic acid.

In some embodiments, Y' is CONR'R" or 4-phenyl-SO₃X' and thus the polymer may, for instance, be polyacrylamide or polystyrene sulfonate, or salts thereof.

In another embodiment, when the composition of the invention comprises said colloidal stabilizer which is a water-soluble polyelectrolyte, said water-soluble polyelectrolyte is positively charged when in aqueous solution. For instance, said water-soluble polyelectrolyte may be an organic polymer comprising quaternary nitrogens.

When the water-soluble polyelectrolyte is an organic polymer comprising quaternary nitrogens, the quaternary nitrogens may be present in the polymer backbone, for instance in the form of bidentate groups of formula —N⁺(R¹)(R²)—. Additionally or alternatively, the quaternary nitrogens may be present as pendant monodentate substituent groups of formula —N⁺R¹R²R³. Typically, in such groups, R¹, R² and, where present, R³ are independently selected from unsubstituted or substituted $C_1$-$C_6$ alkyl, unsubstituted or substituted $C_2$-$C_6$ alkenyl, and unsubstituted or substituted aryl. Such groups are typically associated with a counter-anion, for instance a halide anion. Thus, examples of such groups include a bidentate dimethylimino group of formula —N⁺(Me)(Me)-, which can exist in the polymer backbone. Other examples of such groups include, for instance, the monodentate allyldimethylamino group of formula —N⁺(allyl)Me₂ and the monodentate trimethylamino group of formula —N⁺Me₃. Typically these groups are associated with a counter-anion, for instance a halide anion such as chloride or bromide.

Examples of organic polymers comprising quaternary nitrogens which can be employed as the polymer electrolyte in the present invention include, but are not limited to, poly(diallyldimethylammonium chloride), poly(1-methyl-4-vinylpyridinium bromide) and poly(1-methyl-2-vinylpyridinium bromide).

Typically, when the polymer is an organic polymer comprising quaternary nitrogens, it is a polymer comprising monomer units of formula (II) or formula (III);

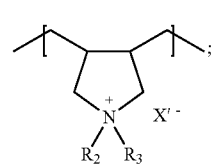
(II)

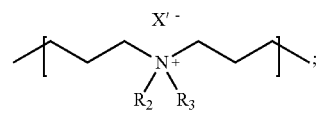
(III)

wherein:

R₂ is substituted or unsubstituted $C_1$-$C_6$ alkyl;

R₃ is substituted or unsubstituted $C_1$-$C_6$ alkyl; and

X' is a monovalent anion.

Typically, when the polymer is an organic polymer comprising quaternary nitrogens, it is a polymer comprising monomer units of formula (II) as defined above.

Usually, X' is a halide. X' may for instance be chloride or bromide.

R₂ is often unsubstituted $C_1$-$C_6$ alkyl, typically methyl or ethyl, more typically methyl.

R₃ is often unsubstituted $C_1$-$C_6$ alkyl, typically methyl or ethyl, more typically methyl.

The polymer which comprises monomer units of formula (II) or (III) may be a homopolymer or copolymer. When it is a copolymer, it may comprise two or more different kinds of monomer units falling within formula (II) or (III). Additionally or alternatively, the copolymer may comprise monomer units of formula (II) or (III) and further monomer units which are other than formula (II) or (III).

Usually, when the water-soluble polyelectrolyte is an organic polymer comprising quaternary nitrogens, said water-soluble polyelectrolyte is poly(diallyldimethylammonium chloride).

In some embodiments, the water-soluble polyelectrolyte comprises a cationic nitrogen-containing groups, wherein the nitrogens are not quaternary nitrogens, such as protonated monodentate primary, secondary and tertiary amino groups, i.e. —NH₃, —NHR₂, and —NH₂R, and protonated bidentate secondary and tertiary amines, i.e. —N⁺RH— and —NH₂—. As the skilled person will appreciate, the cationic nitrogen-containing groups will usually only be cationic if in acidic conditions (i.e. pH of less than 7). Examples of suitable water-soluble polyelectrolyte comprising a cationic nitrogen-containing groups include, but are not limited to, poly(L-lysine) and polyethylenimine.

In one embodiment, the composition of the invention comprises nonpassivated silicon, a dispersing agent which is a water-soluble molecular compound, and a colloidal stabilizer which is a water-soluble polyelectrolyte, wherein said dispersing agent is sucrose, glucose, lactose, fructose, galactose, xylose, ribose, lyxose, mannose, maltose, glycerol, erythritol, threitol, arabitol, xylitol, ribitol, mannitol, sorbitol, galactitol, fucitol, iditol, inositol, volemitol, isomalt, lactitol or polyglycitol, and wherein said water-soluble polyelectrolyte is polyacrylic acid, polymethacrylic acid or poly(diallyldimethylammonium chloride). Typically, said dispersing agent is sucrose, glucose or arabitol (for instance, sucrose or glucose) and said water-soluble polyelectrolyte is polyacrylic acid, or a salt thereof, poly(sodium styrene sulfonate) or poly(diallyldimethylammonium chloride). More typically, said dispersing agent is sucrose and said water-soluble polyelectrolyte is polyacrylic acid, or a salt thereof.

In another embodiment, the composition of the invention comprises nonpassivated silicon, a dispersing agent which is a water-soluble molecular compound, a dispersant which is a water-soluble ionic compound having a heat of solution in water more negative than −40 kJmol$^{-1}$, and a colloidal stabilizer which is a water-soluble polyelectrolyte, wherein said dispersing agent is sucrose, glucose, lactose, fructose, galactose, xylose, ribose, lyxose, mannose, maltose, glycerol, erythritol, threitol, arabitol, xylitol, ribitol, mannitol, sorbitol, galactitol, fucitol, iditol, inositol, volemitol, isomalt, lactitol or polyglycitol, and wherein said water-soluble polyelectrolyte is polyacrylic acid, polymethacrylic acid or poly(diallyldimethylammonium chloride). Typically, said dispersing agent is sucrose, glucose or arabitol (for instance, sucrose or glucose) and said water-soluble polyelectrolyte is polyacrylic acid, or a salt thereof, poly(sodium styrene sulfonate) or poly(diallyldimethylammonium chloride). More typically, said dispersing agent is sucrose and said water-soluble polyelectrolyte is polyacrylic acid, or a salt thereof. The dispersant may, for instance, be a metal hydroxide, such as an alkali metal hydroxide. The dispersant may, for instance, be potassium hydroxide. The composition of the invention may, for example, comprise nonpassivated silicon with sucrose, KOH and polyacrylic acid.

In the composition of the invention, the weight ratio of said nonpassivated silicon to said dispersing agent is usually from 100:1 to 1:5, for instance from 10:1 to 1:2. Preferably it is from 10:1 to 1:1; and the weight ratio of said nonpassivated silicon to said water soluble polyelectrolyte is usually from 1000:1 to 1:25, for instance from 100:1 to 1:5. Preferably it is from 100:1 to 1:1. For instance, the weight ratio of said nonpassivated silicon to said dispersing agent may be from 6:1 to 1:1 and the weight ratio of said nonpassivated silicon to said water soluble polyelectrolyte is from 20:1 to 1:1.

Typically, the weight ratio of said nonpassivated silicon to said dispersant is from 1000:1 to 1:50, for instance from 500:1 to 1:25. Preferably, the weight ratio of said nonpassivated silicon to said dispersant is from 100:1 to 1:5, for instance from 10:1 to 1:1.

Thus, for instance, the weight ratio of said nonpassivated silicon to said dispersing agent may be from 6:1 to 1:1, the weight ratio of said nonpassivated silicon to said dispersant may be from 10:1 to 1:1 and the weight ratio of said nonpassivated silicon to said water soluble polyelectrolyte may be from 20:1 to 1:1.

Usually, when the composition of the invention comprises nonpassivated silicon, a dispersing agent which is a water-soluble molecular compound, and a colloidal stabilizer which is a water-soluble polyelectrolyte the weight ratio of said nonpassivated silicon to said dispersing agent to said water soluble polyelectrolyte is from 1000:10:1 to 1:2:25, for instance, from 100:10:1 to 1:2:5. Preferably it is from 100:10:1 to 1:1:1. For instance, the weight ratio of said nonpassivated silicon to said dispersing agent to said water soluble polyelectrolyte may be from 50:10:1 to 1:1:1. Typically, the weight ratio of said nonpassivated silicon to said dispersing agent to said water soluble polyelectrolyte is from 15:4:1 to 5:4:1. For example the weight ratio of said nonpassivated silicon to said dispersing agent to said water soluble polyelectrolyte may be about 5:4:1.

When the composition comprises said nonpassivated silicon, said dispersing agent, said dispersant and said colloidal stabilizer, the weight ratio of said nonpassivated silicon to said dispersing agent to said dispersant to said water soluble polyelectrolyte is from 1000:10:10:1 to 1:5:5:25, preferably from 100:10:10:1 to 1:1:1:2.

Usually, when the composition of the invention comprises either (i) a colloidal stabilizer which is a negatively charged water-soluble polyelectrolyte when in aqueous solution, or (ii) no colloidal stabilizer which is a water-soluble polyelectrolyte, said composition has a Zeta potential in water of less than or equal to −18 mV, for instance less than or equal to −26 mV. Usually, said composition typically has a Zeta potential in water of from −100 mV to −18 mV, for instance, of from −100 mV to −26 mV. Usually, said composition has a Zeta potential in water of less than or equal to −30 mV, for instance, said composition may have a Zeta potential in water of less than or equal to −35 mV. In some embodiments, said composition has a Zeta potential in water of from −100 mV to −35 mV. For instance, said composition may have a Zeta potential in water of from −600 mV to −35 mV. For example, said composition may have a Zeta potential in water of from −500 mV to −38 mV.

Particles in a colloidal suspension usually carry an electrical charge. The particle in the colloidal suspension will be surrounded by two layers of charge. The first layer is the surface charge, which comprises ions adsorbed onto the particle as a result of chemical interactions. The second layer, known as the diffuse layer, comprises ions attracted to this first layer via coulomb forces. The electrostatic potential at the surface between the first and second layer is the zeta potential. The Zeta potential may be measured using a Zetasizer.

The Zetasizer uses the technique of laser doppler anemometry to measure the velocity of charged particles in an electric field. From the frequency shift or phase shift of an incident laser beam caused by the moving particles, the particle mobility can be measured. The mobility can be used to calculate zeta potential by using the Henry equation $$\left(U_E = \frac{2\varepsilon z F(\kappa a)}{3\eta}\right)$$

and the Smoluchowski or Huckel approximation, wherein: $U_E$ is electrophoretic mobility; z is the zeta-potential; $\eta$ is the viscosity; $F(\kappa a)$ is Henry's function; $\kappa$ is the reciprocal of the debye length; and a is the radius of the particle. (Evans, D. F. & Wennerstrom, H. The Colloidal Domain, Wiley-VCH: 1999)

Alternatively, when the composition of the invention comprises either (i) a colloidal stabilizer which is a positively charged water-soluble polyelectrolyte when in aqueous solution, or (ii) no colloidal stabilizer which is a water-soluble polyelectrolyte, said composition may have a Zeta potential of equal to or greater than 25 mV. For instance, said composition may have a Zeta potential of equal to or greater than 50 mV. Typically, said composition has a Zeta potential of equal to or greater than 60 mV.

In one embodiment, the composition of the invention has a mean particle size of less than or equal to 500 nm. Typically, the composition of the invention has a mean particle size of less than or equal to 400 nm, preferably less than or equal to 300 nm, for instance, a mean particle size of less than or equal to 200 nm. More typically, the composition of the invention has a mean particle size of less than or equal to 80 nm. Usually, the composition of the invention has a mean particle size of from 20 nm to 300 nm, more usually from 20 nm to 200 nm. For instance, the composition of the invention may have a mean particle size of from 100 nm to 200 nm.

A particle may be spherical or non-spherical. Non-spherical particles may for instance be plate-shaped, needle-shaped or tubular. The term "particle size" as used herein means the diameter of the particle if the particle is spherical or, if the particle is non-spherical, the volume-based particle size. The volume-based particle size is the diameter of the sphere that has the same volume as the non-spherical particle in question.

Individual particles can be imaged using electron microscopy, for instance, scanning electron microscopy. These images can be used to obtain the mean particle size. The particles being measured may be particles of nonpassivated silicon, particles of either said dispersing agent or said colloidal stabilizer, particles of dispersing agent and colloidal stabilizer, or particles comprising a mixture of nonpassivated silicon with said dispersing agent and/or said colloidal stabilizer.

Usually, the composition of the invention has a mean particle size of less than or equal to 400 nm, wherein at least 90% of the particles have a particle size of less than or equal to 500 nm. Typically, the composition of the invention has a mean particle size of from 20 nm to 200 nm, wherein at least 90% of the particles have a particle size of less than 500 nm. More typically, 90% of the particles have a particle size of less than 400 nm, for instance less than 300 nm, usually, less than 250 nm. For instance, the composition of the invention may have a mean particle size of from 50 nm to 200 nm, wherein 90% of the particles have a particle size of less than 500 nm, or, for instance, less than 400 nm, or less than 300 nm or less than 250 nm.

In one embodiment, the composition of the invention comprises one or more encapsulates which comprise nonpassivated silicon within an organic coating. The purpose of such a coating is to prevent or reduce exposure of the nonpassivated silicon to air prior to use, and thereby prevent passivation of the silicon. The coating typically therefore provides a good seal from the atmosphere, in order to prevent or reduce exposure of the nonpassivated silicon to air; any suitable coating material that prevents the ingress of air and which can be removed on contact with water can be used. The coating typically dissolves, degrades or melts away when the pellet is added to water. In one embodiment, therefore, the organic coating is a water-soluble coating. In another embodiment, the organic coating has a low melting point, e.g. a melting point of from 30° C. to 100° C., more typically from 50° C. to 100° C., or from 50° C. to 90° C.

Typically, the organic coating is capable of dissolving, degrading or melting away upon exposure to water having a temperature less than or equal to 100° C. and a pH of from 5 to 9. More typically, the organic coating is capable of dissolving, degrading or melting away upon exposure to water having a temperature less than or equal to 100° C. and a pH of 7. Even more typically, the organic coating is capable of dissolving, degrading or melting away upon exposure to water having a temperature less than or equal to 90° C. and a pH of 7. The organic coating may for instance be a water-soluble coating. Additionally or alternatively, the organic coating may have a low melting point, e.g. a melting point of from 30° C. to 100° C., more typically from 50° C. to 100° C., or from 50° C. to 90° C. The coating typically comprises gelatine.

In one embodiment, the organic coating is gelatine. Typically, therefore, the organic coating comprises gelatine. In one embodiment, the organic coating comprises agar. Other suitable organic coating materials may include greases, and natural and synthetic polymers and plastics. Polyvinyl alcohol, for instance, is a suitable polymer that could be used, by virtue of its solubility in water.

The invention further provides a pellet for generating hydrogen, the pellet comprising the composition of the invention encapsulated within an organic coating. The purpose of such a coating is to prevent or reduce exposure of the nonpassivated silicon to air prior to use, and thereby prevent passivation of the silicon. The coating typically therefore provides a good seal from the atmosphere, in order to prevent or reduce exposure of the nonpassivated silicon to air; any suitable coating material that prevents the ingress of air and which can be removed on contact with water can be used. The coating typically dissolves, degrades or melts away when the pellet is added to water. In one embodiment, therefore, the organic coating is a water-soluble coating. In another embodiment, the organic coating has a low melting point, e.g. a melting point of from 30° C. to 100° C., more typically from 50° C. to 100° C., or from 50° C. to 90° C.

Typically, the organic coating is capable of dissolving, degrading or melting away upon exposure to water having a temperature less than or equal to 100° C. and a pH of from 5 to 9. More typically, the organic coating is capable of dissolving, degrading or melting away upon exposure to water having a temperature less than or equal to 100° C. and a pH of 7. Even more typically, the organic coating is capable of dissolving, degrading or melting away upon exposure to water having a temperature less than or equal to 90° C. and a pH of 7.

In one embodiment, the organic coating is gelatine. Typically, therefore, the organic coating comprises gelatine. In one embodiment, the organic coating comprises agar. Other suitable organic coating materials may include greases, and natural and synthetic polymers and plastics. Polyvinyl alcohol, for instance, is a suitable polymer that could be used, by virtue of its solubility in water.

The invention further provides a process for producing a composition, which composition comprises: (a) nonpassivated silicon; and (b) a dispersing agent which is a water-soluble molecular compound, a dispersant which is a water-soluble ionic compound having a heat of solution in water more negative than $-40$ kJmol$^{-1}$ or a colloidal stabilizer which is a water-soluble polyelectrolyte; which process comprises providing a sample comprising: (a) silicon; and (b) a dispersing agent which is a water-soluble molecular compound, a dispersant which is a water-soluble ionic compound having a heat of solution in water more negative than $-40$ kJmol$^{-1}$ or a colloidal stabilizer which is a water-soluble polyelectrolyte; and, under inert conditions, reducing the mean particle size of said sample by applying a mechanical force to the sample.

The process may, for instance, be a process for producing a composition, which composition comprises: (a) nonpassivated silicon; and (b) a dispersing agent which is a water-soluble molecular compound, or a colloidal stabilizer which is a water-soluble polyelectrolyte; which process comprises providing a sample comprising: (a) silicon; and (b) a dispersing agent which is a water-soluble molecular compound, or a colloidal stabilizer which is a water-soluble polyelectrolyte; and, under inert conditions, reducing the mean particle size of said sample by applying a mechanical force to the sample.

The term "inert conditions" as used herein refers to a substantially dry (moisture-free), oxygen-free, non-oxidising environment in which the nonpassivated silicon can be produced and preserved without significant re-passivation. Such an environment can be provided by a dry, oxygen-free, inert gas (e.g. nitrogen or argon), by a vacuum, or for instance by performing the process in a dry, de-aerated aprotic solvent (an inert solvent). The inert solvent is aprotic and therefore other than an alcohol.

The step of "reducing the mean particle size of said sample", described herein, typically involves reducing the particle size of the silicon in the sample. More specifically, reducing or removing the oxide layer from the silicon particles to provide nonpassivated silicon.

Usually, the process of the invention is a process for producing a composition, which composition comprises: (a) nonpassivated silicon; and (b) a dispersing agent which is a water-soluble molecular compound, which process comprises providing a sample comprising: (a) silicon; and (b) a dispersing agent which is a water-soluble molecular compound; and, under inert conditions, reducing the mean particle size of said sample by applying a mechanical force to the sample. The dispersing agent is typically a solid.

As the skilled person will appreciate, when the process of the invention is a process for producing a composition, which composition comprises: (a) nonpassivated silicon; and (b) a dispersing agent which is a water-soluble molecular compound, the composition may comprise at least one further dispersing agent or at least one further dispersing agent. Thus the process of the invention may produce a composition comprising said nonpassivated silicon, two or more dispersing agents, wherein at least one dispersing agent is a water-soluble molecular compound, and a colloidal stabilizer. For example, the process may produce a composition comprising said nonpassivated silicon, two or three dispersing agents, wherein at least one dispersing agent is a water-soluble molecular compound, and a colloidal stabilizer.

The process of the invention may alternatively be a process for producing a composition, which composition comprises: (a) nonpassivated silicon; and (b) a dispersant which is a water-soluble ionic compound having a heat of solution in water more negative than $-40$ kJmol$^{-1}$, which process comprises providing a sample comprising: (a) silicon; and (b) a dispersant which is a water-soluble ionic compound having a heat of solution in water more negative than $-40$ kJmol$^{-1}$; and, under inert conditions, reducing the mean particle size of said sample by applying a mechanical force to the sample. The composition may comprise at least one further dispersant. Thus the process of the invention may, for example, produce a composition comprising said nonpassivated silicon and two or more dispersants, wherein at least one dispersant is a water-soluble ionic compound having a heat of solution in water more negative than $-40$ kJmol$^{-1}$. For example, the process may produce a composition comprising said nonpassivated silicon and two or three dispersants, wherein at least one dispersant is a water-soluble ionic compound having a heat of solution in water more negative than $-40$ kJmol$^{-1}$.

Alternatively, the process of the invention is a process for producing a composition, which composition comprises: (a) nonpassivated silicon; and (b) a colloidal stabilizer which is a water-soluble polyelectrolyte; which process comprises providing a sample comprising: (a) silicon; and (b) a colloidal stabilizer which is a water-soluble polyelectrolyte; and, under inert conditions, reducing the mean particle size of said sample by applying a mechanical force to the sample.

As the skilled person will appreciate, when the process of the invention is a process for producing a composition, which composition comprises: (a) said nonpassivated silicon and (b) said colloidal stabilizer which is a water-soluble polyelectrolyte, the composition may comprise at least one additional colloidal stabilizer, i.e., said composition may comprise a mixture of two or more colloidal stabilizing agents, wherein at least one colloidal stabilizer is a water-soluble polyelectrolyte. For instance, the process may be a process for producing a composition comprising said nonpassivated silicon and two or three colloidal stabilizers, wherein at least one colloidal stabilizer is a water-soluble polyelectrolyte.

Typically, when the process of the invention is a process for producing a composition comprising: (a) nonpassivated silicon; and (b) a dispersing agent which is a water-soluble molecular compound, the process further comprises adding a colloidal stabilizer to the composition thus produced. Usually, the colloidal stabilizer is a surfactant, a water-soluble polyelectrolyte, or a water-soluble non-ionic polymer. The colloidal stabilizer may be as herein defined.

Thus, usually the process of the invention is a process for producing a composition comprising: (a) nonpassivated silicon; (b) a dispersing agent which is a water-soluble molecular compound; and (c) a colloidal stabilizer; which process comprises providing a sample comprising: (a) silicon; (b) a dispersing agent which is a water-soluble molecular compound, and (c) a colloidal stabilizer; and, under inert conditions, reducing the mean particle size of said sample by applying a mechanical force to the sample.

Typically, the process of the invention is a process for producing a composition, which composition comprises: (a) nonpassivated silicon; (b) a dispersing agent which is a water-soluble molecular compound, and (c) a colloidal stabilizer which is a water-soluble polyelectrolyte; which process comprises providing a sample comprising: (a) silicon; (b) a dispersing agent which is a water-soluble molecular compound, and (c) a colloidal stabilizer which is a water-soluble polyelectrolyte; and, under inert conditions, reducing the mean particle size of said sample by applying a mechanical force to the sample.

As the skilled person will appreciate, when the process of the invention is a process for producing a composition comprising (a) said nonpassivated silicon, (b) said dispersing agent which is a water-soluble molecular compound and (c) a colloidal stabilizer which is a water-soluble polyelectrolyte, the composition may comprise at least one further dispersing agent or at least one further colloidal stabilizer. Thus the process may produce a composition comprising said nonpassivated silicon, two or more dispersing agents, wherein at least one dispersing agent is a water-soluble molecular compound, and a colloidal stabilizer which is a water-soluble polyelectrolyte. For example, the process may produce a composition comprising said nonpassivated silicon, two or three dispersing agents, wherein at least one dispersing agent is a water-soluble molecular compound, and a colloidal stabilizer which is a water-soluble polyelectrolyte. Alternatively, the process may produce a composition comprising said nonpassivated silicon, said dispersing agent which is a water-soluble molecular compound and two or more colloidal stabilizers, wherein at least one colloidal stabilizer is a water-soluble polyelectrolyte. For example, the process may produce a composition comprising said nonpassivated silicon, said dispersing agent which is a water-soluble molecular compound and two or three colloidal stabilizers, wherein at least one colloidal stabilizer is a water-soluble polyelectrolyte. As a further alternative, the process may produce a composition comprising said nonpassivated silicon, two or more dispersing agents, wherein at least one dispersing agent is a water-soluble molecular compound, and two or more colloidal stabilizers, wherein at least one colloidal stabilizer is a water-soluble polyelectrolyte. For example the process may produce a composition comprising said nonpassivated silicon, two or three dispersing agents, wherein at least one dispersing agent is a water-soluble molecular compound, and two or three colloidal stabilizers, wherein at least one colloidal stabilizer is a water-soluble polyelectrolyte.

The process of the invention may be a process for producing a composition, which composition comprises any combination of (a) nonpassivated silicon with; (b) a dispersing agent which is a water-soluble molecular compound; and/or (c) a dispersant which is a water-soluble ionic compound having a heat of solution in water more negative than $-40$ kJmol$^{-1}$; and/or (d) a colloidal stabilizer which is a water-soluble polyelectrolyte. The process of the invention may, for instance, be a process for producing a composition, which composition comprises: (a) nonpassivated silicon; (b) a dispersing agent which is a water-soluble molecular compound; (c) a dispersant which is a water-soluble ionic compound having a heat of solution in water more negative than $-40$ kJmol$^{-1}$; and (d) a colloidal stabilizer which is a water-soluble polyelectrolyte; which process comprises providing a sample comprising: (a) nonpassivated silicon; (b) a dispersing agent which is a water-soluble molecular compound; (c) a dispersant which is a water-soluble ionic compound having a heat of solution in water more negative than $-40$ kJmol$^{-1}$; and (d) a colloidal stabilizer which is a water-soluble polyelectrolyte; and, under inert conditions, reducing the mean particle size of said sample by applying a mechanical force to the sample.

The composition may, for instance, comprise at least one further dispersing agent and/or at least one further dispersant and/or at least one further colloidal stabilizer. Thus the process of the invention may, for example, produce a composition comprising said nonpassivated silicon, two or more dispersing agents, wherein at least one dispersing agent is a water-soluble molecular compound, a dispersant which is a water-soluble ionic compound having a heat of solution in water more negative than $-40$ kJmol$^{-1}$, and a colloidal stabilizer which is a water-soluble polyelectrolyte. The process of the invention may, for example, produce a composition comprising said nonpassivated silicon, a dispersing agent which is a water-soluble molecular compound, two or more dispersants, wherein at least one dispersant is a water-soluble ionic compound having a heat of solution in water more negative than $-40$ kJmol$^{-1}$, and a colloidal stabilizer which is a water-soluble polyelectrolyte. Alternatively, the process of the invention may, for example, produce a composition comprising said nonpassivated silicon, a dispersing agent which is a water-soluble molecular compound, a dispersant which is a water-soluble ionic compound having a heat of solution in water more negative than $-40$ kJmol$^{-1}$, and two or more colloidal stabilizers wherein at least one colloidal stabilizer is a water-soluble polyelectrolyte.

The process of the invention may, for example, produce a composition comprising said nonpassivated silicon, two or more dispersing agents, wherein at least one dispersing agent is a water-soluble molecular compound, two or more dispersants, wherein at least one dispersant is a water-soluble ionic compound having a heat of solution in water more negative than $-40$ kJmol$^{-1}$, and a colloidal stabilizer which is a water-soluble polyelectrolyte. The process of the invention may, for example, produce a composition comprising said nonpassivated silicon, two or more dispersing agents, wherein at least one dispersing agent is a water-soluble molecular compound, a dispersant which is a water-soluble ionic compound having a heat of solution in water more negative than $-40$ kJmol$^{-1}$, and two or more colloidal stabilizers wherein at least one colloidal stabilizer is a water-soluble polyelectrolyte. Alternatively, the process of the invention may, for example, produce a composition comprising said nonpassivated silicon, a dispersing agent which is a water-soluble molecular compound, two or more dispersants, wherein at least one dispersant is a water-soluble ionic compound having a heat of solution in water more negative than $-40$ kJmol$^{-1}$, and two or more colloidal stabilizers wherein at least one colloidal stabilizer is a water-soluble polyelectrolyte.

Further, the process of the invention may, for instance, produce a composition comprising said nonpassivated silicon, two or more dispersing agents, wherein at least one dispersing agent is a water-soluble molecular compound, two or more dispersants, wherein at least one dispersant is a water-soluble ionic compound having a heat of solution in water more negative than $-40$ kJmol$^{-1}$, and two or more colloidal stabilizers, wherein at least one colloidal stabilizer is a water-soluble polyelectrolyte. The process may, for example, produce a composition comprising said nonpassivated silicon, two or three dispersing agents, wherein at least one dispersing agent is a water-soluble molecular compound, two or three dispersants, wherein at least one dispersant is a water-soluble ionic compound having a heat of solution in water more negative than $-40$ kJmol$^{-1}$, and two or three colloidal stabilizers, wherein at least one colloidal stabilizer is a water-soluble polyelectrolyte. In one embodiment, the process of the invention is a process for producing a composition, which composition comprises: (a) nonpassivated silicon; (b) a dispersing agent which is a water-soluble molecular compound; (c) a dispersant which is a water-soluble ionic compound having a heat of solution in water more negative than $-40$ kJmol$^{-1}$; and (d) a colloidal stabilizer; which process comprises providing a sample comprising: (a) nonpassivated silicon; (b) a dispersing agent which is a water-soluble molecular compound; (c) a dispersant which is a water-soluble ionic compound having a heat of solution in water more negative than $-40$ kJmol$^{-1}$; and (d) a colloidal stabilizer; and, under inert conditions, reducing the mean particle size of said sample by applying a mechanical force to the sample.

The mechanical force applied to the sample in order to reduce the particle size may comprise attribution (friction), impact or cutting, or a combination of such forces. Such forces are involved in milling. Milling may be defined as the mechanical reduction of the particle size of a sample by attribution (friction), impact or cutting (IUPAC Compendium of Chemical Terminology, 2nd ed., the "Gold Book", compiled by A. D. McNaught and A. Wilkinson, Blackwell Scientific Publications, Oxford, 1997). Ball milling, for instance primarily involves the mechanical reduction of the particle size of a sample by both attribution (friction) and impact. Typically, therefore, the mechanical force applied to the sample in order to reduce the particle size comprises attribution (friction) and impact.

Accordingly, usually, in the process of the invention, the step of reducing the mean particle size of the sample comprises reducing the particle size by attribution (friction), impact and/or cutting. Typically, the step of reducing the mean particle size in the sample comprises reducing the particle size by attribution (friction) and impact.

Typically, the step of reducing the mean particle size in the sample comprises milling, grinding or crushing the sample. More typically, the step of reducing the mean particle size in the sample comprises milling the sample.

Usually, the step of reducing the mean particle size of the sample is performed under an inert atmosphere and/or in an inert solvent. More typically, the step of reducing the mean particle size of the sample is performed under nitrogen or argon.

Alternatively, the step of reducing the mean particle size in the sample is performed in an inert solvent. The step may be performed either in the presence of an inert gas (in addition to the inert solvent) or in the absence of an inert gas. Thus, the inert solvent may be itself under an inert gas atmosphere, for instance under nitrogen or argon. Alternatively, the inert conditions necessary for producing and preserving nonpassivated silicon are provided simply by performing the step of reducing the mean particle size in an inert solvent.

Performing the step of reducing the mean particle size by applying a mechanical force in the presence of a solvent has been found to produce nonpassivated silicon which exhibits significantly enhanced rates of hydrolysis and improved hydrogen yields compared to nonpassivated silicon prepared in the absence of solvent. The adsorption of solvent onto the newly formed silicon surfaces lowers the surface energy and accelerates the process, hence the time required to produce high surface area particles is considerably reduced. Furthermore the adsorbtion of solvent suppresses the oxidation of silicon particles that would otherwise inhibit the hydrolysis. Suitable solvents include dry (moisture free) solvents that do not contain any OH groups, and dry, aprotic, organic solvents.

Typically, therefore, in the process of the invention for producing a composition, the step of reducing the mean particle size of the sample is performed in a dry (moisture free) solvent that does not contain any OH groups. The solvent is therefore other than an alcohol.

Usually, the step of reducing the mean particle size of the sample is performed in a dry, aprotic, solvent, which is typically an organic solvent.

Suitable solvents include, for instance, acetonitrile, dimethylsulfoxide, an aromatic or aliphatic $C_{1-20}$ hydrocarbon (e.g. toluene, benzene, petroleum ether), a $C_{1-20}$ halocarbon (e.g. dichloromethane, chlorobutane, chloroform, carbon tetrachloride), a $C_{1-20}$ paraffin, or a $C_{1-20}$ straight-chained or cyclic ether (e.g. tetrahydrofuran, diethyl ether). Typically, the solvent used is acetonitrile.

Usually, in the process of the invention, the step of reducing the mean particle size of the sample causes the mean particle size of said sample to be reduced to a particle size of 500 nm. Typically, the step of reducing the mean particle size of the sample causes the mean particle size of said sample to be reduced to a particle size of less than or equal to 400 nm, preferably less than or equal to 300 nm, for instance, a mean particle size of less than or equal to 200 nm. More typically, step of reducing the mean particle size of the sample causes the mean particle size of said sample to be reduced to a particle size of less than or equal to 80 nm. Usually, however, the step of reducing the mean particle size of the sample causes the mean particle size of said sample to be reduced to a particle size of from 20 nm to 300 nm, more usually from 20 inn to 200 nm. For instance, step of reducing the mean particle size of the sample may cause the mean particle size of said sample to be reduced to a particle size of from 100 nm to 200 nm.

Usually, in the process of the invention, the step of reducing the mean particle size of the sample causes the mean particle size of said sample to be reduced to a particle size of less than or equal to 400 nm, wherein at least 90% of the particles have a particle size of less than or equal to 500 nm. Typically, the step of reducing the mean particle size of the sample causes the mean particle size of said sample to be reduced to a particle size of from 20 nm to 200 nm, wherein at least 90% of the particles have a particle size of less than 500 nm. More typically, 90% of the particles have a particle size of less than 400 nm, for instance less than 300 nm, usually, less than 250 nm. For instance, the step of reducing the mean particle size of the sample may cause the mean particle size of said sample to be reduced to a particle size of from 50 nm to 200 nm, wherein 90% of the particles have a particle size of less than 500 nm, or, for instance, less than 400 nm, or less than 300 nm or less than 250 nm.

Typically, the process of the invention produces a composition in which said silicon in said sample bears an outer layer of silicon dioxide on at least part of a surface thereof, wherein said outer layer of silicon dioxide has a first thickness, and wherein the step of reducing the mean particle size in the sample causes the average thickness of said outer layer of silicon dioxide to decrease from said first thickness to a second thickness, the second thickness being less than the first thickness. Typically, the second thickness is less than or equal to 3.5 nm. More typically, the second thickness is less than or equal to 2 nm or, more preferably, less than or equal to 1.0 nm. In one embodiment, the second thickness is less than 0.8 nm. In another embodiment, the second thickness is less than 0.5 nm, more typically less than or equal to 0.4 nm, or for instance less than or equal to 0.3 nm. The first thickness is typically greater than 0.8 nm, more typically greater than 1.0 nm, even more typically greater than 2 nm and even more typically greater than 3.5 nm. The first thickness may for instance be in the range of from 0.8 nm to 10 nm, or from 1.0 to 10 nm, or for instance from 3.5 nm to 20 nm.

Typically, the step of reducing the mean particle size in the sample causes the ratio of Si to $SiO_2$ on the surface of said sample, as measured by X-ray photoelectron spectroscopy, to increase from a first ratio to a second ratio, wherein the second ratio is greater than the first ratio. Typically, the second ratio is at least 1:1, more typically at least 2:1, and preferably at least 3:1. More preferably, the second ratio is at least 4:1, or, for instance, at least 5:1. In one preferred embodiment, the second ratio is at least 6:1. Typically, the first ratio of Si to $SiO_2$ is less than 1:7. More typically, the first ratio is less than 1:10.

The step of reducing the mean particle size in the sample usually causes the crystallographic disorder in said crystalline silicon to increase.

The crystallographic disorder typically comprises stacking fault defects. Accordingly, the step of reducing the mean particle size in the sample typically increases the number of stacking fault defects in said crystalline silicon.

Usually, in the process of the invention, the step of reducing the mean particle size of the sample comprises milling the sample. Any suitable milling technique can be employed, although ball milling is usually employed.

Typically, therefore, the step of reducing the mean particle size of the sample comprises milling the sample using a ball mill. Ball milling per se is well known. A ball mill typically comprises a rotating a milling chamber, typically a cylinder, which is partially filled with grinding balls, usually stone or metal, which grind material to the necessary fineness by friction and impact with the tumbling balls. The feed is typically at one end of the cylinder and the discharge at the other. Ball mills are commonly used in the manufacture of cement. These industrial ball mills are mainly large machines, although small versions of ball mills can be found in laboratories. The process of the invention is therefore amenable to scale-up to an industrial scale.

Typically, the process of the invention comprises: (a) providing said sample and a plurality of grinding balls in a milling chamber of a ball mill; (b) introducing an inert atmosphere and/or an inert solvent into said milling chamber; and (c) milling said sample using said ball mill.

Steps (a) and (b) may be performed in any order or at the same time, i.e. (a) first then (b), (b) first then (a), or (a) and (b) together.

When, in the process of the invention, the step of reducing the mean particle size comprises milling the sample, the choice of milling speed and duration can affect the nature of the nonpassivated silicon produced. For instance, the choice of milling speed and duration can affect the reactivity of the resulting nonpassivated silicon with water, the yield of hydrogen produced by that reaction, the activation energy of hydrolysis of the nonpassivated silicon, the mean particle size of the nonpassivated silicon, the ratio of Si to $SiO_2$ on the surface of the nonpassivated silicon, and the thickness of an outer layer of silicon dioxide on the nonpassivated silicon.

Typically, therefore the speed and duration of milling are selected to cause the mean particle size to be reduced from a first mean particle size to a second mean particle size, wherein the second mean particle size is less than the first mean particle size. The first and second particle sizes may be as defined hereinbefore. Typically, therefore, the second particle size is less than or equal to 300 nm, preferably less than or equal to 200 nm.

Similarly, the speed and duration of milling may be selected to cause the average thickness of an outer layer of silicon dioxide on the silicon sample to decrease from a first thickness to a second thickness, wherein the second thickness is less than the first thickness. The first and second particle sizes may be as defined hereinbefore. Typically, therefore, the second thickness is less than or equal to 3.5 nm, preferably less than or equal to 1.0 nm or, for instance, less than or equal to 0.8 nm. In another embodiment, the second thickness is less than 0.5 nm, more typically less than or equal to 0.4 nm, or for instance less than or equal to 0.3 nm.

Similarly, the speed and duration of milling may be selected to cause the ratio of Si to $SiO_2$ on the surface of said sample, as measured by X-ray photoelectron spectroscopy, to increase from a first ratio to a second ratio, wherein the second ratio is greater than the first ratio. The first and second ratios may be as defined hereinbefore. Typically, therefore, the second ratio is at least 2:1, preferably at least 3:1.

Similarly, when the silicon in said sample (i.e. the silicon starting material) comprises crystalline silicon, the speed and duration of milling may be selected to cause the crystallographic disorder in said crystalline silicon to increase. In particular, the speed and duration of milling may be selected to cause the number of stacking fault defects in said crystalline silicon to increase.

Milling speeds in excess of 500 rpm are typically employed, for instance speeds of at least 600 rpm. Milling speeds of from 500 rpm to 1200 rpm may for instance be employed. More typically, milling speeds of from 600 to 1000 rpm are employed. The highest initial reaction rates were typically observed in the range 700 rpm to 1000 rpm, and particularly in the range 750 rpm to 950 rpm.

Accordingly, in the process of the invention for producing said composition, the milling speed is typically from 600 rpm to 1000 rpm, preferably from 650 rpm to 950 rpm, more preferably from 700 rpm to 950 rpm, even more preferably from 750 rpm to 950 rpm.

The sample may be milled for any suitable duration. Typically, however the sample is milled for a duration of less than or equal to 3 hours. The sample may for instance be milled for a duration of from 2 minutes to 3 hours, or more typically from 5 minutes to 2 hours.

Typically, when the sample is milled in the absence of solvent, shorter milling times are preferred in order to minimise surface oxidation during the milling process. Thus, when the sample is milled in the absence of solvent, it is typically milled for a duration of from 5 minutes to 80 minutes, preferably for a duration of from 5 minutes to 40 minutes, and more preferably for a duration of from 5 minutes to 20 minutes.

In one embodiment, the sample is milled in an inert atmosphere, preferably under nitrogen or argon gas, for a duration of from 5 minutes to 80 minutes, preferably for a duration of from 5 minutes to 40 minutes, more preferably for a duration of from 5 minutes to 20 minutes.

When the sample is milled in the presence of an inert solvent ("wet milling"), the milling is more efficient and surface oxidation of silicon is minimised. Thus, when the sample is milled in an inert solvent, a wider range of milling times may be employed. Typically, therefore, when the sample is milled in an inert solvent, the sample is milled for a duration of from 2 minutes to 3 hours. More typically, when the sample is milled in an inert solvent, the sample is milled for a duration of from 2 minutes to 2 hours or, for instance, from 2 minutes to 1 hour. Even more typically, when the sample is milled in an inert solvent, the sample is milled for a duration of from 2 minutes to 40 minutes, preferably for a duration of from 4 minutes to 30 minutes, more preferably for a duration of from 5 minutes to 15 minutes.

Usually, in the process of the invention, said silicon in the sample provided comprises granular silicon or coarse silicon particles.

Silicon starting materials having a wide rage of purities can be used in the process of the invention for producing nonpassivated silicon. For instance, the sample of silicon provided (i.e. the silicon starting material) may be metallurgical grade silicon. Metallurgical grade silicon is commercially available and is passivated by a layer of surface $SiO_2$. It is produced industrially by reduction of silica using carbon in a submerged arc electric furnace. The silicon produced in the liquid state is then cast in ingots. After solidification and cooling, the ingots may be crushed and then ground into a powder. The composition of metallurgical grade silicon is typically as follows: Si≥98 wt %, Fe≤0.40 wt %, Ca≤0.20 wt %, Al≤0.20 wt %, and further impurities include oxygen, nitrogen and carbon. Lower grades of silicon, with lower silicon contents, may also be used as the starting material in the process of the invention. For instance, starting materials with a silicon content as low as 90 weight % may be used. Such materials include silicon with a high content of oxygen (e.g. in the form of $SiO_2$ or silicates). Other such materials include Si-based alloys, in particular those used in the manufacture of silicones, which may contain one of the elements Fe, Al, Ca or Cu in quantities of up to 8%. Preferably, however, the sample of silicon does not contain any alloy of silicon and a metal.

Other, higher grades of commercially available silicon can also of course be used, for instance silicons are available containing up to 99.95% Si (but are still of course passivated by a layer of surface $SiO_2$).

Typically, therefore in the process of the invention for producing a composition, the sample of silicon provided (i.e. the silicon starting material) contains at least 90 weight % Si. For instance, the sample of silicon provided may contain from 90 to 95 wt % Si. Or, for instance, the sample of silicon provided may contain from 90 to 97 wt % Si, or for instance from 90 to 98 wt % Si, or from 90 to 99 wt % Si.

More typically, the sample of silicon provided contains at least 95 weight % Si. Thus, the sample of silicon provided may contain from 95 to 97 wt % Si, from 95 to 98 wt % Si, or for instance from 95 to 99 wt % Si.

The sample of silicon provided may be metallurgical grade silicon. Thus, in one embodiment, the sample of silicon provided contains at least 97 weight % Si. Usually, the sample of silicon provided contains at least 98 weight % Si. The sample of silicon provided may for instance contain from 97.0 to 99.0 wt % Si, or for instance from 97.0 to 99.5 wt % Si. In another embodiment, the sample of silicon provided contains from 97.0 to 99.9 weight % Si.

More typically, the sample of silicon provided contains from 98.0 to 99.0 wt % Si, or for instance from 98.0 to 99.5 wt % Si. In another embodiment, the sample of silicon provided contains from 98.0 to 99.9 weight % Si.

In another embodiment, the sample of silicon provided contains at least 99 weight % Si, for instance at least 99.5 weight % Si. In another embodiment, the sample of silicon provided contains at least 99.9 weight % Si.

Typically, when the process of the invention is a process for the production of a composition comprising a dispersing agent which is a water-soluble molecular compound, the dispersing agent is one which gives rise to a low ionic strength solution. Thus, typically the ionic strength of a 1.0 M aqueous solution of said dispersing agent, which solution consists of water and said dispersing agent, is less than or equal to 0.1 mol/dm$^3$.

In one embodiment, the ionic strength of a 1.0 M aqueous solution of said dispersing agent, which solution consists of water and said dispersing agent, is less than or equal to 0.5 mol/dm$^3$. For instance the ionic strength of a 1.0 M aqueous solution of said dispersing agent, which solution consists of water and said dispersing agent, may be less than or equal to 0.01 mol/dm$^3$. Typically, for instance, the ionic strength of a 1.0 M aqueous solution of said dispersing agent, which solution consists of water and said dispersing agent, is less than or equal to 0.005 mol/dm$^3$, or less than or equal to 0.001 mol/dm$^3$.

Usually, when the process of the invention is a process for the production of a composition comprising a dispersing agent which is a water-soluble molecular compound, said dispersing agent is non-ionic. Typically, said dispersing agent is a charge-neutral, covalent compound.

When the process of the invention is a process for the production of a composition comprising a dispersing agent which is a water-soluble molecular compound, the solubility of said dispersing agent in water at 90° C. and at 1 atmosphere of pressure is typically equal to or greater than 0.1 g/ml, for instance from 0.1 g/ml to 5.0 g/ml. The solubility of said dispersing agent in water at 90° C. and at 1 atmosphere of pressure is preferably equal to or greater than 0.5 g/ml, for instance from 0.5 g/ml to 5.0 g/ml.

Typically, when the process of the invention is a process for the production of a composition comprising a dispersing agent which is a water-soluble molecular compound, the solubility of said dispersing agent in water at 90° C. and at 1 atmosphere of pressure is equal to or greater than 1.0 g/ml, for instance from 1.0 g/ml to 5.0 g/ml. More typically, the solubility of said dispersing agent in water at 90° C. and at 1 atmosphere of pressure is equal to or greater than 2.0 g/ml. Even more typically, the solubility of said dispersing agent in water at 90° C. and at 1 atmosphere of pressure is equal to or greater than 3.0 g/ml, for instance from 3.0 g/ml to 5.0 g/ml.

Usually, when the process of the invention is a process for the production of a composition comprising a dispersing agent which is a water-soluble molecular compound, said dispersing agent is a carbohydrate.

Typically the carbohydrate is a monosaccharide, a disaccharide, an oligosaccharide or a sugar alcohol, more typically a monosaccharide or a disaccharide, or a sugar alcohol.

Usually, the carbohydrate is a carbohydrate of the formula (A) or (B):

$$C_xH_{2m}O_m \qquad (A)$$

$$C_yH_{2y+2}O_y \qquad (B)$$

wherein x 3, 4, 5, 6, 7, 8, 9, 10, 11 or 12;
m is x or x−1; and
y is 3, 4, 5, 6, 7, 8, 9, 10, 11 or 12.
In some embodiments, when m is x−1, x is 6 or 12.
Often, when m is x, x is 5 or 6. Usually, when m is x−1, x is 12.
Typically, y is 5, 6, 7, 8, 9, 10, 11 or 12. More typically, y is 5, 6, or 7, for instance, 5.

In some embodiments, the carbohydrate is a carbohydrate of the formula (A).

Typically, said dispersing agent is sucrose, glucose, lactose, fructose, galactose, xylose, ribose, maltose or arabitol. More typically, said dispersing agent is sucrose, glucose or arabitol, for instance, sucrose or glucose. Even more typically, said dispersing agent is sucrose.

Usually, the dispersant which is a water-soluble ionic compound having a heat of solution in water more negative than −40 kJmol$^{-1}$, when present in the composition produced by the process of the invention, is typically a metal hydroxide, such as an alkali metal hydroxide. The dispersant may, for instance, be lithium hydroxide, sodium hydroxide, potassium hydroxide, rubidium hydroxide, caesium hydroxide or francium hydroxide. The dispersant may, for instance, be sodium hydroxide, potassium hydroxide, rubidium hydroxide or caesium hydroxide, for instance sodium hydroxide, potassium hydroxide or rubidium hydroxide. Typically, the dispersant is potassium hydroxide.

Typically, the weight ratio of said nonpassivated silicon to said dispersant is from 1000:1 to 1:50, for instance from 500:1 to 1:25. Preferably, the weight ratio of said nonpassivated silicon to said dispersant is from 100:1 to 1:5, for instance from 10:1 to 1:1.

Usually, in the process of the invention, the weight ratio of said nonpassivated silicon to said dispersing agent is usually from 100:1 to 1:5, for instance, from 10:1 to 1:2. Preferably it is from 10:1 to 1:1. The weight ratio of said nonpassivated silicon to said dispersing agent may for instance be from 5:1 to 1:2, preferably from 5:1 to 1:1, for instance from 2:1 to 1:1. Typically, the weight ratio of said nonpassivated silicon to said dispersing agent may for instance be 1:1.

In one embodiment, when the process of the invention is a process for producing a composition comprising said colloidal stabilizer which is a water-soluble polyelectrolyte, said water-soluble polyelectrolyte is negatively charged when in aqueous solution. For example, said water-soluble polyelectrolyte is an organic polymer comprising a carboxyl group or a sulfonate group. Usually, said water-soluble polyelectrolyte is an organic polymer comprising a carboxyl group. Typically, when the polymer is an organic polymer comprising carboxyl groups, the carboxyl groups are carboxylic acid groups.

Examples of organic polymers comprising carboxyl groups which can be employed as the polymer electrolyte in the present invention include, but are not limited to, polyolefins substituted with carboxyl groups, polyesters substituted with carboxyl groups and polysulfides substituted with carboxyl groups. Suitable organic polymers comprising carboxyl groups include polyacrylic acid and poly(alkyl)acrylic acids, such as poly(meth)acrylic acid, and salts thereof.

Examples of organic polymers comprising sulfonate groups which can be employed as the polymer electrolyte in the present invention include, but are not limited to, polyolefins substituted with sulfonate groups, polyesters substituted with sulfonate groups and polysulfides substituted with sulfonate groups. An example of an organic polymer comprising sulfonate groups, which can be employed as the polymer electrolyte in the present invention, is poly(sodium styrene sulfonate).

Typically, when the process of the invention is a process for producing a composition comprising said colloidal stabilizer which is a water-soluble polyelectrolyte, wherein said water-soluble polyelectrolyte is negatively charged when in aqueous solution, the water-soluble polymer electrolyte is a polymer which comprises monomer units of formula (I):

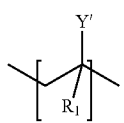

(I)

wherein:
$R_1$ is hydrogen or a substituted or unsubstituted $C_1$-$C_6$ alkyl;
Y' is COOX', CONR'R" or 4-phenyl-SO$_3$X';
X' is H or a monovalent cation; and
R' and R" are independently hydrogen or a substituted or unsubstituted $C_1$-$C_6$ alkyl.

The monovalent cation $X^+$ may for instance be an alkali metal cation or a cationic alkaline earth metal monohydroxide. Thus, $X^+$ may be $Na^+$, $K^+$, $[CaOH]^+$ or $[MgOH]^+$, for instance.

$R_1$ is usually hydrogen or unsubstituted $C_1$-$C_6$ alkyl, more usually hydrogen or methyl, typically hydrogen.

R' and R" are usually hydrogen or unsubstituted $C_1$-$C_6$ alkyl, more usually hydrogen or methyl, typically hydrogen.

The polymer which comprises monomer units of formula (I) may be a homopolymer or copolymer. When it is a copolymer, it may comprise two or more different kinds of monomer units falling within formula (I). Additionally or alternatively, the copolymer may comprise monomer units of formula (I) and additional monomer units which are other than formula (I).

In some embodiments the polymer which comprises monomer units of formula (I) consists of said monomer units of formula (I).

Usually, Y is COOX' and thus the polymer is polyacrylic acid or polymethacrylic acid, or salts thereof. Typically, said water-soluble polyelectrolyte is polyacrylic acid, or salts thereof. For instance, the polymer may be polyacrylic acid.

In some embodiments, Y' is CONR'R" or 4-phenyl-SO$_3$X' and thus the polymer may, for instance, be polyacrylamide or polystyrene sulfonate, or salts thereof.

In another embodiment, when the process of the invention is a process for producing a composition comprising said colloidal stabilizer which is a water-soluble polyelectrolyte, said water-soluble polyelectrolyte is positively charged when in aqueous solution. For instance, said water-soluble polyelectrolyte may be an organic polymer comprising quaternary nitrogens.

When the process of the invention is a process for producing a composition comprising said colloidal stabilizer which is a water-soluble polyelectrolyte, wherein said water-soluble polyelectrolyte is positively charged when in aqueous solution, the quaternary nitrogens may be present in the polymer backbone, for instance in the form of bidentate groups of formula —$N^+(R^1)(R^2)$—. Additionally or alternatively, the quaternary nitrogens may be present as pendant monodentate substituent groups of formula —$N^+R^1R^2R^3$. Typically, in such groups, $R^1$, $R^2$ and, where present, $R^3$ are independently selected from unsubstituted or substituted $C_1$-$C_6$ alkyl, unsubstituted or substituted $C_2$-$C_6$ alkenyl, and unsubstituted or substituted aryl. Such groups are typically associated with a counter-anion, for instance a halide anion. Thus, examples of such groups include a bidentate dimethylimino group of formula —$N^+(Me)(Me)$-, which can exist in the polymer backbone. Other examples of such groups include, for instance, the monodentate allyldimethylamino group of formula —$N^+(allyl)Me_2$ and the monodentate trimethylamino group of formula —$N^+Me_3$. Typically these groups are associated with a counter-anion, for instance a halide anion such as chloride or bromide.

Examples of organic polymers comprising quaternary nitrogens which can be employed as the polymer electrolyte in the present invention include, but are not limited to poly(diallyldimethylammonium chloride), poly(1-methyl-4-vinylpyridinium bromide) and poly(1-methyl-2-vinylpyridinium bromide).

Typically, the polymer is an organic polymer comprising monomer units of formula (II) or formula (III);

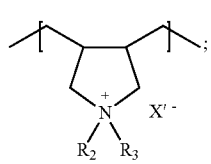

(II)

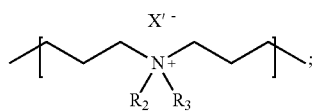

(III)

wherein:
$R_2$ is a substituted or unsubstituted $C_1$-$C_6$ alkyl;
$R_3$ is a substituted or unsubstituted $C_1$-$C_6$ alkyl; and
X' is a monovalent anion.

For instance, the polymer may comprise monomer units of formula (II) as defined above.

Usually, X' is a halide. X' may for instance be chloride or bromide.

$R_2$ is often unsubstituted $C_1$-$C_6$ alkyl, typically methyl or ethyl, more typically methyl.

$R_3$ is often unsubstituted $C_1$-$C_6$ alkyl, typically methyl or ethyl, more typically methyl.

The polymer which comprises monomer units of formula (II) or (III) may be a homopolymer or copolymer. When it is a copolymer, it may comprise two or more different kinds of monomer units falling within formula (II) or (III). Additionally or alternatively, the copolymer may comprise monomer units of formula (II) or (III) and further monomer units which are other than formula (II) or (III).

Usually, when the process of the invention is a process for producing a composition comprising said colloidal stabilizer which is a water-soluble polyelectrolyte, wherein the polymer is an organic polymer comprising quaternary nitrogens, said water-soluble polyelectrolyte is poly(diallyldimethylammonium chloride).

In some embodiments, the water-soluble polyelectrolyte comprises a cationic nitrogen-containing groups, wherein the nitrogens are not quaternary nitrogens, such as protonated monodentate primary, secondary and tertiary amino groups, i.e. —$NH_3$, —$NHR_2$, and —$NH_2R$, and protonated bidentate secondary and tertiary amines, i.e. —$N^4RH$— and —$NH_2$—. The polymer may, for instance, be poly(L-lysine) and polyethylenimine.

In one embodiment, the process of the invention is a process for producing a composition comprising nonpassivated silicon, a dispersing agent which is a water-soluble molecular compound, and a colloidal stabilizer which is a water-soluble polyelectrolyte, wherein said dispersing agent is sucrose, glucose, lactose, fructose, galactose, xylose, ribose, maltose or arabitol, and wherein said water-soluble polyelectrolyte is polyacrylic acid, polymethacrylic acid or poly(diallyldimethylammonium chloride). Typically, said dispersing agent is sucrose, glucose or arabitol, for instance, sucrose or glucose, and said water-soluble polyelectrolyte is polyacrylic acid, or salts thereof, poly(sodium styrene sulfonate) or poly(diallyldimethylammonium chloride). More typically, said dispersing agent is sucrose and said water-soluble polyelectrolyte is polyacrylic acid, or salts thereof.

In another embodiment, the process of the invention is a process for producing a composition comprising nonpassivated silicon, a dispersing agent which is a water-soluble molecular compound, a dispersant which is a water-soluble ionic compound having a heat of solution in water more negative than $-40$ $\mu mol^{-1}$, and a colloidal stabilizer which is a water-soluble polyelectrolyte, wherein said dispersing agent is sucrose, glucose, lactose, fructose, galactose, xylose, ribose, lyxose, mannose, maltose, glycerol, erythritol, threitol, arabitol, xylitol, ribitol, mannitol, sorbitol, galactitol, fucitol, iditol, inositol, volemitol, isomalt, lactitol or polyglycitol, and wherein said water-soluble polyelectrolyte is polyacrylic acid, polymethacrylic acid or poly(diallyldimethylammonium chloride). Typically, said dispersing agent is sucrose, glucose or arabitol (for instance, sucrose or glucose) and said water-soluble polyelectrolyte is polyacrylic acid, or a salt thereof, poly(sodium styrene sulfonate) or poly(diallyldimethylammonium chloride). More typically, said dispersing agent is sucrose and said water-soluble polyelectrolyte is polyacrylic acid, or a salt thereof. The dispersant may, for instance, be a metal hydroxide, such as an alkali metal hydroxide. The dispersant may, for instance, be potassium hydroxide. The process of the invention may, for example, produce a composition comprising nonpassivated silicon with sucrose and/or KOH and/or polyacrylic acid, for instance, a composition comprising nonpassivated silicon with sucrose and KOH and polyacrylic acid.

Typically, when the process of the invention is a process for producing a composition comprising (a) said nonpassivated silicon and (b) said colloidal stabilizer which is a water-soluble polyelectrolyte, the weight ratio of said nonpassivated silicon to said water-soluble polyelectrolyte is from 1000:1 to 1:5, for instance, from 100:1 to 1:5. Preferably it is from 100:1 to 1:1. The weight ratio of said nonpassivated silicon to said water-soluble polyelectrolyte may for instance be from 50:1 to 1:1, for example from 15:1 to 5:1. Typically, in compositions of the invention that do not also comprise said dispersing agent, the weight ratio of said nonpassivated silicon to said water-soluble polyelectrolyte is about 9:1.

Typically, when the process of the invention is a process for producing a composition comprising (a) said nonpassivated silicon and (b) a dispersant which is a water-soluble ionic compound having a heat of solution in water more negative than $-40$ $kJmol^{-1}$, the weight ratio of said nonpassivated silicon to said dispersant is from 1000:1 to 1:50, for instance from 500:1 to 1:25. Preferably, the weight ratio of said nonpassivated silicon to said dispersant is from 100:1 to 1:5, for instance from 10:1 to 1:1. Thus, for instance, the weight ratio of said nonpassivated silicon to said dispersing agent may be from 6:1 to 1:1, the weight ratio of said nonpassivated silicon to said dispersant may be from 10:1 to 1:1 and the weight ratio of said nonpassivated silicon to said water soluble polyelectrolyte may be from 20:1 to 1:1.

Usually, when the process of the invention is a process for producing a composition comprising either (i) a colloidal stabilizer which is a negatively charged water-soluble polyelectrolyte when in aqueous solution, or (ii) no colloidal stabilizer which is a water-soluble polyelectrolyte, said composition has a Zeta potential in water of less than or equal to $-18$ mV, for instance, less than or equal to $-26$ mV. Usually, said composition has a Zeta potential in water of from $-100$ mV to $-18$ mV, for instance, of from $-100$ mV to $-26$ mV. Usually, said composition has a Zeta potential in water of less than or equal to $-30$ mV, for instance, said composition may have a Zeta potential in water of less than or equal to $-35$ mV. In some embodiments, said composition has a Zeta potential in water of from $-100$ mV to $-35$ mV. For instance, said composition may have a Zeta potential in water of from $-600$ mV to $-35$ mV. For example, said composition may have a Zeta potential in water of from $-500$ mV to $-38$ mV.

Alternatively, when the process of the invention is a process for producing a composition comprising either (i) a colloidal stabilizer which is a positively charged water-soluble polyelectrolyte when in aqueous solution, or (ii) no colloidal stabilizer which is a water-soluble polyelectrolyte, said composition may have a Zeta potential of equal to or greater than 25 mV. For instance, said composition may have a Zeta potential of equal to or greater than 50 mV. Typically, said composition has a Zeta potential of equal to or greater than 60 mV.

Typically, when the process of the invention is a process for producing a composition comprising: (a) nonpassivated silicon; (b) a dispersing agent which is a water-soluble molecular compound; and (c) a colloidal stabilizer which is a water-soluble polyelectrolyte, said dispersing agent is sucrose, glucose or arabitol, for instance, sucrose or glucose, and said water-soluble polyelectrolyte is polyacrylic acid, or a salt thereof or poly(diallyldimethylammonium chloride). More typically, said dispersing agent is sucrose and said water-soluble polyelectrolyte is polyacrylic acid, or a salt thereof.

When the process of the invention is a process for producing a composition comprising nonpassivated silicon, a dispersing agent which is a water-soluble molecular compound, and a colloidal stabilizer which is a water-soluble polyelectrolyte, the weight ratio of said nonpassivated silicon to said dispersing agent is usually from 100:1 to 1:5, for instance, from 10:1 to 1:2. Preferably it is from 10:1 to 1:1; and the weight ratio of said nonpassivated silicon to said water soluble polyelectrolyte is usually from 1000:1 to 1:25, for instance, from 100:1 to 1:2. Preferably from 100:1 to 1:1. For instance, the weight ratio of said nonpassivated silicon to said dispersing agent may be from 6:1 to 1:1 and the weight ratio of said nonpassivated silicon to said water soluble polyelectrolyte is from 20:1 to 1:1.

Usually, the process of the invention is a process for producing a composition comprising nonpassivated silicon, a dispersing agent which is a water-soluble molecular compound, and a colloidal stabilizer which is a water-soluble polyelectrolyte the weight ratio of said nonpassivated silicon to said dispersing agent to said water soluble polyelectrolyte is from 1000:10:1 to 1:2:25, preferably from 100:10:1 to 1:1:1. For instance, the weight ratio of said nonpassivated silicon to said dispersing agent to said water soluble polyelectrolyte may be from 50:10:1 to 1:1:1. Typically, the weight ratio of said nonpassivated silicon to said dispersing agent to said water soluble polyelectrolyte is from 15:4:1 to 5:4:1. For example the weight ratio of said nonpassivated silicon to said dispersing agent to said water soluble polyelectrolyte may be about 5:4:1.

Typically, when the process of the invention is a process for producing a composition comprising (a) said nonpassivated silicon, (b) a dispersing agent which is a water-soluble molecular compound, (c) a dispersant which is a water-soluble ionic compound having a heat of solution in water more negative than −40 kJmol$^{-1}$, and (d) a colloidal stabilizer, the weight ratio of said nonpassivated silicon to said dispersing agent to said dispersant to said water soluble polyelectrolyte is from 1000:10:10:1 to 1:5:5:25, preferably from 100:10:10:1 to 1:1:1:2.

In one embodiment, the process of the invention further comprises recovering the composition thus produced, under inert conditions. Usually, recovering said composition comprises a solvent removal step.

Typically, the process also further comprises coating said composition with an organic coating, to form one or more encapsulates which comprise said composition within an organic coating. Usually, the organic coating is suitable for preventing or reducing exposure of the composition to air. Typically, the organic coating is capable of dissolving, degrading or melting away upon exposure to water having a temperature less than or equal to 100° C. In one embodiment, the organic coating comprises gelatine or agar.

The invention further provides a composition which is obtainable by the process of the invention for producing the composition as defined herein.

The invention further provides the use of the composition as defined herein to produce hydrogen, by hydrolysis of the nonpassivated silicon in the composition.

The invention further provides a process for producing hydrogen, which process comprises contacting water with the composition as defined herein and thereby producing hydrogen by hydrolysis of the nonpassivated silicon.

In some embodiments, from 0.5 to 100 ml of water are put in contact with approximately 150 mg of the composition. Typically, from 1 to 50 ml of water are put in contact with approximately 150 mg of the composition. For instance, from 1 to 10 ml of water are put in contact with approximately 150 mg of the composition. In some embodiment, approximately 5 ml of water are put in contact with approximately 150 mg of the composition.

Usually, in the process of the invention for producing hydrogen the composition comprises a dispersing agent which is a water-soluble molecular compound, said dispersing agent is a carbohydrate.

Typically the carbohydrate is a monosaccharide, a disaccharide, an oligosaccharide, or a sugar alcohol, more typically a monosaccharide or a disaccharide, or a sugar alcohol.

Usually, the carbohydrate is a carbohydrate of the formula (A) or (B):

$$C_xH_{2m}O_m \quad (A)$$

$$C_yH_{2y+2}O_y \quad (B)$$

wherein x 3, 4, 5, 6, 7, 8, 9, 10, 11 or 12;
m is x or x−1; and
y is 3, 4, 5, 6, 7, 8, 9, 10, 11 or 12.
In some embodiments, when m is x−1, x is 6 or 12.
Often, when m is x, x is 5 or 6. Usually, when m is x−1, x is 12.
Typically, y is 5, 6, 7, 8, 9, 10, 11 or 12. More typically, y is 5, 6, or 7, for instance, 5.
In some embodiments, the carbohydrate is a carbohydrate of the formula (A).

Typically, said dispersing agent is sucrose, glucose, lactose, fructose, galactose, xylose, ribose, maltose or arabitol. More typically, said dispersing agent is sucrose, glucose or arabitol, for instance, sucrose or glucose. Even more typically, said dispersing agent is sucrose.

Usually, the dispersant which is a water-soluble ionic compound having a heat of solution in water more negative than −40 kJmol$^{-1}$, when present in the composition produced by the process of the invention for producing hydrogen, is a metal hydroxide, such as an alkali metal hydroxide. The dispersant may, for instance, be lithium hydroxide, sodium hydroxide, potassium hydroxide, rubidium hydroxide, caesium hydroxide or francium hydroxide. The dispersant may, for instance, be sodium hydroxide, potassium hydroxide, rubidium hydroxide or caesium hydroxide, for instance sodium hydroxide, potassium hydroxide or rubidium hydroxide. Typically, the dispersant is potassium hydroxide.

Typically, the weight ratio of said nonpassivated silicon to said dispersant is from 1000:1 to 1:50, for instance from 500:1 to 1:25. Preferably, the weight ratio of said nonpassivated silicon to said dispersant is from 100:1 to 1:5, for instance from 10:1 to 1:1.

Typically, the process for producing hydrogen comprises contacting an aqueous solution of a colloidal stabilizer with the composition as defined herein and thereby producing hydrogen by hydrolysis of the nonpassivated silicon.

In one embodiment, the colloidal stabilizer is a water-soluble polyelectrolyte, wherein said water-soluble polyelectrolyte is negatively charged when in aqueous solution. For example, said water-soluble polyelectrolyte is an organic polymer comprising a carboxyl group or a sulfonate group. Usually, said water-soluble polyelectrolyte is an organic polymer comprising a carboxyl group. Typically, when the polymer is an organic polymer comprising carboxyl groups, the carboxyl groups are carboxylic acid groups.

Examples of organic polymers comprising carboxyl groups which can be employed as the polymer electrolyte in the present invention include, but are not limited to, polyolefins substituted with carboxyl groups, polyesters substituted with carboxyl groups and polysulfides substituted with carboxyl groups. Suitable organic polymers comprising carboxyl groups include polyacrylic acid and poly(alkyl)acrylic acids, such as poly(meth)acrylic acid, and salts thereof.

Examples of organic polymers comprising sulfonate groups which can be employed as the polymer electrolyte in the present invention include, but are not limited to, polyolefins substituted with sulfonate groups, polyesters substituted with sulfonate groups and polysulfides substituted with sulfonate groups. An example of an organic polymer comprising sulfonate groups, which can be employed as the polymer electrolyte in the present invention, is poly(sodium styrene sulfonate).

Typically, when the process for producing hydrogen comprises contacting an aqueous solution of a colloidal stabilizer with the composition, colloidal stabilizer is a water-soluble polyelectrolyte, the water-soluble polyelectrolyte is a polymer which comprises monomer units of formula (I):

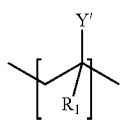

(I)

wherein:

$R_1$ is hydrogen or a substituted or unsubstituted $C_1$-$C_6$ alkyl;

Y' is COOX', CONR'R" or 4-phenyl-SO$_3$X';

X' is H or a monovalent cation; and

R' and R" are independently hydrogen or a substituted or unsubstituted $C_1$-$C_6$ alkyl.

The monovalent cation X$^+$ may for instance be an alkali metal cation or a cationic alkaline earth metal monohydroxide. Thus, X$^+$ may be Na$^+$, K$^+$, [CaOH]$^+$ or [MgOH]$^+$, for instance.

$R_1$ is usually hydrogen or unsubstituted $C_1$-$C_6$ alkyl, more usually hydrogen or methyl, typically hydrogen.

R' and R" are usually hydrogen or unsubstituted $C_1$-$C_6$ alkyl, more usually hydrogen or methyl, typically hydrogen.

The polymer which comprises monomer units of formula (I) may be a homopolymer or copolymer. When it is a copolymer, it may comprise two or more different kinds of monomer units falling within formula (I). Additionally or alternatively, the copolymer may comprise monomer units of formula (I) and additional monomer units which are other than formula (I).

In some embodiments the polymer which comprises monomer units of formula (I) consists of said monomer units of formula (I).

Usually, Y is COOX' and thus the polymer is polyacrylic acid or polymethacrylic acid. Typically, said water-soluble polyelectrolyte is polyacrylic acid, or salts thereof. For instance, the water-soluble polyelectrolyte may be polyacrylic acid.

In some embodiments, Y' is CONR'R" or 4-phenyl-SO$_3$X' and thus the polymer may, for instance, be polyacrylamide or polystyrene sulfonate, or salts thereof.

In another alternative embodiment, when the process for producing hydrogen comprises contacting an aqueous solution of a colloidal stabilizer with the composition, colloidal stabilizer is a water-soluble polyelectrolyte, wherein said water-soluble polyelectrolyte is positively charged when in aqueous solution. For instance, said water-soluble polyelectrolyte may be an organic polymer comprising quaternary nitrogens.

Often, when the process for producing hydrogen comprises contacting an aqueous solution of a colloidal stabilizer with the composition, colloidal stabilizer is a water-soluble polyelectrolyte, wherein said water-soluble polyelectrolyte is positively charged when in aqueous solution and is an organic polymer comprising quaternary nitrogens, the quaternary nitrogens may be present in the polymer backbone, for instance in the form of bidentate groups of formula —N$^+$(R$^1$)(R$^2$)—. Additionally or alternatively, the quaternary nitrogens may be present as pendant monodentate substituent groups of formula —N$^+$R$^1$R$^2$R$^3$. Typically, in such groups, R$^1$, R$^2$ and, where present, R$^3$ are independently selected from unsubstituted or substituted $C_1$-$C_6$ alkyl, unsubstituted or substituted $C_2$-$C_6$ alkenyl, and unsubstituted or substituted aryl. Such groups are typically associated with a counter-anion, for instance a halide anion. Thus, examples of such groups include a bidentate dimethylimino group of formula —N$^+$(Me)(Me)-, which can exist in the polymer backbone. Other examples of such groups include, for instance, the monodentate allyldimethylamino group of formula —N$^+$(allyl)Me$_2$ and the monodentate trimethylamino group of formula —N$^+$Me$_3$. Typically these groups are associated with a counter-anion, for instance a halide anion such as chloride or bromide.

Examples of organic polymers comprising quaternary nitrogens which can be employed as the polymer electrolyte in the present invention include, but are not limited to poly(diallyldimethylammonium chloride), poly(1-methyl-4-vinylpyridinium bromide) and poly(1-methyl-2-vinylpyridinium bromide).

Usually, when the process for producing hydrogen comprises contacting an aqueous solution of a colloidal stabilizer with the composition, colloidal stabilizer is a water-soluble polyelectrolyte, wherein said water-soluble polyelectrolyte is an organic polymer comprising monomer units of formula (II) or formula (III);

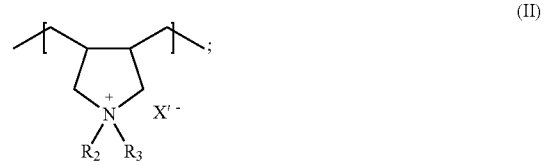

(II)

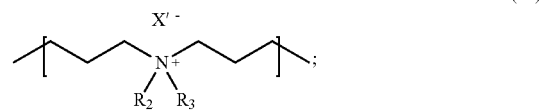

(III)

wherein:

$R_2$ is substituted or unsubstituted $C_1$-$C_6$ alkyl;

$R_3$ is substituted or unsubstituted $C_1$-$C_6$ alkyl;

X' is H or a monovalent anion.

Typically, when the polymer is an organic polymer comprising quaternary nitrogens, it is a polymer comprising monomer units of formula (II) as defined above.

Usually, X' is a halide. X' may for instance be chloride or bromide.

$R_2$ is often unsubstituted $C_1$-$C_6$ alkyl, typically methyl or ethyl, more typically methyl.

$R_3$ is often unsubstituted $C_1$-$C_6$ alkyl, typically methyl or ethyl, more typically methyl.

The polymer which comprises monomer units of formula (II) or (III) may be a homopolymer or copolymer. When it is a copolymer, it may comprise two or more different kinds of monomer units falling within formula (II) or (III). Additionally or alternatively, the copolymer may comprise monomer units of formula (II) or (III) and further monomer units which are other than formula (II) or (III).

Usually, when the polymer is an organic polymer comprising quaternary nitrogens, said water-soluble polyelectrolyte is poly(diallyldimethylammonium chloride).

In some embodiments, the process produces a composition comprising a water-soluble polyelectrolyte, which water-soluble polyelectrolyte comprises a cationic nitrogen-containing groups, wherein the nitrogens are not quaternary nitrogens, such as protonated monodentate primary, secondary and tertiary amino groups, i.e. —$NH_3$, —$NHR_2$, and —$NH_2R$, and protonated bidentate secondary and tertiary amines, i.e. —$N^+RH$— and —$NH_2$—. Examples of suitable water-soluble polyelectrolyte comprises a cationic nitrogen-containing groups include, but are not limited to, poly(L-lysine) and polyethylenimine.

In one embodiment, the process for producing hydrogen comprises contacting an aqueous solution of a colloidal stabilizer with the composition, wherein the composition comprises nonpassivated silicon, a dispersing agent which is a water-soluble molecular compound, and a colloidal stabilizer which is a water-soluble polyelectrolyte, wherein said dispersing agent is sucrose, glucose, lactose, fructose, galactose, xylose, ribose, maltose or arabitol, and wherein said water-soluble polyelectrolyte is polyacrylic acid, polymethacrylic acid or poly(diallyldimethylammonium chloride). Typically, said dispersing agent is sucrose, glucose or arabitol, for instance, sucrose or glucose, and said water-soluble polyelectrolyte is polyacrylic acid, poly(sodium styrene sulfonate) or poly(diallyldimethylammonium chloride). More typically, said dispersing agent is sucrose and said water-soluble polyelectrolyte is polyacrylic acid.

Often, the process for producing hydrogen further comprising recovering said hydrogen.

In the process for producing hydrogen the water may have a pH of from 4 to 9, for instance the water has a pH of 7. Often, the process further comprises heating the water to a temperature of from 30° C. to 100° C., for instance, the process may comprise heating the water to a temperature of from 60° C. to 90° C. Usually, said water is heated to said temperature prior to the step of contacting the water with the nonpassivated silicon in said composition. More usually, said water is maintained at said temperature during the hydrolysis reaction. Typically, the process for producing hydrogen further comprises agitating the reaction mixture.

Often, in the process for producing hydrogen, the initial rate of hydrogen gas evolution is at least 65 $cm^3$ $min^{-1}$ $g^{-1}$, for instance, the initial rate of hydrogen gas evolution may be at least 70 $cm^3$ $min^{-1}$ $g^{-1}$. Typically, the initial rate of hydrogen gas evolution is at least 100 $cm^3$ $min^{-1}$ $g^{-1}$, for instance the initial rate of hydrogen gas evolution may be at least 150 $cm^3$ $min^{-1}$ $g^{-1}$. More typically, the initial rate of hydrogen gas evolution is at least 200 $cm^3$ $min^{-1}$ $g^{-1}$. Often the initial rate of hydrogen gas evolution is at least 300 $cm^3$ $min^{-1}$ $g^{-1}$. The yield of hydrogen may be at least 40%, for example the yield of hydrogen may be at least 50%. Usually, the yield of hydrogen is at least 60%, for instance the yield of hydrogen may be at least 70%. More usually, the yield of hydrogen is at least 80%. Typically, at least 5 weight % hydrogen, preferably at least 9 weight % hydrogen, is produced based on the weight of nonpassivated silicon in said composition.

In some embodiments, in the process for producing hydrogen, the initial rate of hydrogen gas evolution is at least 250 $cm^3$ $min^{-1}$ $g^{-1}$, for instance, the initial rate of hydrogen gas evolution may be at least 500 $cm^3$ $min^{-1}$ $g^{-1}$. In one embodiment, in the process for producing hydrogen, the initial rate of hydrogen gas evolution is at least 1000 $cm^3$ $min^{-1}$ $g^{-1}$, for instance, the initial rate of hydrogen gas evolution may be at least 1500 $cm^3$ $min^{-1}$ $g^{-1}$.

In the process for producing hydrogen, for instance said composition is provided in the form of one or more encapsulates, wherein the one or more encapsulates comprise said composition within an organic coating, and wherein the process comprises contacting said water with the one or more encapsulates and allowing the organic coating to dissolve, degrade or melt away, thereby contacting the water with the composition. The organic coating, in one embodiment, is suitable for preventing or reducing exposure of the nonpassivated silicon to air, and may be as further defined hereinbefore. Typically, the organic coating is capable of dissolving, degrading or melting away upon exposure to water having a temperature less than or equal to 100° C. and a pH of from 5 to 9. More typically, the organic coating is capable of dissolving, degrading or melting away upon exposure to water having a temperature less than or equal to 100° C. and a pH of 7. Even more typically, the organic coating is capable of dissolving, degrading or melting away upon exposure to water having a temperature less than or equal to 90° C. and a pH of 7. The organic coating may for instance be a water-soluble coating. Additionally or alternatively, the organic coating may have a low melting point, e.g. a melting point of from 30° C. to 100° C., more typically from 50° C. to 100° C., or from 50° C. to 90° C. Typically, the organic coating comprises gelatine or agar. The coating typically comprises gelatine.

The invention will be described further in the Examples which follow.

EXAMPLES

Experimental Techniques

Milling Experiments

Silicon pieces (99.95% purity, particles around 1-3 mm, Aldrich), sodium chloride (99.5% purity, Sigma-Aldrich), sucrose (99.5% purity, Sigma-Aldrich), glucose (analytical grade, Fisher Scientific) and acetonitrile (HPLC grade S, Rathbum) were used as the starting materials. Polyacrylic acid sodium salt (PAA, $M_w$ 15000) and poly(diallyldimethylammonium chloride) (PDDA, $M_w$ 200,000 to 350,000) aqueous solution were purchased from Aldrich, and dried to anhydrous to be used as additional additives. The mixture of silicon and additives, and 3 ml acetonitrile were loaded into 20 ml tempered steel grinding bowls containing 5 mm diameter steel balls inside a nitrogen purged glove box with a weight ratio of powder to steel ball 1:17 to 1:20. The mixture was milled in a Fritsch planetary ball-mill at 900 rpm for 10 minutes followed by another 10 minutes after a 10 minutes cooling pause in between. The milling speed and time was optimised based on previous experiments (WO 2011/058317). After milling, the mixture was dried and stored in nitrogen purged glove box.

Hydrolysis Experiments

The hydrolysis reactions were either carried out with 5 ml water in a 20 ml glass vial sealed with Suba-Seal silicone rubber septa which was heated with an oil bath to 90° C. and stirred using a magnetic stirrer or were carried out with 60 ml of water in a sealed 100 ml glass bottle which was heated with an oil bath to 90° C. and stirred using a magnetic stirrer. Degassed water or aqueous solution was injected to the reaction vial though a BD plastipak syringe and needle, and the hydrogen produced from this reaction was passed through a condenser via a needle and a rubber pipe, and collected in a reverted measuring cylinder. The gas has been confirmed to be pure hydrogen from gas chromatography.

Physical Characteristics

Milled silicon powder was characterised by scanning electron microscope (SEM, Hitachi S530), and X-ray Diffraction (XRD) using a Panalytical X-ray diffractometer with $CuK_\alpha$ ($\lambda$=1.5406 Å) radiation. The zeta potential and particle size were measured using Malvern Zetasizer Nano ZS.

1. Salt and Sugar as Additives for the Silicon Hydrolysis Reaction

Water soluble additives have been shown to enhance hydrogen generation rate from similar hydrolysis reaction such as aluminium (Korosh Mahmoodi et al., International Journal of Hydrogen Energy, 2010, 35, 5227-5232; Babak Alinejad et al., International Journal of Hydrogen Energy, 2009, 34, p. 7934-7938; and E. Czech et al., International Journal of Hydrogen Energy, 2010, 35, p. 1029-1037). Several water soluble additives, such as NaCl and sucrose, were independently co-milled with silicon powder to explore the impact on the reaction rate. The results are shown in Table 2 and FIG. 2.

Table 2 and FIG. 2 show the normalised rate of hydrogen generation in the initial linear regime when silicon reacts with 60 ml of water at 90° C. is 38.0 ml/min/g. The results also show that the rate of hydrogen generation is more than double that when silicon is milled with either NaCl or sucrose. The additive-free silicon also shows a lower conversion yield (70.4% of the theoretical maximum) compared to that found for silicon milled with NaCl (85.5% of the theoretical maximum) and silicon milled with sucrose (73.0% of the theoretical maximum). Due to the faster reaction rate, it only took 80 minutes for the sample of silicon milled with NaCl and 130 minutes for the sample of silicon milled with sucrose to reach 90% of its ultimate yield, in contrast to 297 minutes required for the additive-free silicon.

silicon hydrolysis reaction changes when the amount of water in the reaction vessel is reduced significantly.

The results in Table 2 show that the normalised rate of hydrogen generation in the initial linear regime when silicon reacts with 5 ml of water at 90° C. is 46.7 ml/min/g. The rate of hydrogen generation is just over twice that when silicon is milled with NaCl. However, the rate of hydrogen generation for the sample of silicon milled with sucrose is almost four times the rate of hydrogen generation for the additive-free sample. In this instance, the conversion yield of the additive-free silicon sample was 58.8%. It can be seen that the conversion yield increased only slightly to 61.9% for the sample of silicon milled with NaCl. In contrast, a much greater increase in conversion yield (to 85.9%) was observed for the sample of silicon milled with sucrose.

The differences in the normalised rates of hydrogen generation and conversion yields observed between the reactions of the silicon samples with 60 ml and 5 ml of water can be attributed to the different ionic strength of the two additives. The water solubility of both NaCl and sucrose are quite high, around 0.4 g/ml at 90° C. for NaCl and around 4.2 g/ml at 90° C. for sucrose. So both NaCl and sucrose are leached out of the nano-silicon powder easily during the hydrolysis reaction, promoting the dispersion of particles in the solution. The increased dispersion increases the surface area of the silicon exposed to the water. This is in contrast to strong aggregation of silicon particles in the absence of additives. The aqueous suspensions of (a) the additive-free silicon in water and (b) the sample of silicon milled with sucrose in water were centrifuged at 6000 rpm for 3 minutes. Precipitation was clearly observed in suspension (a), attributable to the larger aggregated particle size, while suspension (b) still remains very stable due to the much better dispersion of smaller and isolated silicon particles, as shown in FIG. 3(a). The particle size distributions of the additive-free silicon in aqueous solution and the samples of silicon containing an additive in aqueous solution were measured quantitatively using dynamic light scattering and the results

TABLE 2

Hydrogen generation rate and conversion yield of 150 mg silicon powder co-milled with various additives in reaction with 60 ml or 5 ml water at 90° C.

| | Reaction with 60 ml of water | | Reaction with 5 ml of water | |
|---|---|---|---|---|
| Si powder (150 mg) and additives | Normalised H2 rate (ml/min/g) | Conversion Yield | Normalised H2 rate (ml/min/g) | Conversion Yield |
| Silicon powder only | 38.0 | 70.4% | 46.7 | 58.8% |
| Silicon powder with aqueous 3.5 wt % sucrose | — | — | 28.7 | 47.2% |
| Silicon powder co-milled with alumina (weight ratio 1:1) | — | — | 7.3 | 46.0% |
| Milled Silicon + NaCl (weight ratio 1:1) | 76.7 | 85.5% | 130.0 | 61.9% |
| Milled Silicon + Sucrose (weight ratio 1:1), fresh milled | 78.7 | 73.0% | 185.3 | 85.9% |

For applications in portable hydrogen fuel cells, an important consideration is the total weight of the fuel cell. In general there will be a drive to minimise the weight of any device for generating hydrogen. Experiments have therefore also been carried out to investigate the hydrolysis reaction of silicon samples with 5 ml of water. It has been found that the are shown in FIG. 3(b). The sample of silicon with sucrose shows the smallest particle size of around 196 nm, the additive-free silicon powder shows some extent of aggregation, with a particle size 467 nm and the NaCl activated powder shows a strong aggregation, with a particle size of around 1100 nm.

The silica product from the hydrolysis reaction is negatively charged in a pH neutral solution (as confirmed by a negative zeta potential around −26.1 mV) which helps to form a charge stabilized colloid. When NaCl is present in the sample, the introduction of a high concentration of sodium and chloride ions in the aqueous solution destabilizes the colloid and causes strong aggregation of silica on top of unreacted silicon particles. In this way, the active surface area is blocked. The diffusion of water reactant is also hindered by the deposition of silica on silicon powder. The NaCl activated samples therefore show a high reaction rate initially as NaCl is leaching out, but the reaction rate drops quickly and the reaction takes a much longer time to complete.

As an effective additive, sucrose itself has no catalytic effect on the silicon hydrolysis reaction. The co-milling of sucrose with silicon powder and the leaching out effect is an important feature. The milled silicon powder was reacted with sucrose containing water, as shown in FIG. 3a. The results show that the reaction has a much lower hydrogen generation rate of 28.7 ml/min/g and a lower overall yield of 47.2%, even lower compared to the reaction of silicon powder and distilled water in similar reaction conditions. The XRD pattern and SEM images of additive free silicon and sucrose activated silicon before and after the hydrolysis reaction are presented in FIGS. 4 and 6. The diffracted X-ray intensity becomes very weak after the hydrolysis reaction, confirming the consumption of crystalline silicon and generation of amorphous silica. The diameter of silicon particle can be estimated from the FWHM of the strongest peak Si (111), using Scherrer equation $$d = \frac{K\lambda}{\beta\cos\theta} \quad (4)$$

where K is the shape factor (0.9), $\lambda$ is the wavelength of X-ray source (0.1546 nm), $\beta$ is the line broadening at half the maximum intensity (FWHM) in radians, and $\theta$ is the Bragg angle (14.3°). From this equation, the diameter of the silicon in additive free silicon and sucrose activated silicon powder is 149 nm and 80 nm respectively. The diameters are reduced to 33 nm and 22 nm respectively after the hydrolysis reaction. So the presence of sucrose additive also helps to reduce particle size during ball milling. After the hydrolysis reaction the silicon core remaining for the sucrose activated silicon power is smaller than that for the additive-free silicon. The diameter of unreacted dry silicon powder calculated from XRD seems to be smaller than the result obtained using dynamic light scattering of aqueous suspension. This can be attributed to that fact that silicon powder tends to aggregate together in solution. The strong aggregation is also observed in SEM images as shown in FIG. 6 (a-b). After the hydrolysis reaction the morphology of the powder changes dramatically to very fine powders, as presented in FIG. 6 (c-d), although the particle size is below the resolution limit of SEM.

The water solubility of the additive and ability of the additive to leach out quickly in aqueous solutions is identified as another critical property that the additives should have. Alumina has been reported as an effective additive to promote the hydrolysis reaction of aluminium (E. Czech et al., International Journal of Hydrogen Energy, 2010, 35, p. 1029-1037; WO 2002/0048548), however co-milling of alumina with silicon (1:1 weight ratio) shows an extremely low hydrogen generation rate of 7.3 ml/min/g and a low reaction yield of 46.0%, mainly due to the blockage of silicon reaction sites by the water insoluble alumina power.

The high water solubility and low ionic strength of sucrose make is a superior additive in the reaction of silicon with water. It is expect that molecular solids of similar properties, such as glucose, should give similar results. It has been shown that the reaction of a sample of silicon milled with glucose in 5 ml of water has a normalised rate of hydrogen generation in the initial linear regime of 170 ml/min/g, and a final yield of 82.8%.

2. Anionic Polymer Electrolyte for the Silicon Hydrolysis Reaction

Since the silicon hydrolysis reaction is strongly influenced by the stability of negative charged silica colloid suspension, water soluble polymer electrolytes of different charge have been chosen to explore the influence on the colloidal stability and reaction kinetics.

PDDA is a popular cationic polymer electrolyte in colloidal chemistry. The reaction of silicon powder with a 1 wt % aqueous PDDA solution shows a slightly increased hydrogen generation rate of 68.0 ml/min/g and a slightly lower conversion yield compared with reaction with distilled water, as shown in Table 3. The negative charge of silica product from the hydrolysis reaction is neutralised by the positive charged PDDA polymer chain and aggregate to form positive charged clusters, so the yield is lower.

In colloid chemistry the zeta potential, the electronic potential in the interfacial double layer, is used to characterise the stability of colloidal suspension. The sign of the zeta potential indicates the charge in the interface, and a higher zeta potential value is associated with a good stability of a colloid. The zeta potential of silicon reacted with distilled water is −26.1 mV, indicating a moderately stable anionic suspension. The zeta potential changed to 68.9 mV after reaction with 1 wt % PDDA containing aqueous solution, confirming the intense positive charge as a result of silica particles aggregation on cationic PDDA polymer chains. As the colloidal suspension becomes very stable (as confirmed by the large zeta potential value) the hydrogen generation rate becomes slightly higher.

In addition to the study of cationic polymer such as PDDA, the use of anionic the polymer electrolyte polyacrylic acid (PAA) in the silicon hydrolysis reaction was also explored. PAA is an environmental benign chemical that has been widely used in nappies for babies. Silicon was added to an aqueous solution contain PAA. The quantity of PAA present was equivalent to 1 wt %. The results are shown in Table 3. The reaction rate of silicon powder with this aqueous PAA solution was 100.0 ml/min/g. This is more that two times the rate observed for the reaction of silicon with distilled water. The zeta potential increases to −55.7 mV, indicating a much better colloidal stability and a better dispersion of silica and silicon powder during the reaction. The anionic PAA polymer chains were absorbed on silicon. The strong electric repulsion between charged particles in the aqueous solution results in the silica particles and silicon particles having a much greater surface area when PAA is present in the solution.

A experiment was also conducted using PAA solution and activated silicon produced from co-milling of silicon and sucrose. The weight ration of silicon and sucrose was 1:1. The quantity of PAA present was equivalent to 1 wt %. The observed reaction rate was 334.7 ml/min/g, which is significantly faster than both the hydrolysis reaction of additive-free silicon with distilled water and the hydrolysis reaction of additive-free silicon with the aqueous PAA solution. However, the conversion yield is lower. The Zeta potential is between that observed for the additive-free silicon in water and the additive-free silicon in the aqueous PAA solution. These results are also presented in Table 3.

The inventors have considered the addition of a two different types of polymer electrolyte to enhance the hydrolysis reaction of silicon in water. These are a polymer electrolyte which is negatively charged when in aqueous solution and polymer electrolyte which is positively charged when in aqueous solution. The results show that a polymer electrolyte which is negatively charged when in aqueous solution, such as PAA, is most effective in enhancing the reaction.

In further experiments, PAA was added to silicon prior to the milling of the silicon sample. Two different weight ratios of PAA to silicon were investigated. In both cases, the sample of silicon milled with PAA was reacted with 5 ml of aqueous solution at 90° C.

In the first experiment, the weight ratio of PAA was 1 wt %. In this experiment, the rate of hydrogen generation was 70.7 ml/min/g, which is around 50% higher than the rate of hydrogen generation observed for the reaction of additive-free silicon with water.

In the second experiment, the weight ratio of PAA was 10 wt %. In this experiment, the rate of hydrogen generation was 199.3 ml/min/g, which is more that four times the rate of hydrogen generation observed for the reaction of additive-free silicon with water. This is comparable to the rate observed when a sample of silicon milled with sucrose was added to 5 ml of water, discussed above.

From both experiments, it can be seen that the zeta potential increases as the amount of PAA increase, indicating the importance of colloidal charge in the reaction.

TABLE 3

Hydrogen generation rate and conversion yield of 150 mg nano-silicon powder and activated silicon powder in reaction with 5 ml aqueous solution at 90° C.

| 150 mg Si or Si with additives mixed with 5 ml aqueous solution | 150 mg Si Distilled water | 150 mg Si aqueous 1 wt % PDDA | 150 mg Si aqueous 1 wt % PAA | 150 mg Si co-milled with 150 mg sucrose | 150 mg Si co-milled with 1.5 mg PAA (1 wt % PAA) Distilled water | 150 mg Si co-milled with 16.6 mg PAA (10 wt % PAA) Distilled water |
|---|---|---|---|---|---|---|
| Normalised H2 generation rate (ml/min/g) | 46.7 | 68.0 | 100.0 | 334.7 | 70.7 | 199.3 |
| Conversion Yield | 58.8% | 41.6% | 57.3% | 48.0% | 53.4% | 58.8% |
| Zeta potential (mV) | −26.1 | 68.9 | −55.7 | −40.0 | −39.6 | −51.6 |

3 Combining Anionic Polymer Electrolyte and Low Ionic Strength Water Soluble Additives for the Silicon Hydrolysis Reaction Both the dispersing agent, which is a water soluble molecular solid and the colloidal stabilizer, which is a water-soluble polymer electrolyte have been identified as efficient additives in the hydrolysis reaction of silicon with water. The combination of both additives was studied by co-milling sucrose and PAA with silicon powder.

Two different experiments were carried out. In one, the weight ratio of silicon to sucrose to PAA was 15:4:1. In the other, weight ratio of silicon to sucrose to PAA was 5:4:1. The results are summarised in Table 4. The rates of hydrogen generation observed were 499.3 and 857.3 ml/min/g respectively. These rates are significantly higher that the rate of hydrogen generation observed when additive-free silicon is added to aqueous solution. Further the hydrogen generation yields were 87% and 69% of conversion yield in 5 minutes, as shown in FIG. 7. Both samples also demonstrate outstanding stability during storage in nitrogen purged gloves box. The deviation of hydrogen generation rate and yield are both less than 2% after 4 days storage for both samples. In contrast a 33% drop of hydrogen generation rate and a 10% drop of conversion yield was observed for a co-milled Si and sucrose sample after 4 days storage in similar conditions, as summarised in Table 4.

TABLE 4

Hydrogen generation rate and conversion yield of 150 mg silicon powder co-milled with sucrose and PAA in reaction with 5 ml distilled water at 90° C.

| 150 mg Si co-milled with additive, reacted with 5 ml distilled water | Co-milled Si, Sucrose and PAA (weight ratio 15:4:1) | | Co-milled Si, Sucrose and PAA (weight ratio 5:4:1) | | Co-milled Si and Sucrose (weight ratio 1:1) | |
|---|---|---|---|---|---|---|
| | fresh milled | After stored for 4 days | fresh milled | After stored for 4 days | fresh milled | After stored for 4 days |
| Normalised H2 generation rate (ml/min/g) | 499.3 | 508.0 | 857.3 | 838.0 | 185.3 | 124.0 |
| Conversion Yield | 74.9% | 76.2% | 97.0% | 95.0% | 85.9% | 77.0% |

4. Combining Anionic Polymer Electrolyte and Low Ionic Strength Water Soluble Additives, and Water Soluble Additives with High Heat of Solution in Water for the Silicon Hydrolysis Reaction The Examples above show how both a low ionic strength water soluble dispersing agent and a colloid stabilizer can work together to produce high yields and fast hydrogen evolution rates. The inventors have also shown that a water soluble additive with a high heat of solution in water, when used in conjunction with the other additives, can produce further enhancements. The studies used KOH which, due to its high heat of solution in water, can produce local heating in the reaction mixture to drive the reaction. KOH also acts as a dispersant, helping the dispersion of the oxidised silicon from the reacting silicon particles to preserve the high reactivity of the reacting silicon particles.

The experiments consisted of milling the compositions set out in Table 5, and then reacting these compositions with water. The experimental conditions used are set out in Table 5. The following were measured: hydrogen generation rates; yields compared to theoretical yields; and temperature rises occurring as a result of the exothermic dissolution of the dispersant. The data are also shown graphically in FIGS. 8 to 11.

The data presented in the last data line of Table 5 demonstrate that the addition of KOH to nonpassivated silicon and water at room temperature results in the production of $H_2$ with a relatively high maximum rate of $H_2$ generation. Comparing the data in the first two data lines of the Table 5 (also FIGS. 8 and 9) with the data in the last two data lines of the Table 6 (also FIGS. 10 and 11), it can be seen that the rates and yields of production of hydrogen are greatly enhanced when KOH is used in conjunction with sucrose and PAA.

CONCLUSIONS

The inventors found that three types of additives can be used to improve the hydrogen generation rate and conversion yields observed in the hydrolysis reaction of silicon with water. These additives are: a dispersing agent, which is a water soluble molecular solid, a dispersant which is a water-soluble ionic compound having a heat of solution in water more negative than −40 kJmol$^{-1}$, and a colloidal stabilizer, which is a water-soluble polymer electrolyte The combination of these additives with silicon during ball milling leads to a significant improvement in hydrogen generation rate when the silicon sample is added to water. A good conversion rate and good stability in storage are also observed. Further, the additives preserve the environmentally benign merit of silicon.

TABLE 5

Hydrogen generation rate, conversion yield, time to reach half maximum yields and the temperature rise observed for compositions of milled powder

| Composition of milled powder (weight ratio) | Reaction conditions | Maximum H$_2$ Generation Rate | Yield | Time to reach half max yield | Maximum T (° C.) |
|---|---|---|---|---|---|
| Si:KOH:Sucrose:PAA 1:0.5:0.8:0.2 | Inject 5 ml of deaerated water (RT 24° C.) to powder containing 0.4 g Si, no external heating or stirring | 1727 ml/min/g | 83.5% | 2.0 min | 90.7° C. |
| Si:KOH:Sucrose:PAA 1:0.1:0.7:0.2 | Inject 5 ml of deaerated water (RT 24° C.) to powder containing 0.4 g Si, no external heating or stirring | 1112 ml/min/g | 79.9% | 6.4 min | 88.7° C. |
| Si:Sucrose:PAA 1:0.8:0.2 (No KOH) | Inject 5 ml of deaerated water (32° C.) to powder containing 0.5 g Si, no external heating or stirring | 3.6 ml/min/g | 67% after 18 hours | 3 hours | 36° C. |
| Si:KOH 1:0.1 | Inject 5 ml of deaerated water (RT 24° C.) to powder containing 0.4 g Si, no external heating or stirring | 265 ml/min/g | 67.5% | 10.1 min | 86.5° C. |

The invention claimed is:
1. A composition which comprises an intimate mixture of:
   (a) nonpassivated silicon; and
   (b) a dispersing agent which is a water-soluble molecular compound,
   a dispersant which is a water-soluble ionic compound having a heat of solution in water more negative than $-40$ kJmol$^{-1}$, or
   a colloidal stabilizer which is a water-soluble polyelectrolyte.

2. A composition according to claim 1 which comprises an intimate mixture of: (a) said nonpassivated silicon; and (b) said dispersing agent which is a water-soluble molecular compound, or said colloidal stabilizer which is a water-soluble polyelectrolyte.

3. A composition according to claim 1 wherein said intimate mixture is obtained by milling (a) said nonpassivated silicon and (b) said dispersing agent, dispersant or colloidal stabilizer.

4. A composition according to claim 1 which comprises an intimate mixture of (a) said nonpassivated silicon and (b) said dispersing agent which is a water-soluble molecular compound.

5. A composition according to claim 1 which comprises an intimate mixture of (a) said nonpassivated silicon and (b) said dispersant which is a water-soluble ionic compound having a heat of solution in water more negative than $-40$ kJmol$^{-1}$.

6. A composition according to claim 1 which comprises an intimate mixture of (a) said nonpassivated silicon and (b) said colloidal stabilizer which is a water-soluble polyelectrolyte.

7. A composition according to claim 4 which further comprises: (c) a colloidal stabilizer which is a surfactant, a water-soluble polyelectrolyte or a water-soluble non-ionic polymer.

8. A composition according to claim 1 which comprises an intimate mixture of: (a) nonpassivated silicon, (b) said dispersing agent which is a water-soluble molecular compound, and (c) said colloidal stabilizer which is a water-soluble polyelectrolyte.

9. A composition according to claim 1 which comprises an intimate mixture of: (a) nonpassivated silicon, (b) said dispersing agent which is a water-soluble molecular compound, (c) a dispersant which is a water-soluble ionic compound having a heat of solution in water more negative than $-40$ kJmol$^{-1}$, and (d) said colloidal stabilizer which is a water-soluble polyelectrolyte.

10. A composition according to claim 9 which is obtained by milling the nonpassivated silicon with the dispersing agent, the dispersant and the colloidal stabilizer.

11. A composition according to claim 1 wherein the ionic strength of a 1.0 M aqueous solution of said dispersing agent, which solution consists of water and said dispersing agent, is less than or equal to 0.1 mol/dm$^3$.

12. A composition according to claim 1 wherein said dispersing agent is non-ionic.

13. A composition according to claim 1 wherein said dispersing agent is a charge-neutral, covalent compound.

14. A composition according to claim 1 wherein the solubility of said dispersing agent in water at 90° C. and at 1 atmosphere of pressure is equal to or greater than 0.1 g/ml.

15. A composition according to claim 1 wherein the weight ratio of said nonpassivated silicon to said dispersing agent is from 100:1 to 1:5.

16. A composition according to claim 1 wherein said dispersing agent is a carbohydrate.

17. A composition according to claim 1 wherein said dispersing agent is sucrose or glucose.

18. A composition according to claim 1 wherein said dispersant is a metal hydroxide.

19. A composition according to claim 1 wherein said dispersant is potassium hydroxide.

20. A composition according to claim 1 wherein the weight ratio of said nonpassivated silicon to said water-soluble polyelectrolyte is from 1000:1 to 1:25.

21. A composition according to claim 1 wherein said water-soluble polyelectrolyte is negatively charged when in aqueous solution.

22. A composition according to claim 1 wherein said water-soluble polyelectrolyte is an organic polymer comprising carboxyl groups, or sulfonate groups.

23. A composition according to claim 1 wherein the water-soluble polyelectrolyte is a polymer comprising monomer units of formula (I):

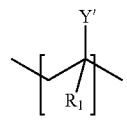

(I)

wherein:
R$_1$ is hydrogen or a substituted or unsubstituted C$_1$-C$_6$ alkyl;
Y' is COOX', CONR'R" or 4-phenyl-SO$_3$X';
X' is H or a monovalent cation; and
R' and R" are independently hydrogen or a substituted or unsubstituted C$_1$-C$_6$ alkyl.

24. A composition according to claim 1 wherein the water-soluble polyelectrolyte is polyacrylic acid, polymethacrylic acid, or poly (styrene sulfonate), or a salt thereof.

25. A composition according to claim 1 wherein said water-soluble polyelectrolyte is positively charged when in aqueous solution.

26. A composition according to claim 1 wherein said water-soluble polyelectrolyte is an organic polymer comprising quaternary nitrogens or cationic nitrogen-containing groups, wherein the nitrogens are not quaternary nitrogens.

27. A composition according to claim 1 wherein the water-soluble polyelectrolyte is a polymer comprising units of formula (II) or formula (III);

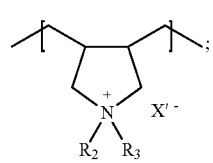

(II)

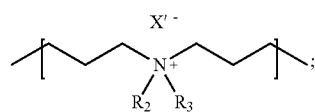

(III)

wherein:
R$_2$ is a substituted or unsubstituted C$_1$-C$_6$ alkyl;
R$_3$ is a substituted or unsubstituted C$_1$-C$_6$ alkyl;
X' is H or a monovalent anion.

28. A composition according to claim 1 wherein the water-soluble polyelectrolyte is poly(diallyldimethylammonium chloride), poly(L-lysine) or polyethyleneimine.

29. A composition according to claim 8 wherein said dispersing agent is sucrose or glucose and said water-soluble polyelectrolyte is polyacrylic acid or poly(diallyldimethylammonium chloride).

30. A composition according to claim 8 wherein said dispersing agent is sucrose and said water-soluble polyelectrolyte is polyacrylic acid.

31. A composition according to claim 9 wherein said dispersing agent is sucrose, the dispersant is KOH and said water-soluble polyelectrolyte is polyacrylic acid.

32. A composition according to claim 8 wherein:
the weight ratio of said nonpassivated silicon to said dispersing agent is from 100:1 to 1:5; and
the weight ratio of said nonpassivated silicon to said water soluble polyelectrolyte is from 1000:1 to 1:25.

33. A composition according to claim 8 wherein the weight ratio of said nonpassivated silicon to said dispersing agent to said water soluble polyelectrolyte is from 1000:10:1 to 1:5:25.

34. A composition according to claim 9 wherein the weight ratio of said nonpassivated silicon to said dispersing agent to said dispersant to said water soluble polyelectrolyte is from 1000:10:10:1 to 1:5:5:25.

35. A composition according to claim 1 wherein said composition has a Zeta potential in water of less than or equal to −18 mV.

36. A composition according to claim 25 wherein said composition has a Zeta potential of equal to or greater than 50 mV.

37. A composition according to claim 1 which has a mean particle size of less than or equal to 300 nm.

38. A composition according to claim 1 which comprises one or more encapsulates which comprise nonpassivated silicon within an organic coating.

39. A pellet for generating hydrogen, the pellet comprising a composition as defined in claim 1 encapsulated within an organic coating.

40. A pellet according to claim 39 wherein the organic coating is suitable for preventing or reducing exposure of the composition to air.

41. A pellet according to claim 39, wherein the organic coating is capable of dissolving, degrading or melting away upon exposure to water having a temperature less than or equal to 100° C.

42. A pellet according to any one of claim 39, wherein the organic coating comprises gelatine or agar.

43. A process for producing a composition, which composition comprises:
(a) nonpassivated silicon; and
(b) a dispersing agent which is a water-soluble molecular compound,
a dispersant which is a water-soluble ionic compound having a heat of solution in water more negative than −40 kJmol$^{-1}$, or
a colloidal stabilizer which is a water-soluble polyelectrolyte;
which process comprises providing a sample comprising:
(a) silicon; and
(b) a dispersing agent which is a water-soluble molecular compound,
a dispersant which is a water-soluble ionic compound having a heat of solution in water more negative than −40 kJmol$^{-1}$, or
a colloidal stabilizer which is a water-soluble polyelectrolyte;
and, under inert conditions, reducing the mean particle size of said sample by applying a mechanical force to the sample.

44. A process according to claim 43 wherein the step of reducing the mean particle size of the sample comprises reducing the particle size by attribution (friction), impact and/or cutting.

45. A process according to claim 43 wherein the step of reducing the mean particle size of the sample comprises milling, grinding or crushing the sample.

46. A process according to claim 43 wherein the step of reducing the mean particle size of the sample is performed under an inert atmosphere and/or in an inert solvent.

47. A process according to claim 46 wherein the step of reducing the mean particle size of the sample is performed in a dry (moisture free) solvent that does not contain any OH groups.

48. A process according to claim 43 wherein
(i) the step of reducing the mean particle size of the sample causes the mean particle size of said sample to be reduced to a particle size of less than or equal to 300 nm; or
(ii) said silicon in said sample bears an outer layer of silicon dioxide on at least part of a surface thereof, wherein said outer layer of silicon dioxide has a first thickness, and wherein the step of reducing the mean particle size of the sample causes the average thickness of said outer layer of silicon dioxide to decrease from said first thickness to a second thickness, wherein the second thickness is less than or equal to 3.5 nm; or
(iii) the step of reducing the mean particle size of the sample causes the ratio of Si to SiO$_2$ on the surface of said silicon, as measured by X-ray photoelectron spectroscopy, to increase from a first ratio to a second ratio, wherein the second ratio is greater than the first ratio, and wherein the second ratio is at least 3:1.

49. A process according to claim 43 wherein the step of reducing the mean particle size of the sample comprises milling the sample.

50. A process according to claim 49 wherein the speed and duration of milling are selected to cause the mean particle size to be reduced to a particle size of less than or equal to 300 nm; to cause the thickness of an outer layer of silicon dioxide to be reduced to a thickness less than or equal to 3.5 nm; and/or to cause the ratio of Si to SiO$_2$ on the surface of said sample, as measured by X-ray photoelectron spectroscopy, to increase from a first ratio to a second ratio, wherein the second ratio is greater than the first ratio, and wherein the second ratio is at least 3:1.

51. A process according to claim 43 wherein said silicon in the sample provided comprises granular silicon or coarse silicon particles.

52. A process according to claim 43 wherein said silicon in the sample provided comprises at least 90 weight % silicon.

53. A process according to claim 43 which further comprises recovering the composition thus produced, under inert conditions and coating said composition with an organic coating, to form one or more encapsulates which comprise said composition within an organic coating wherein the organic coating is suitable for preventing or reducing exposure of the composition to air.

54. A composition which is obtained by a process as defined in claim 43.

55. A process for producing hydrogen, which process comprises contacting water with a composition as defined in claim 1 and thereby producing hydrogen by hydrolysis of the nonpassivated silicon.

* * * * *